United States Patent
Masi et al.

(10) Patent No.: US 10,066,044 B2
(45) Date of Patent: Sep. 4, 2018

(54) STEREOREGULAR DIBLOCK POLYBUTADIENES HAVING A 1,4-CIS/SYNDIOTACTIC 1,2 STRUCTURE FROM STEREOSPECIFIC POLYMERIZATION

(71) Applicant: versalis S.p.A., San Donato Milanese (IT)

(72) Inventors: Francesco Masi, Sant'Angelo Lodigiano (IT); Anna Sommazzi, Santa Margherita Ligure (IT); Giovanni Ricci, Parma (IT); Giuseppe Leone, Milan (IT); Salvatore Coppola, Ravenna (IT)

(73) Assignee: versalis S.p.A., San Donato Milanese (MI) (IT)

( * ) Notice: Subject to any disclaimer, the term of this patent is extended or adjusted under 35 U.S.C. 154(b) by 98 days.

(21) Appl. No.: 15/032,207

(22) PCT Filed: Nov. 3, 2014

(86) PCT No.: PCT/IB2014/065768
§ 371 (c)(1),
(2) Date: Apr. 26, 2016

(87) PCT Pub. No.: WO2015/068095
PCT Pub. Date: May 14, 2015

(65) Prior Publication Data
US 2016/0264706 A1   Sep. 15, 2016

(30) Foreign Application Priority Data

Nov. 5, 2013 (IT) .............................. MI2013A1830

(51) Int. Cl.
*C08F 295/00* (2006.01)
*C08F 4/70* (2006.01)
(52) U.S. Cl.
CPC .......... *C08F 295/00* (2013.01); *C08F 4/7006* (2013.01); *C08F 4/7008* (2013.01); *C08F 4/7042* (2013.01); *C08F 4/7044* (2013.01)
(58) Field of Classification Search
CPC .... C08F 295/00; C08F 4/7006; C08F 4/7008; C08F 4/7042; C08F 4/7044
See application file for complete search history.

(56) References Cited

U.S. PATENT DOCUMENTS

| 5,548,045 A | 8/1996 | Goto et al. |
|---|---|---|
| 2009/0143548 A1 | 6/2009 | Shiba et al. |
| 2016/0264707 A1* | 9/2016 | Ricci .................... C08F 295/00 |

FOREIGN PATENT DOCUMENTS

| EP | 0 511 015 A1 | 10/1992 |
|---|---|---|
| EP | 2 028 196 A1 | 2/2009 |
| WO | WO 2015/068094 | 5/2015 |

OTHER PUBLICATIONS

International Search Report dated Mar. 3, 2015 in PCT/IB2014/065768.
Suyun Jie, et al., "Highly Active and Stereospecific Polymerization of 1,3-Butadiene Catalyzed by Dinuclear Cobalt(II) Complexes Bearing 3-Aryliminomethy1-2-Hydroxyben-Zaldehydes" Dalton Transactions, vol. 40, No. 41, XP055061366, Jan. 1, 2011, pp. 10975-10982.
Dilip Chandra Deb Nath, et al., "Additive Effect of Triphenylphosphine on the Living Polymerization of 1,3-Butadiene with a Cobalt Dichloride-Methylaluminoxane Catalytic System" Macromolecular Chemistry and Physics, vol. 204, No. 16, XP055131078, Nov. 1, 2003, pp. 2017-2022.
Giovanni Ricci, et al., "Synthesis, Structure, and Butadiene Polymerization Behavior of Alkylphosphine Cobalt(II) Complexes" Journal of Molecular Catalysis A: Chemical, vol. 226, No. 2, XP027658638, Feb. 15, 2005, pp. 235-241.
Written Opinion dated Mar. 28, 2017 in Singapore Patent Application No. 11201603256R.
Dirong Gong et al., "Synthesis, Characterization and Butadiene Polymerization Studies of Cobalt (II) Complexes Bearing Bisiminopyridine Ligand", Journal of Organometallic Chemistry, vol. 696, Jan. 21, 2011, pp. 1584-1590.
Renan Cariou et al., "The Effect of the Central Donor in Bis(benzimidazole)-based Cobaltcatalysts for the Selective cis-1,4-polymerization of Butadiene", Dalton Trans., vol. 39, Aug. 20, 2010, submitting Abstract only.

* cited by examiner

*Primary Examiner* — Irina Sopjia Zemel
*Assistant Examiner* — Jeffrey S Lenihan
(74) *Attorney, Agent, or Firm* — Oblon, McClelland, Maier & Neustadt, L.L.P.

(57) ABSTRACT

Stereoregular diblock polybutadiene composed of a polybutadiene block having a 1,4-cis structure and a polybutadiene block having a syndiotactic 1,2 structure. Said stereoregular diblock polybutadiene can be advantageously used in both the footwear industry (for example, in the production of soles for shoes) and in the production of tires for motor vehicles and/or trucks.

13 Claims, 36 Drawing Sheets

| sample | time (min) | conv (%) |
|---|---|---|
| GL694 | 60 | 9 |
| GL695 | 105 | 17 |
| GL696 | 145 | 27 |
| GL697 | 195 | 40 |
| GL698 | 240 | 54 |

| sample | time (min) | yield (g) |
|---|---|---|
| GL694 | 60 | 0.133 |
| GL695 | 105 | 0.242 |
| GL696 | 145 | 0.377 |
| GL697 | 195 | 0.558 |
| GL698 | 240 | 0.759 |

STEREOREGULAR DIBLOCK POLYBUTADIENES HAVING A 1,4-CIS/SYNDIOTACTIC 1,2 STRUCTURE FROM STEREOSPECIFIC POLYMERIZATION

CROSS-REFERENCE TO RELATED APPLICATIONS

The present application is a 35 U.S.C. § 371 national stage patent application of International patent application PCT/IB2014/065768, filed on Nov. 3, 2014, the text of which is incorporated by reference, and claims the benefit of the filing date of Italian application no. MI2013A001830, filed on Nov. 5, 2013, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

Field of the Invention

The present invention relates to a stereoregular diblock polybutadiene having a 1,4-cis/syndiotactic 1,2 structure.

More specifically, the present invention relates to a stereoregular diblock polybutadiene composed of a polybutadiene block having a 1,4-cis structure and a polybutadiene block having a syndiotactic 1,2 structure.

The present invention also relates to a process for the preparation of a stereoregular diblock polybutadiene composed of a polybutadiene block having a 1,4-cis structure and a polybutadiene block having a syndiotactic 1,2 structure, which comprises subjecting 1,3 butadiene to total or partial stereospecific polymerization in the presence of a catalytic system comprising at least one cobalt complex including at least one imine nitrogen, and subsequently adding at least one monodentate aromatic phosphine and optionally 1,3-butadiene, and continuing said stereospecific polymerization.

Said stereoregular diblock polybutadiene can be advantageously used in both the footwear industry (for example, in the production of soles for shoes) and in the production of tires for motor vehicles and/or trucks.

Description of the Related Art Including Information Disclosed Under 37 CFR 197 and 1.98

It is known that the stereospecific polymerization of conjugated dienes is an extremely important process in the chemical industry for obtaining products which are among the most widely-used rubbers.

It is also known that among the various polymers that can be obtained from the stereospecific polymerization of 1,3-butadiene (i.e. 1,4-cis; 1,4-trans; syndiotactic 1,2; isotactic 1,2; atactic 1,2; a mixed 1,4-cis/1,2 structure having a variable content of 1,2 units), only 1,4-cis polybutadiene and syndiotactic 1,2 polybutadiene are industrially produced and commercialized. Further details relating to said polymers can be found, for example, in: Takeuchi Y. et al., "New Industrial Polymers", "American Chemical Society Symposium Series" (1974), Vol. 4, pages 15-25; Halasa A. F. et al., "Kirk-Othmer Encyclopedia of Chemical Technology" (1989), 4$^{th}$ Ed., Kroschwitz J. I. Ed., John Wiley and Sons, New York, Vol. 8, pages 1031-1045; Tate D. et al., "Encyclopedia of Polymer Science and Engineering" (1989), 2$^{nd}$ Ed., Mark H. F. Ed., John Wiley and Sons, New York, Vol. 2, pages 537-590; Kerns M. et al., "Butadiene Polymers", in "Encyclopedia of Polymer Science and Technology" (2003), Mark H. F. Ed., Wiley, Vol. 5, pages 317-356.

1,4-cis polybutadiene is a synthetic elastomer generally having a content of 1,4-cis units equal to 96%-97%, a melting point ($T_m$) of about −2° C., a crystallization temperature ($T_c$) of about −25° and a glass transition temperature ($T_g$) below −100° C., whose properties are extremely similar to those of natural rubber and whose main use is in the production of tires for motor vehicles and/or trucks. In particular, in the production of tires, polybutadiene with a high content of 1,4-cis units, is used.

1,4-cis polybutadiene is generally prepared through polymerization processes which use various catalytic systems comprising catalysts based on titanium (Ti), cobalt (Co), nickel (Ni), neodymium (Nd). Catalytic systems comprising catalysts based on cobalt have a high catalytic activity and stereospecificity and can be considered as being the most versatile among those listed above as, by varying their formulation, they are capable of giving all the possible stereoisomers of polybutadiene indicated above, as described, for example, in Porri L. et al., "Comprehensive Polymer Science" (1989), Eastmond G. C. et al. Eds., Pergamon Press, Oxford, UK, Vol. 4, Part II, pages 53-108; Thiele S. K. H. et al., "Macromolecular Science. Part C: Polymer Reviews" (2003), C43, pages 581-628; Osakada, K. et al., "Advanced Polymer Science" (2004), Vol. 171, pages 137-194; Ricci G. et al., "Advances in Organometallic Chemistry Research" (2007), Yamamoto K. Ed., Nova Science Publisher, Inc., USA, pages 1-36; Ricci G. et al., "Coordination Chemistry Reviews" (2010), Vol. 254, pages 661-676; Ricci G. et al., "Cobalt: Characteristics, Compounds, and Applications" (2011), Lucas J. Vidmar Ed., Nova Science Publisher, Inc., USA, pages 39-81.

The catalytic system cobalt bis-acetylacetonate/diethylaluminium chloride/water [$Co(acac)_2/AlEt_2Cl/H_2O$], for example, provides a polybutadiene having a content of 1,4-cis units equal to about 97%, and is that normally used for the industrial production of this polymer as described, for example, in Racanelli P. et al., "European Polymer Journal" (1970), Vol. 6, pages 751-761. The catalytic system cobalt tris-acetylacetonate/methylaluminoxane [$Co(acac)_3/MAO$] also provides a polybutadiene having a content of 1,4-cis units equal to about 97%, as described, for example, in Ricci G. et al., "Polymer Communication" (1991), Vol. 32, pages 514-517.

The catalytic system cobalt tris-acetylacetonate/tri-ethylaluminium/water[$Co(acac)_3/AlEt_3/AlEt_3/H_2O$] on the other hand, provides a polybutadiene having a mixed 1,4-cis/1,2 equibinary structure as described, for example, in: Furukawa J. et al., "Polymer Journal" (1971), Vol. 2, pages 371-378. Said catalytic system, in the presence of carbon disulfide ($CS_2$), however, is used in processes for the industrial production of highly crystalline syndiotactic 1,2-polybutadiene. Further details relating to these processes can be found, for example, in: Ashitaka H. et al., "*Journal of Polymer Science: Polymer Chemistry Edition*" (1983), Vol. 21, pages 1853-1860; Ashitaka H. et al., "*Journal of Polymer Science: Polymer Chemistry Edition*" (1983), Vol. 21, pages 1951-1972; Ashitaka H. et al., "*Journal of Polymer Science: Polymer Chemistry Edition*" (1983), Vol. 21, pages 1973-1988; Ashitaka H. et al., "*Journal of Polymer Science: Polymer Chemistry Edition*" (1983), Vol. 21, pages 1989-1995.

An extremely active and stereospecific catalytic system for the preparation of syndiotactic 1,2-polybutadiene can be obtained from the combination of the allyl cobalt complex $(\eta^4\text{-}C_4H_6)(\eta^5\text{-}C_8H_{13})$ Co described, for example, in Natta G. et al., "*Chemical Communications*" (1967), Issue 24, pages 1263-1265, with carbon disulfide ($CS_2$), as described, for example, in Ricci G. et al., "*Polymer Communication*" (1988), Vol. 29, pages 305-307. This allyl cobalt complex alone is capable of dimerizing 1,3-butadiene at room temperature as described, for example, in American patent U.S. Pat. No. 5,879,805, but is only capable of giving syndiotactic 1,2-polybutadiene operating at a low temperature (−30° C.) as described, for example, in Ricci G. et al., "*Polymer Communication*" (1988), Vol. 29, pages 305-307.

Polybutadienes with a syndiotactic 1,2 structure or a mixed 1,4-cis/1,2 structure, having the 1,4-cis and 1,2 units randomly distributed along the polymeric chain, can also be produced using catalytic systems obtained by the combination of cobalt dichloride ($CoCl_2$) or of cobalt dibromide ($CoBr_2$) with organic aluminium compounds (e.g., alkyl compounds of aluminium or aluminoxanes), in the presence of phosphines (e.g., triphenylphosphine) as described, for example, in the following American patents: U.S. Pat. No. 5,879,805, U.S. Pat. No. 4,324,939, U.S. Pat. No. 3,966,697, U.S. Pat. No. 4,285,833, U.S. Pat. No. 3,498,963, U.S. Pat. No. 3,522,332, U.S. Pat. No. 4,182,813, U.S. Pat. No. 5,548,045, U.S. Pat. No. 7,009,013; or by Shiono T. et al., in "*Macromolecular Chemistry and Physics*" (2002), Vol. 203, pages 1171-1177, "*Applied Catalysis A: General*" (2003), Vol. 238, pages 193-199, "*Macromolecular Chemistry and Physics*" (2003), Vol. 204, pages 2017-2022, "*Macromolecules*" (2009), Vol. 42, pages 7642-7643. The regioregularity and crystallinity of the polybutadienes obtained with said catalytic systems are much lower (e.g., 80%-90% of 1,2, units, melting point ($T_m$) ranging from 75° C. to 90° C.) with respect to those of the polybutadienes obtained with the catalytic system described in Ricci G. et al., "*Polymer Communication*" (1988), Vol. 29, pages 305-307, indicated above.

Further details relating to the polymerization of 1,3-butadiene with catalytic systems comprising preformed complexes of cobalt with various phosphines, are provided, for example, in Italian patents IT 1,349,141, IT 1,349,142, IT 1,349,143, and in International patent application WO 2003/018649. The use of different phosphines derives from the fact that it is well-known that steric and electronic properties of phosphines greatly depend on the type of substituents on the phosphorous atom, as described, for example, in: Dierkes P. et al., "*Journal of Chemical Society, Dalton Transactions*" (1999), pages 1519-1530; van Leeuwen P. et al., "*Chemical Reviews*" (2000), Vol. 100, pages 2741-2769; Freixa Z. et al., "*Dalton Transactions*" (2003), pages 1890-1901; Tolman C., "*Chemical Reviews*" (1977), Vol. 77, pages 313-348.

The documents relating to the use of phosphines indicated above, show how the use of preformed phosphine complexes of cobalt combined with methylaluminoxane (MAO) can enable the microstructure of polybutadiene to be managed, thus allowing polybutadienes with various structures to be obtained, depending on the type of phosphine coordinated with the cobalt atom.

The stereospecific polymerization of 1,3-butadiene with catalytic systems comprising complexes of cobalt with hindered monodentate aliphatic phosphines (e.g., $P^tBu_3$, $P^iPr_3$, $P^tBu_2{}^iPr$, $P^tBu_2Me$, $P^tBu_2Cy$, $P^tBuCy_2$, $PCY_3$, $PCyp_3$ wherein P=phosphorous, $^tBu$=tert-butyl, $^iPr$=iso-propyl, Cy=cyclohexyl and Cyp=cyclopentyl), provides polybutadienes with a prevalently 1,4-cis structure, whereas polybutadienes having a mixed 1,4-cis/1,2 structure have been obtained using catalytic systems comprising complexes of cobalt with phosphines having a lesser steric hindrance (e.g., $PCy_2H$; $P^tBu_2H$; $PEt_3$; $P^{\prime\prime}Pr_3$ wherein P=phosphorous, Cy=cyclohexyl, $^tBu$=tert-butyl, Et=ethyl and $^{\prime\prime}Pr$=n-propyl), as described, for example, in International patent application WO 2003/1018649.

Polybutadienes with a high content of 1,4-cis units (≥96%) have been obtained with catalytic systems comprising complexes of cobalt with bidentate phosphines [e.g., $CoCl_2[R_2P(CH_2)_nPR_2]/MAO$, wherein Co=cobalt, Cl=chlorine, R=methyl, ethyl, phenyl, n=1 or 2, P=phosphorous and MAO=methylaluminoxane), regardless of the type of bidentate phosphine coordinated with the cobalt atom, as described, for example, in Ricci G. et al., "*Coordination Chemistry Reviews*" (2010), Vol. 254, pages 661-676; Ricci G. et al., "*Cobalt: Characteristics, Compounds, and Applications*" (2011), Lucas J. Vidmar Ed., Nova Science Publisher, Inc., USA, pages 39-81.

Catalytic systems comprising complexes of cobalt with ligands selected from aromatic phosphines [e.g., $CoCl_2(PRPh_2)_2/MAO$ (wherein Co=cobalt, Cl=chlorine, P=phosphorous, R=methyl, n-propyl, ethyl, iso-propyl, cyclohexyl, Ph=phenyl, MAO=methylaluminoxane] have, on the other hand, proved to be extremely active for the 1,2 polymerization of 1,3-butadiene, as described, for example, in Italian patents IT 1,349,142, IT 1,349,143. Using said catalytic systems, in fact, polybutadienes having an essentially 1,2 structure (within a range of 70% to 90%) have been obtained, having a variable content of 1,2 units in relation to the type of complex and the polymerization conditions. It has also been seen that the tacticity of the polybutadienes obtained greatly depends on the type of complex, i.e. the type of phosphine bound to the cobalt atom, and that the syndiotacticity index, expressed as content (i.e. percentage) of syndiotactic triads [(rr) %], determined by the $^{13}C$-NMR spectra, increases with an increase in the steric requirement of the alkyl group bound to the phosphorous atom.

The 1,2 polybutadienes obtained with systems of cobalt with less sterically hindered phosphine ligands (e.g., $PMePh_2$; $PEtPh_2$; $P^{\prime\prime}PrPh_2$ wherein P=phosphorous, Me=methyl, Et=ethyl, Ph=phenyl, $^{\prime\prime}Pr$=n-propyl) have proved to have a low crystallinity and with a content of syndiotactic triads [(rr) %] ranging from 20% to 50%, whereas the polybutadienes obtained with catalytic systems using phosphine ligands with a higher steric hindrance (e.g., $P^iPrPh_2$, $PCyPh_2$ wherein P=phosphorous, $^iPr$=iso-propyl, Ph=phenyl, Cy=cyclohexyl) have proved to be crystalline, with a melting point ($T_m$) ranging from 100° C. to 140° C. and with a content of syndiotactic triads [(rr) %] ranging from 60% to 80%, depending on the polymerization conditions.

The polymerization of 1,3-butadiene with catalytic systems comprising complexes of cobalt with aromatic phosphines having formula $CoCl_2(PR_2Ph)_2/MAO$ (wherein Co=cobalt, Cl=chlorine, R=methyl, ethyl, cyclohexyl, Ph=phenyl, MAO=methylaluminoxane) as described, for example, in Italian patents IT 1,349,141, IT 1,349,142, has also been studied. Using said catalytic systems, essentially 1,2-polybutadienes have been obtained, but the syndiotacticity index of the polymers, under the same polymerization conditions, has proved to be generally slightly lower with respect to that of the 1,2-polybutadienes obtained with catalytic systems comprising complexes of cobalt with the aromatic phosphines having formula $CoCl_2(PRPh_2)_2$/MAO described above: the content of syndiotactic triads [(rr) %], in fact, ranges from 15% to 45%.

More recently, following the success obtained using the above catalytic systems comprising phosphine complexes of cobalt, various catalytic systems comprising complexes of cobalt with ligands containing nitrogen and/or oxygen as donor atom, have been studied.

Kim J. S. et al., in "e-Polymer" (European Polymer Federation) (2006), No. 27, for example, describe the polymerization of 1,3-butadiene with catalytic systems comprising complexes of cobalt with bis(imino)pyridine and ethylaluminiumsesquichloride [$Al_2Et_3Cl_3$ (EASC)] ligands. Said catalytic systems have proved to be particularly active, providing polybutadienes with a high molecular weight having a content of 1,4-cis units equal to 96.4%.

Catalytic systems comprising complexes of cobalt having formula (Salen)Co(II) (wherein Salen bis(salicylaldehyde) ethylenediiminate, Co=cobalt) and methylaluminoxane (MAO), characterized by a high activity and 1,4-cis selectivity, are described, for example, by Endo K. et al., in "Journal of Polymer Science: Part A: Polymer Chemistry" (2006), Vol. 44, pages 4088-4094.

Cariou R. et al., in "Dalton Transactions" (2010), Vol. 39, pages 9039-9045, describe the synthesis and characterization of a series of complexes of cobalt (II) [Co(II)] with bis(benzimidazole) which, combined with methylaluminoxane (MAO), have proved to be highly selective for the 1,4-cis polymerization of 1,3-butadiene.

The synthesis and characterization of a series of complexes of cobalt (II) [Co(II)] with dibenzimidazole ligands and their use, combined with ethylaluminiumsesquichloride (EASC), for the polymerization of 1,3-butadiene, are described by Appukuttan et al., in "Polymer" (2009), Vol. 50, pages 1150-1158: the catalytic systems obtained are characterized by both a high catalytic activity and also a high 1,4-cis selectivity (up to 97%).

Complexes of cobalt with 2,6-bis[1-(iminophenyl)ethyl] pyridine ligands were synthesized and characterized by Gong D. et al., as described in "Polymer" (2009), Vol. 50, pages 6259-6264. Said complexes, combined with methylaluminoxane (MAO), were tested for the polymerization of 1,3-butadiene, providing catalytic systems capable of giving 1,4-cis or 1,4-trans polybutadiene, in relation to the MAO/Co ratio. Operating at a molar ratio MAO/Co equal to 50, an essentially 1,4-trans (about 94.4%) polybutadiene was in fact obtained, whereas, operating at a molar ratio MAO/Co equal to 100, a prevalently 1,4-cis (about 79%) polybutadiene was obtained.

Appukuttan V. et al., in "Journal of Molecular Catalysis A: Chemical (2010), Vol. 325, pages 84-90, describe a series of complexes having general formula [Py(Bm-R)$_2$]CoCl$_2$ (wherein Py=pyridyl, Bm=benzimidazolyl, R=hydrogen, methyl, benzimidazole, Co=cobalt, Cl=chlorine), capable of providing, combined with methylaluminoxane (MAO), high-molecular-weight 1,4-cis polybutadiene.

Gong D. et al., in "Journal of Organometallic Chemistry" (2011), Vol. 696, pages 1584-1590, describe a series of 2,6-bis(imino)pyridine complexes of cobalt (II) [Co(II)] which, combined with methylaluminoxane (MAO) as co-catalyst, show a relatively good activity in the polymerization of 1,3-butadiene, allowing a polybutadiene having a 1,4-cis microstructure within a range of 77.5% to 97% to be obtained, and allowing both the molecular weight and the molecular weight distribution to be controlled.

Finally, Jie S. et al., in "Dalton Transactions" (2011), Vol. 40, pages 10975-10982 and Ai P. et al., in "Journal of Organometallic Chemistry" (2012), Vol. 705, pages 51-58, have recently described the possibility of obtaining polybutadiene with a high content of 1,4-cis units (>96%) with catalytic systems comprising catalysts based on complexes of cobalt with 3-aryliminomethyl-2-hydroxybenzaldehyde ligands, or with ligands of the NNO (imino- or aminopyridyl alcohols) type, respectively.

Symmetrical or asymmetrical, diblock or triblock polymers based on butadiene are also known in the art, which, however, differ enormously from the stereospecific diblock polybutadiene object of the present invention, from the point of view of both the composition and microstructure, and also of the production method. The diblock or triblock polymers known in the art are in fact essentially obtained by post-modification reactions (e.g., grafting) of various homopolymers, or by anionic polymerization, using lithiumalkyls as reagents, or by emulsion polymerization, using radical initiators. Said diblock or triblock polymers often consist of the joining of polybutadiene blocks having different structures (prevalently, a 1,4-trans structure, as this is the predominant structure in the anionic or radicalic polymerization of butadiene) with blocks of polyisoprene, styrene or styrene-butadiene. In particular, it should be pointed out that in a block of polybutadiene having a 1,4-trans structure, the double bonds are along the main chain, whereas in the block of polybutadiene having a syndiotactic 1,2 structure of the stereoregular diblock polybutadiene object of the present invention, the double bonds are outside the main chain.

Further details relating to the above diblock or triblock polymers can be found, for example, in: Szwark M. et al., "Journal of the American Chemical Society" (1956), Vol. 78, para. 2656; Hsieh H. L. et al., "Anionic polymerization: principles and practical applications" (1996), 1$^{st}$ Ed., Marcel Dekker, New York; Lovell P. A. et al., "Emulsion polymerization and emulsion polymers" (1997), Wiley New York; Xie H. et al., "Journal of Macromolecular Science: Part A—Chemistry" (1985), Vol. 22 (10), pages 1333-1346; Wang Y. et al., "Journal of Applied Polymer Science" (2003), Vol. 88, pages 1049-1054.

It is also well-known that although anionic or radicalic polymerizations allow the composition of the diblock or triblock polymers obtained to be controlled (i.e. the percentage of comonomers present), they are not able to exert an adequate control on the type of stereoregularity of the blocks (e.g., in the case of butadiene, the 1,4-cis vs. 1,2 vs. 1,4-trans selectivity) contrary to what happen on the stereospecific polymerization.

Zhang X. et al., in "Polymer" (2009), Vol. 50, pages 5427-5433, for example, describe the synthesis and the characterization of triblock polybutadienes containing a block of crystallizable high 1,4-trans polybutadiene. Said synthesis was carried out by means of the sequential anionic polymerization of butadiene, in the presence of the barium salt of di(ethyleneglycol)ethylether/tri-iso-butyl-aluminium/-dilithium (BaDEGEE/TIBA/DLi), as initiator. The triblock polybutadienes thus obtained were analyzed and showed the following composition: high 1,4-trans-b-low 1,4-cis-b-high 1,4-trans (HTPB-b-LCPB-b-HTPBs). Said triblock polybutadienes consisted of an elastic block with a low content of 1,4-cis units chemically bound to blocks with a high content of crystallizable 1,4-trans units. The ratio between the (HTPB:LCPB:HTPBs) blocks was the following: 25:50:25. The triblock polybutadienes HTPB-b-LCPB-b-HTPBs obtained consisted of the LCPB block with a 1,4-trans content equal to 52.5% and of the HTPB blocks with a 1,4-trans content ranging from 55.9% to 85.8%. These values clearly indicate that the stereoregularity of the blocks is not high. The triblock polybutadienes obtained showed a glass transition temperature ($T_g$) equal to about −92° C. and, only in the presence of a 1,4-trans content >70%, a crystallization temperature ($T_c$) equal to about −66° C.

Analogously, Zhang X. et al., in "*Polymer Bulletin*" (2010), Vol. 65, pages 201-213, describe the synthesis and the characterization of triblock copolymers containing a block of crystallizable high 1,4-trans polybutadiene. Various triblock copolymers containing a block of crystallizable high 1,4-trans polybutadiene were synthesized by means of the sequential anionic polymerization of 1,3-butadiene (Bd) with isoprene (Ip) or styrene (St), in the presence of the barium salt of di(ethyleneglycol)ethylether/tri-iso-butyl-aluminium/-dilithium (BaDEGEE/TIBA/DLi), as initiator. The results obtained from the analysis of said triblock copolymers indicated that the medium-3,4-polyisoprene-b-high-1,4-trans-polybutadiene-b-medium 3,4-polyisoprene copolymers and the polystyrene-b-high-1,4-trans-polybutadiene-b-polystyrene copolymers, had a block of polybutadiene having a high content of 1,4-trans units (maximum content equal to 83%), blocks of polyisoprene having a medium content of 3,4 units (content ranging from 22% to 27%) and a total content of 1,4 (cis+trans) units ranging from 72% to 80%, whereas the blocks of polystyrene proved to be atactic. Said copolymers had a glass transition temperature ($T_g$) equal to about −80° C. and a melting point ($T_m$) equal to about 3° C.

From what is indicated above, it can therefore be easily deduced that the various studies carried out for improving/controlling the stereoregularity of diblock or triblock polymers based on butadiene, have proved to be unsatisfactory.

Another means adopted, again with the objective of improving/controlling the stereoregularity of diblock or triblock polymers based on butadiene, was the use of coordination catalysts based on transition metals.

In this respect, for example, Naga N. et al. in "*Journal of Polymer Science Part A: Polymer Chemistry*" (2003), Vol. 41 (7), pages 939-946 and the European patent application EP 1,013,683, indicate the use of the catalytic complex CpTiCl$_3$/MAO (wherein Cp=cyclopentadienyl, Ti=titanium, Cl=chlorine, MAO=methylaluminoxane) as catalyst, in order to synthesize block copolymers containing polybutadiene blocks having a 1,4-cis structure and blocks of polystyrene having a syndiotactic structure. Also in this case, however, block copolymers were not obtained but rather copolymers having random multi-sequences, also due to a loss in the living nature of the polymerization.

Ban H. T. et al. in "*Journal of Polymer Science Part A: Polymer Chemistry*" (2005), Vol. 43, pages 1188-1195, using the catalytic complex Cp*TiMe$_3$/B(C$_6$F$_5$)$_3$/AlR$_3$ (wherein Cp=cyclopentadienyl, Ti=titanium, Me=methyl, B(C$_6$F$_5$)$_3$=tris(pentafluorophenyl)borane, AlR$_3$=trialkylaluminium) and Caprio M. et al. in "*Macromolecules*" (2002), Vol. 35, pages 9315-9322, using a similar catalytic complex, i.e. CpTiCl$_3$/Ti(OR$_4$)/MAO (wherein Cp=cyclopentadienyl, Ti=titanium, Cl=chlorine, R=alkyl, MAO=methylaluminoxane), obtained, operating under specific polymerization conditions, multi-block copolymers containing blocks of polystyrene with a syndiotactic structure and blocks of polybutadiene with a 1,4-cis structure. Operating under drastic conditions, in particular, at low polymerization temperatures (−20° C. for the block of syndiotactic polystyrene and −40° C. for the block of 1,4-cis polybutadiene), in order to maintain the living nature of the polymerization, Ban H. T. et al. obtained, with low yields, a copolymer having a block of syndiotactic polystyrene (content of syndiotactic units >95%) and a block of 1,4-cis polybutadiene (content of 1,4-cis units ≅70%), which showed a melting point ($T_m$) equal to 270° C., attributed to the block of syndiotactic polystyrene. Caprio M. et al., on the other hand, operating at a polymerization temperature ranging from 25° C. to 70° C., obtained, with low yields, a multi-block copolymer having sequences of syndiotactic polystyrene, amorphous polystyrene and polybutadiene with a prevalently 1,4-cis structure. Using the above catalytic complexes, however, the control of the composition of the final copolymer was poor, requiring, among other things, a fractionation of the product obtained at the end of the polymerization in order to recover the copolymer of interest.

American patent U.S. Pat. No. 4,255,296 describes a composition comprising a polybutadiene rubber containing a polymer obtained through the block polymerization or graft polymerization of 1,4-cis polybutadiene with syndiotactic 1,2-polibutadiene, whose microstructure comprises a content of 1,4-cis units ranging from 78% by weight to 93% by weight and a content of syndiotactic 1,2 units ranging from 6% by weight to 20% by weight, at least 40% by weight of said syndiotactic 1,2-polibutadiene being crystallized and having a form of the short-fiber type having an average diameter ranging from 0.05 μm to 1 μm and an average length ranging from 0.8 μm to 10 μm. As the joining of the blocks was not carried out via synthesis but by post-modification reaction (i.e. graft polymerization) on the 1,4-cis polybutadiene and on the 1,2 polybutadiene, the polymer obtained probably has multiple junction points: said polymer is consequently completely different from the diblock polybutadiene object of the present invention, obtained by means of stereospecific polymerization and wherein the two blocks, i.e. the block with a 1,4-cis structure and the block with a syndiotactic 1,2 structure, are joined to each other by means of a single junction and not interpenetrated.

American patent U.S. Pat. No. 3,817,968 describes a method for the preparation of equibinary 1,4-cis/1,2 polybutadiene, which comprises polymerizing butadiene at a temperature ranging from −80° C. to 100° C., in an inert atmosphere, in a non-aqueous medium, in the presence of a catalyst obtained from the reaction of:
(a) trialkylaluminium having general formula:

wherein R represents a linear hydrocarbon radical having from 1 to 6 carbon atoms; and
(b) dialkoxy molybdenum trichloride having formula:

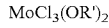

wherein R' represents a hydrocarbon radical having from 1 to 6 carbon atoms;
the molar ratio (a)/(b) being not lower than 6. The polybutadiene thus obtained has polybutadiene blocks with a 1,4-cis structure and polybutadiene blocks with a syndiotactic 1,2 structure randomly distributed along the polymeric chain, which means that neither amorphous polybutadiene blocks with a 1,4-cis structure, nor crystalline polybutadiene blocks with a 1,2 structure, are present. Also in this case, therefore, these polymers are completely different from the diblock polybutadiene object of the present invention, obtained by means of stereospecific polymerization and wherein the two blocks, i.e. the block with a 1,4-cis structure and the block with a syndiotactic 1,2 structure, are joined to each other by means of a single junction and not interpenetrated.

As specified above, as polybutadiene is among the polymers which are most widely-used industrially, in particular for the production of tires, the study of new polybutadienes is still of great interest. In particular, the study of a stereoregular diblock polybutadiene with a 1,4-cis/syndiotactic 1,2 structure which could be advantageously used in both the footwear industry (for example, in the production of shoe soles) and in the production of tires for motor vehicles and/or trucks, is of great interest.

BRIEF SUMMARY OF THE INVENTION

The Applicant has therefore considered the problem of finding a stereoregular diblock polybutadiene having a 1,4-cis/syndiotactic 1,2 structure. More specifically, the Applicant has considered the problem of finding a stereoregular diblock polybutadiene composed of a polybutadiene block having a 1,4-cis structure and a polybutadiene block having a syndiotactic 1,2 structure.

The Applicant has also found that the preparation of stereoregular diblock polybutadiene composed of a polybutadiene block having a 1,4-cis structure and a polybutadiene block having a syndiotactic 1,2 structure, can be advantageously carried out by means of a process which comprises subjecting 1,3-butadiene to total or partial stereospecific polymerization, in the presence of a catalytic system comprising at least one complex of cobalt including at least one imine nitrogen and subsequently adding at least one monodentate aromatic phosphine and optionally 1,3-butadiene, and continuing said stereospecific polymerization. In particular, the Applicant has found that the use of said complex of cobalt including at least one imine nitrogen allows a polybutadiene with a living 1,4-cis structure to be obtained and that the subsequent stereospecific polymerization of the residual, or optionally added, 1,3-butadiene, in the presence of said monodentate aromatic phosphine, is capable of giving the above stereoregular diblock polybutadiene. Furthermore, the Applicant has found that said process, by varying the addition time of said monodentate aromatic phosphine or the quantity of 1,3-butadiene, allows the length of the two blocks (i.e. the block with a 1,4-cis structure and the block with a syndiotactic 1,2 structure) to be modulated in the stereoregular diblock polybutadiene obtained, depending on the characteristics of the end-product to be obtained. The Applicant has also found that this process, by varying the type of monodentate aromatic phosphine, allows the crystallinity of the block having a syndiotactic 1,2 structure [i.e. content of syndiotactic triads [(rr) %]] to be modulated, and consequently the melting point ($T_m$), in the stereoregular diblock polybutadiene obtained, depending on the characteristics of the end-product to be obtained.

DETAILED DESCRIPTION OF THE INVENTION

Figure 1:
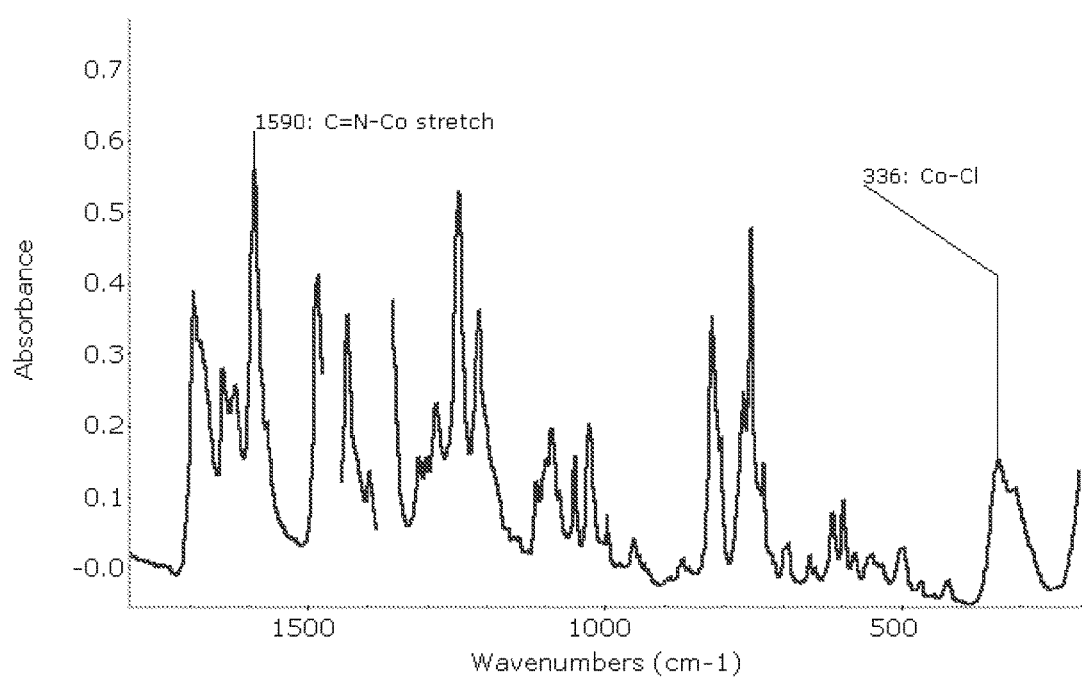
FIG. 1 shows the FT-IR spectrum of the complex $CoCl_2$ (L2)(GL923)(Example 4) (after subtraction of the nujol bands)

An object of the present invention therefore relates to a stereoregular diblock polybutadiene composed of a polybutadiene block with a 1,4-cis structure and a polybutadiene block with a syndiotactic 1,2 structure, having the following formula (I):

wherein:
PB$_1$ corresponds to the polybutadiene block having a 1,4-cis structure;
PB$_2$ corresponds to the polybutadiene block having a syndiotactic 1,2 structure;
essentially free of 1,4-trans units.

For the aim of the present description and of the following claims, the term "stereoregular diblock polybutadiene" means a polybutadiene in which only two polybutadiene blocks are present, having a different structure, i.e. a 1,4-cis structure and a syndiotactic 1,2 structure, joined to each other through a single junction and not interpenetrated.

For the aim of the present description and of the following claims, the term "essentially free of 1,4-trans units" means that, when present, said 1,4-trans units are present in a quantity lower than 3% molar, preferably lower than 1% molar, with respect to the total molar quantity of the butadiene units present in said stereoregular diblock polybutadiene.

For the aim of the present description and of the following claims, the definitions of the numerical ranges always comprise the extremes unless otherwise specified.

For the aim of the present description and of the following claims, the term "comprising" also includes the terms "which essentially consists of" or "which consists of".

According to a preferred embodiment of the present invention, said stereoregular diblock polybutadiene has the following characteristics:
upon infrared analysis (FT-IR), bands typical of the 1,4-cis and 1,2 units centered at 737 cm$^{-1}$ and at 911 cm$^{-1}$, respectively;
upon $^{13}$C-NMR analysis, signals characteristic of the junctions between the polybutadiene block having a 1,4-cis structure and the polybutadiene block having a 1,2 structure at 30.7 ppm, at 25.5 ppm and at 41.6 ppm.

The infrared analysis (FT-IR) and the $^{13}$C-NMR analysis were carried out as indicated hereunder in the paragraph "Analysis and characterization methods".

According to a further preferred embodiment of the present invention, in said stereoregular diblock polybutadiene:
the block having a 1,4-cis structure can have a glass transition temperature (T$_g$) lower than or equal to –100° C., preferably ranging from –104° C. to –113° C., a melting point (T$_m$) lower than or equal to –2° C., preferably ranging from –5° C. to –20° C., and a crystallization temperature (T$_c$) lower than or equal to –25° C., preferably ranging from –30° C. to –54° C.;
the block having a syndiotactic 1,2 structure can have a glass transition temperature (T$_g$) lower than or equal to –10° C., preferably ranging from –14° C. to –24° C., a melting point (T$_m$) higher than or equal to 70° C., preferably ranging from 95° C. to 140° C., and a crystallization temperature (T$_c$) higher than or equal to 55° C., preferably ranging from 60° C. to 130° C.

It should be pointed out that the wide range within which the melting point (T$_m$) and the crystallization temperature (T$_c$) of the block having a 1,2 structure vary, can be attributed to the different content of syndiotactic triads [(rr) %] which depends on the type of phosphine used in the polymerization [i.e. the degree of stereoregularity, namely the content of syndiotactic triads [(rr) %] increases with an increase in the steric hindrance of the aromatic phosphine used].

Said glass transition temperature (T$_g$), said melting point (T$_m$) and said crystallization temperature (T$_c$), were determined by means of DSC thermal analysis ("Differential Scanning calorimetry") which was carried out as indicated hereunder in the paragraph "Analysis and characterization methods".

According to a further preferred embodiment of the present invention, said stereoregular diblock polybutadiene can have a polydispersion index (PDI) corresponding to a $M_w/M_n$ ratio ($M_w$=weight average molecular weight; $M_n$=number average molecular weight) ranging from 1.9 to 2.2.

Said polydispersion index (PDI) was determined by means of GPC ("Gel Permeation Chromatography") which was carried out as indicated hereunder in the paragraph "Analysis and characterization methods".

It should be pointed out that the presence of a narrow and monomodal peak, i.e. of a polydispersion index (PDI) ranging from 1.9 to 2.2, indicates the presence of a homogeneous polymeric species, at the same time excluding the presence of two different homopolymers (i.e. homopolymers with a 1,4-cis and 1,2 structure).

It should also be pointed out that the isolated fractions (i.e. extract soluble in ether and residue insoluble in ether) obtained by subjecting the stereoregular diblock polybutadiene object of the present invention, to extraction in continuous with diethylether at boiling point, for 4 hours, always have a composition/structure completely analogous to that of the "nascent" starting polymer.

Figure 21:
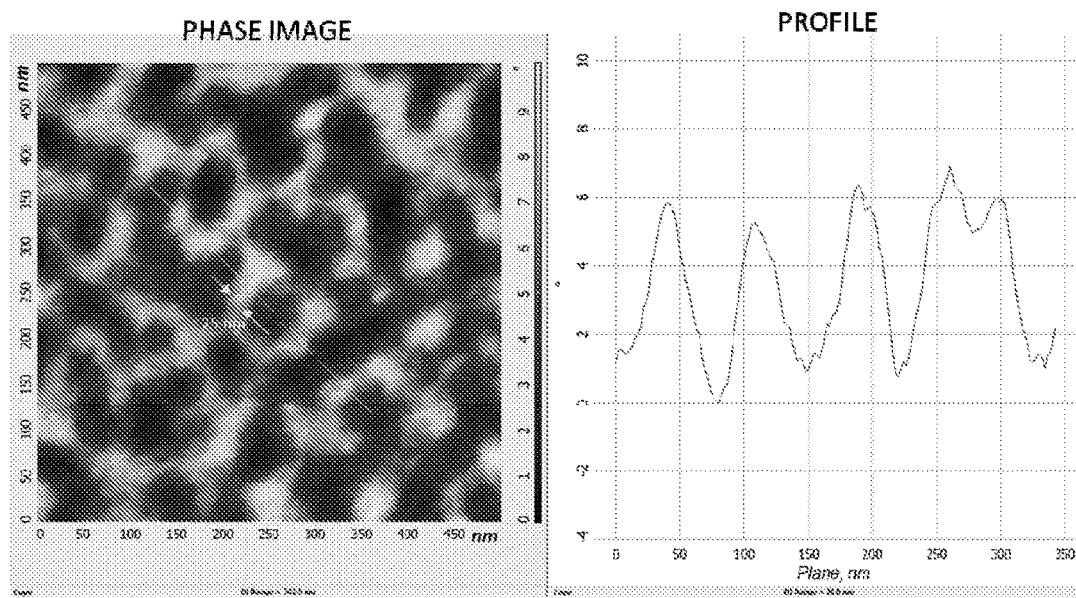
FIG. 21 relates to Atomic Force Microscopy (AFM) of the stereoregular diblock polybutadiene of Example 17 (G1132)

The stereoregular diblock polybutadiene object of the present invention, when subjected to Atomic Force Microscopy (AFM), shows two clearly distinct domains relating to the block with a 1,4-cis structure and to the block with a syndiotactic 1,2 structure and, in particular, a homogeneous distribution of said domains as shown in FIG. 21 provided hereunder.

Said Atomic Force Microscopy (AFM) was carried out as indicated hereunder in the paragraph "Analysis and characterization methods".

Figure 12A:
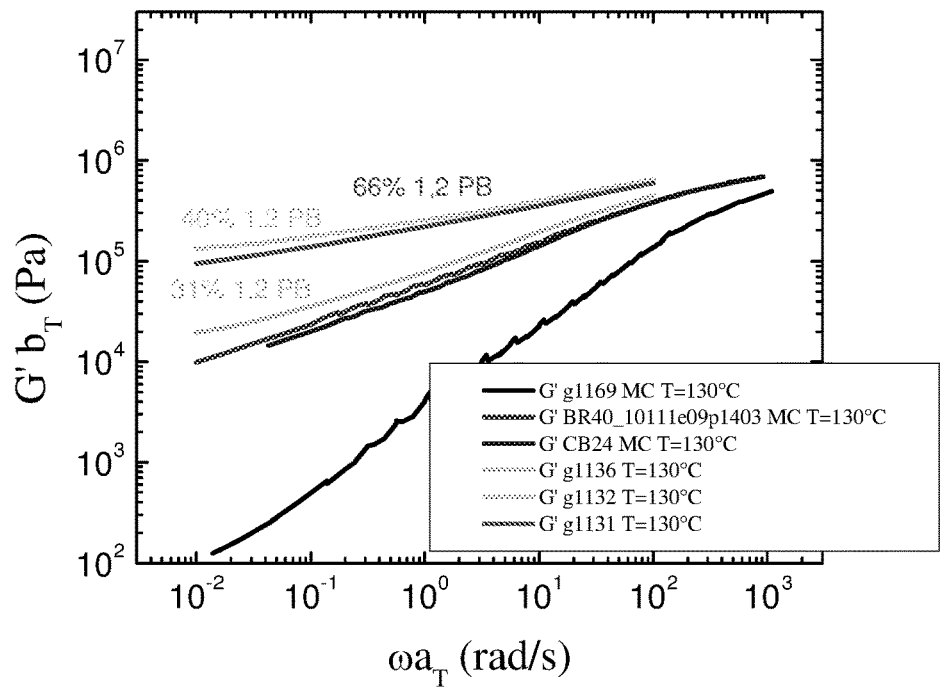
FIG. 12A shows the Elastic moduli (G') at 130° C. for the reference polybutadiene of Example 15 (G1169), for the stereoregular diblock polybutadienes of Examples 16 (G1131), 17 (G1132) and 18 (G1136) and for the samples of reference polybutadiene Europrene Neocis® BR 40 (BR40) and Buna CB 24 (CB24)
Figure 12B:
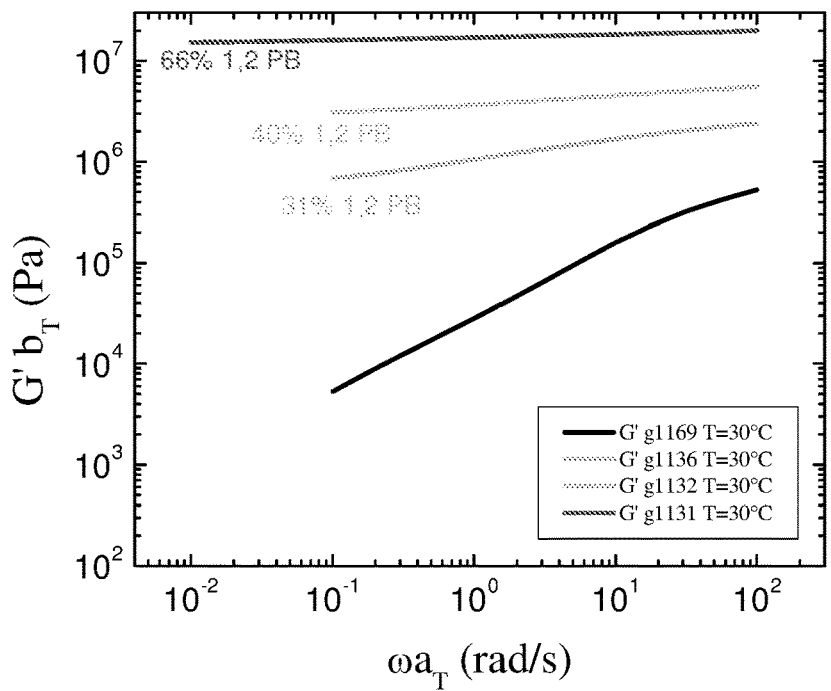
FIG. 12B shows the Elastic moduli (G') at 30° C. for the reference polybutadiene of Example 15 (G1169), for the stereoregular diblock polybutadienes of Examples 16 (G1131), 17 (G1132) and 18 (G1136) and for the samples of reference polybutadiene Europrene Neocis® BR 40 (BR40) and Buna CB 24 (CB24)
Figure 13:
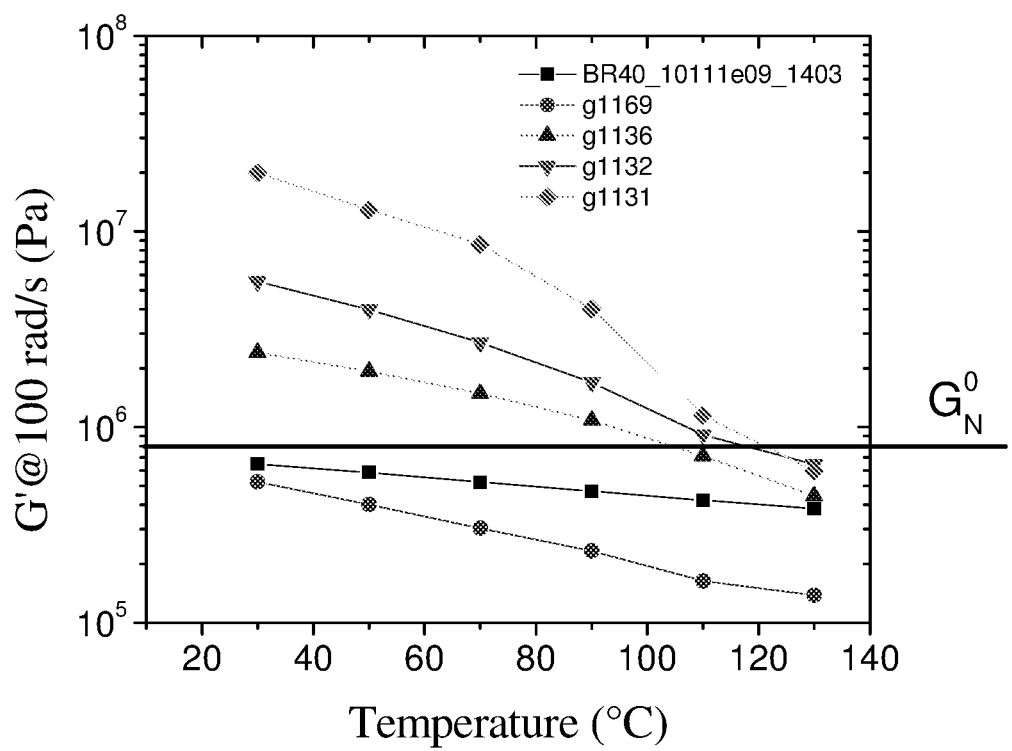
FIG. 13 shows the Elastic moduli (G') at 100 rad/s in relation to the temperature for the reference polybutadiene of Example 15 (G1169), for the diblock stereoregular polybutadienes of Examples 16 (G1131), 17 (G1132) and 18 (G1136) and for the sample of reference polybutadiene Europrene Neocis® BR 40 (BR40)

Furthermore, the stereoregular diblock polybutadiene object of the present invention, when subjected to Dynamic Mechanical Analysis (DMA), shows a elastic modulus value (G') higher than that of commercial polybutadienes (i.e. Europrene NEOCIS® BR 40 of Versalis spa and Buna CB 24 of Lanxess) as shown in FIGS. 12-14 provided hereunder.

Said Dynamic Mechanical Analysis (DMA) was carried out as indicated hereunder in the paragraph "Analysis and characterization methods".

According to a preferred embodiment of the present invention, in said stereoregular diblock polybutadiene, the polybutadiene block having a 1,4-cis structure is amorphous, at room temperature under quiescent conditions (i.e. not subjected to stress), and can have a 1,4-cis content higher than or equal to 96% molar, preferably ranging from 97% molar to 99% molar, with respect to the total molar quantity of butadiene units present in said polybutadiene block having a 1,4-cis structure.

It should be pointed out that in said polybutadiene block having a 1,4-cis structure, the complement to 100, i.e. a content lower than or equal to 4% molar, preferably ranging from 1% molar to 3% molar, can be with a 1,2 structure or, if present, with a 1,4-trans structure in the quantities indicated above.

In the stereoregular diblock polybutadiene object of the present invention, the polybutadiene block having a syndiotactic 1,2 structure can have a varying degree of crystallinity depending on the content of syndiotactic triads [(rr) %], namely the type of monodentate aromatic phosphine used: in particular, the degree of crystallinity increases with an increase in the content of syndiotactic triads [(rr) %]. Said content of syndiotactic triads [(rr) %] is preferably higher than or equal to 15%, preferably ranging from 60% to 80%.

It should be pointed out that, in the stereoregular diblock polybutadiene object of the present invention, also when the polybutadiene block having a 1,2 structure is characterized by a low content of syndiotactic triads [(rr) %] (i.e. a content ranging from 15% to 20%) and therefore it proves to be at low crystallinity, tendentially amorphous, the content of 1,2 units always remains higher than or equal to 80%.

The content of syndiotactic triads [(rr) %] was determined by means of $^{13}$C-NMR spectroscopy analysis which was carried out as indicated hereunder in the paragraph "Analysis and characterization methods".

According to a preferred embodiment of the present invention, in said stereoregular diblock polybutadiene, the 1,4-cis/1,2 molar ratio can range from 15:85 to 80:20, preferably ranging from 25:75 to 70:30.

According to a preferred embodiment of the present invention, said stereoregular diblock polybutadiene can have a weight average molecular weight ($M_w$) ranging from 100,000 g/mol to 800,000 g/mol, preferably ranging from 150,000 g/mol to 600,000 g/mol.

The analyses and the characterization to which the stereoregular diblock polybutadiene object of the present invention, was subjected, show that it can have the following characteristics:

the polybutadiene block with a syndiotactic 1,2 structure (hard block), when present in crystalline form, under conditions in which the polybutadiene with a 1,4-cis structure is amorphous (soft block), i.e. at room temperature under quiescent conditions, can act as a hard filler (see FIG. 13 and FIG. 14 which provide a comparison with the theoretical trends envisaged by the Guth-Gold and Thomas laws as described, for example, in Eggers E. et al., "*Rubber Chemistry and Technology*" (1996), Vol. 69, No. 2, pages 253-265 and references indicated therein);

upon high-temperature Dynamic Mechanical Analysis (DMA), in particular at 130° C. (see FIG. 12), the stereoregular diblock polybutadiene shows a behaviour typical of branched systems characterized by phase separation between the hard block and soft block; the block with a syndiotactic 1,2 structure (hard block), in fact, in high-temperature phase separation, mainly acts as a branching point, in particular when it is present in a minority percentage, as long as the temperature remains lower than the order-disorder temperature (ODT) of the stereoregular diblock polybutadiene; furthermore, the presence of phase separation at a temperature lower than the order-disorder temperature (ODT) and, even more so, at a temperature lower than the melting point ($T_m$) of the polybutadiene block with a syndiotactic 1,2 structure (hard block), gives the stereoregular diblock polybutadiene properties typical of a thermoplastic elastomer [in this respect, reference should be made to what is described, for example, in: "*Thermoplastic Elastomers*" (2004), 3rd edition, Holden, G., Kricheldorf., H. R., and Quirk, R. P., Eds., Hanser Publishers, Munich; I. W. Hamley, "*The Physics of Block Copolymers*" (1998), Hamley I. W., Oxford University Press], particularly evident when the polybutadiene block with a 1,4-cis structure (soft block) is present in a higher percentage;

upon low-temperature Dynamic Mechanical Analysis (DMA), i.e. at a temperature lower than the melting point ($T_m$) of the polybutadiene block with a syndiotactic 1,2 structure (hard block), the stereoregular diblock polybutadiene shows a much higher elastic modulus value (G') with respect to commercial polybutadienes with a high 1,4-cis content (see FIG. 13 and FIG. 14) mainly due to the hardness of the polybutadiene block with a syndiotactic 1,2 structure (hard block), present in crystalline form.

It should also be pointed out that the stereoregular diblock polybutadiene object of the present invention, has numerous differences with respect to both commercial polybutadienes with a high 1,4-cis structure, and also the reference homopolymers obtained as described in the following examples, such as, for example:

the response to Dynamic Mechanical Analysis (DMA) of stereoregular diblock polybutadiene becomes increasingly more complex from a thermo-rheological point of view (e.g., failure of the time-temperature superposition with an increase in the percentage of the polybutadiene block with a syndiotactic 1,2 structure (hard block) present in said stereoregular diblock polybutadiene (see FIG. 15 which shows the Van Gurp-Palmen diagrams of various polybutadienes), due to the phase transition (transition of the first order) of said polybutadiene block with a syndiotactic 1,2 structure (hard block); said phase transition allows the dynamic-mechanical characteristics of the stereoregular diblock polybutadiene to vary considerably with a variation in the temperature, thus allowing them to be regulated in relation to the final application; furthermore, said phase transition can be regulated and consequently also the complexity from a thermo-rheological point of view of said stereoregular diblock polybutadiene, and its mechanical performances in general, not only by regulating the stereoregularity of the polybutadiene block with a syndiotactic 1,2 structure (i.e. by varying the content of syndiotactic triads [(rr) %]), but also by regulating both the molecular weight of said polybutadiene block with a syndiotactic 1,2 structure (hard block), and also the percentage of polybutadiene block with a syndiotactic 1,2 structure (hard block) present in said stereoregular diblock polybutadiene [further details relating to these diagrams can be found, for example, in: Van Gurp M. et al., "Rheological Bulletin" (1998), Vol. 67, pages 5-8; Trinckle S. et al., "Rheological Acta" (2001), Vol. 40, pages 322-328; Trinckle S. et al., "Rheological Acta" (2002), Vol. 41, pages 103-113];

the possibility, in the stereoregular diblock polybutadiene, of selectively cross-linking (for example, in the presence of peroxides and/or sulfur and, optionally, of adjuvant agents), only one of the two blocks, in particular the polybutadiene block with a 1,4-cis structure (soft block), by mixing the cross-linking ingredients with the stereoregular diblock polybutadiene at a temperature lower than the melting point ($T_m$) of the polybutadiene block with a syndiotactic 1,2 structure (hard block), so as to reduce or even to prevent the dispersion of said ingredients in the polybutadiene block with a syndiotactic 1,2 structure (hard block);

the possibility of increasing, with respect to a homopolymer having a 1,4-cis structure, the tendency of the polybutadiene block with a 1,4-cis structure (soft block) to crystallize, also at temperatures higher than the melting point ($T_m$) of said block under quiescent conditions, under the action of a deformation or stress imposed from the outside; thanks to the presence of the polybutadiene block with a syndiotactic 1,2 structure (hard block) that acts as a branching point and consequently increases the viscoelastic memory of the stereoregular diblock polybutadiene (with respect to the positive of the viscoelastic memory on the crystallization induced by the deformation, reference should be made, for example, to Coppola S. et al., "Macromolecules" (2001), Vol. 34, pages 5030-5036); this possibility can allow the stereoregular diblock polybutadiene to be used in elastomeric blends, in particular in elastomeric blends for tire sidewalls, preferably in the presence of 1,4-cis polybutadiene and/or of natural rubber (it is, in fact, known in literature, as described, for example, by Santangelo P. G. et al. in "Rubber Chemistry & Technology" (2003), Vol. 76, No. 4, pages 892-898, that rubbers that have the possibility of crystallizing due to a deformation and/or to a stress imposed from the outside, positively contribute to the fatigue resistance of elastomeric blends).

It should also be pointed out that, unlike what is the case, for example, with polystyrene-polydiene copolymers known in the art, in which the polystyrene block cannot be cross-linked in the presence of sulfur alone as crosslinking agent due to the absence of isolated residual double bonds, in the stereoregular diblock polybutadiene object of the present invention, both blocks, i.e. both the polybutadiene block with a syndiotactic 1,2 structure (hard block), and the polybutadiene block with a 1,4-cis structure (soft block), can be crosslinked (for example, in the presence of peroxides and/or sulfur and optionally of adjuvant agents), operating according to procedures known in literature for the cross-linking of diene polymers (in this respect, reference should be made to what is described, for example, in: "Science and Technology of Rubber" (2005), Mark J. E., Erman B., Eirich F. R., Eds., 3rd edition, Elsevier; "Rubber Technology" (1987), Morton M. Ed., 3rd edition, Van Nostrand Reinhold; "Rubber Compounding—Chemistry and Applications" (2004), Rodgers B. Ed., Marcel Dekker; ASTM D3189; ASTM D3186; ISO 2476: 2009, and subsequent updates).

As already indicated above, the present invention also relates to a process for the preparation of a stereoregular diblock polybutadiene composed of a polybutadiene block having a 1,4-cis structure and a polybutadiene block having a syndiotactic 1,2 structure.

A further object of the present invention therefore relates to a process for the preparation of a stereoregular diblock polybutadiene composed of a polybutadiene block having a 1,4-cis structure and a polybutadiene block having a syndiotactic 1,2 structure, which comprises:

subjecting 1,3-butadiene to total or partial stereospecific polymerization in the presence of a catalytic system comprising at least one complex of cobalt including at least one imine nitrogen, in order to obtain polybutadiene with a living 1,4-cis structure;

adding at least one monodentate aromatic phosphine and optionally 1,3-butadiene, and continuing said stereospecific polymerization, in order to obtain said stereoregular diblock polybutadiene composed of a polybutadiene block having a 1,4-cis structure and a polybutadiene block having a 1,2 syndiotactic structure.

For the aim of the present description and of the following claims, said imine nitrogen can be part of a pyridine ring.

According to a preferred embodiment of the present invention, said complex of cobalt including at least one imine nitrogen can be selected from bis-imine complexes of cobalt having general formula (I):

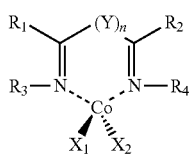 (I)

wherein:

n is 0 or 1;

Y represents a group —CR'R" wherein R' and R", the same or different, represent a hydrogen atom, or a linear or branched $C_1$-$C_{20}$, preferably $C_1$-$C_{15}$, alkyl group; or a divalent aromatic group optionally substituted;

$R_1$ and $R_2$, the same or different, represent a hydrogen atom, or they are selected from a linear or branched $C_1$-$C_{20}$, preferably $C_1$-$C_{15}$, alkyl group optionally halogenated, cycloalkyl groups optionally substituted; or $R_1$ and $R_2$ can be optionally bound to each other to form, together with the other atoms to which they are bound, a cycle containing from 4 to 6 carbon atoms, saturated, unsaturated, or aromatic, optionally substituted with linear or branched $C_1$-$C_{20}$, preferably $C_1$-$C_{15}$, alkyl groups, said cycle optionally containing heteroatoms such as, for example, oxygen, sulfur, nitrogen, silicon, phosphorous, selenium;

$R_3$ and $R_4$, the same or different, represent a hydrogen atom, or they are selected from a linear or branched $C_1$-$C_{20}$, preferably $C_1$-$C_{15}$, alkyl group optionally halogenated, cycloalkyl groups optionally substituted; aryl groups optionally substituted;

or $R_2$ and $R_4$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;

or $R_1$ and $R_3$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;

$X_1$ and $X_2$, the same or different, represent a halogen atom such as chlorine, bromine, iodine; or they are selected from linear or branched $C_1$-$C_{20}$, preferably $C_1$-$C_{15}$, alkyl groups, —$OCOR_5$ groups or —$OR_5$ groups wherein $R_5$ is selected from linear or branched $C_1$-$C_{20}$, preferably $C_1$-$C_{15}$, alkyl groups.

According to a preferred embodiment of the present invention, in said bis-imine complexes of cobalt having general formula (I):

n is 0;

$R_1$ and $R_2$, the same or different, are a hydrogen atom, or they are selected from linear or branched $C_1$-$C_{20}$ alkyl groups, preferably are a methyl group;

$R_3$ and $R_4$, the same or different, are selected from phenyl groups optionally substituted with linear or branched $C_1$-$C_{20}$ alkyl groups, preferably substituted with one or more methyl, ethyl, iso-propyl, tert-butyl groups;

$X_1$ and $X_2$, the same as each other, are a halogen atom such as, for example, chlorine, bromine, iodine, preferably chlorine.

According to a further preferred embodiment of the present invention, in said bis-imine complexes of cobalt having general formula (I):

n is 1;

Y is a CR'R" group wherein R' and R", the same or different, are a hydrogen atom, or they are selected from linear or branched $C_1$-$C_{20}$ alkyl groups, preferably are a propyl group;

$R_1$ and $R_2$, the same or different, are a hydrogen atom, or they are selected from linear or branched $C_1$-$C_{20}$ alkyl groups, preferably are a methyl group;

$R_3$ and $R_4$, the same or different, are selected from phenyl groups optionally substituted with linear or branched $C_1$-$C_{20}$ alkyl groups, preferably substituted with one or more methyl, ethyl, iso-propyl, tert-butyl groups;

$X_1$ and $X_2$, the same as each other, are a halogen atom such as, for example, chlorine, bromine, iodine, preferably chlorine.

According to a further preferred embodiment of the present invention, in said bis-imine complexes of cobalt having general formula (I):

n is 0;

$R_1$ and $R_3$, are bound to each other and, together with the other atoms to which they are bound, form a pyridine;

$R_2$ is a hydrogen atom, or it is selected from linear or branched $C_1$-$C_{20}$ alkyl groups, preferably is a methyl group;

$R_4$ is selected from phenyl groups optionally substituted with linear or branched $C_1$-$C_{20}$ alkyl groups, preferably a phenyl group substituted with one or more methyl, ethyl, iso-propyl, tert-butyl groups;

$X_1$ and $X_2$, the same as each other, are a halogen atom such as, for example, chlorine, bromine, iodine, preferably chlorine.

According to a further preferred embodiment of the present invention, in said bis-imine complexes of cobalt having general formula (I):

n is 1;

Y is a bivalent aromatic group optionally substituted, preferably is a meta-phenylene group;

$R_1$ and $R_2$, the same or different, represent a hydrogen atom, or they are selected from linear or branched $C_1$-$C_{20}$ alkyl groups, preferably represent a methyl group;

$R_3$ and $R_4$, the same or different, are selected from phenyl groups optionally substituted with linear or branched $C_1$-$C_{20}$ alkyl groups, preferably are a phenyl group substituted with a methyl group;

$X_1$ and $X_2$, the same as each other, are a halogen atom such as, for example, chlorine, bromine, iodine, preferably chlorine.

Further details relating to said bis-imine complexes of cobalt having general formula (I), together with their preparation, can be found in Italian patent application MI2012A002199 in the name of the Applicant, whose content is incorporated herein as reference.

According to a further preferred embodiment of the present invention, said complex of cobalt including at least one imine nitrogen can be selected from oxo-nitrogenated complexes of cobalt having general formula (Ia):

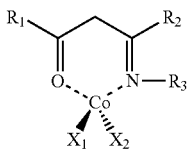

(Ia)

wherein:
R₁ and R₂, the same or different, represent a hydrogen atom, or they are selected from linear or branched $C_1$-$C_{20}$, preferably $C_1$-$C_{15}$, alkyl groups optionally halogenated, cycloalkyl groups optionally substituted, aryl groups optionally substituted;
R₃ represents a hydrogen atom, or it is selected from linear or branched $C_1$-$C_{20}$, preferably $C_1$-$C_{15}$, alkyl groups optionally halogenated, cycloalkyl groups optionally substituted; aryl groups optionally substituted; or R₃ represents a ketoimine group having formula:

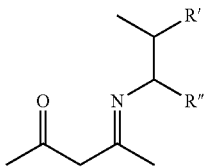

wherein R' and R", the same or different, represent a hydrogen atom, or they are selected from linear or branched $C_1$-$C_{20}$, preferably $C_1$-$C_{15}$, alkyl groups, cycloalkyl groups optionally substituted, aryl groups optionally substituted;
X₁ and X₂, the same or different, represent a halogen atom such as chlorine, bromine, iodine; or they are selected from linear or branched $C_1$-$C_{20}$, preferably $C_1$-$C_{15}$, alkyl groups, —OCOR₄ groups or —OR₄ groups wherein R₄ is selected from linear or branched $C_1$-$C_{20}$, preferably $C_1$-$C_{15}$, alkyl groups.

According to a preferred embodiment of the present invention, in said oxo-nitrogenated complexes of cobalt having general formula (Ia):
R₁ and R₂, the same as each other, are a hydrogen atom; or they are selected from linear or branched $C_1$-$C_{20}$ alkyl groups, preferably are a methyl group;
R₃ is selected from linear or branched $C_1$-$C_{20}$ alkyl groups or from phenyl groups optionally substituted with linear or branched $C_1$-$C_{20}$ alkyl groups; preferably substituted with one or more methyl, ethyl, iso-propyl, tert-butyl groups; or R₃ represents a ketoimine group having formula:

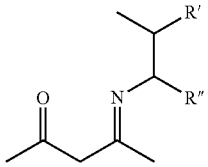

wherein R' and R", the same as each other, represent a hydrogen atom;
X₁ and X₂, the same as each other, represent a halogen atom such as, for example, chlorine, bromine, iodine, preferably chlorine.

Further details relating to said oxo-nitrogenated complexes of cobalt having general formula (Ia), together with their preparation, can be found in Italian patent application MI2012A002201 in the name of the Applicant, whose content is incorporated herein as reference.

According to a further preferred embodiment of the present invention, said complex of cobalt including at least one imine nitrogen can be selected from oxo-nitrogenated complexes of cobalt having general formula (Ib):

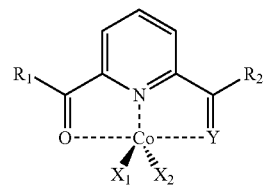

(Ib)

wherein
R₁ and R₂, the same or different, represent a hydrogen atom, or they are selected from linear or branched $C_1$-$C_{20}$, preferably $C_1$-$C_{15}$, alkyl groups, optionally halogenated, cycloalkyl groups optionally substituted, aryl groups optionally substituted;
Y represents an oxygen atom; or a —N—R₃ group wherein R₃ represents a hydrogen atom, or it is selected from linear or branched $C_1$-$C_{20}$, preferably $C_1$-$C_{15}$, alkyl groups optionally halogenated, cycloalkyl groups optionally substituted, aryl groups optionally substituted;
or, when Y represents a —N—R₃ group, R₂ and R₃ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing heteroatoms such as, for example, oxygen, sulfur, nitrogen, silicon, phosphorous, selenium;
X₁ and X₂, the same or different, represent a halogen atom such as chlorine, bromine, iodine; or they are selected from linear or branched $C_1$-$C_{20}$, preferably $C_1$-$C_{15}$, alkyl groups, —OCOR₄ groups or —OR₄ groups wherein R₄ is selected from linear or branched $C_1$-$C_{20}$, preferably $C_1$-$C_{15}$, alkyl groups.

According to a preferred embodiment of the present invention, in said oxo-nitrogenated complexes of cobalt having general formula (Ib):
R₁ and R₂, the same or different, are a hydrogen atom; or they are selected from linear or branched $C_1$-$C_{20}$ alkyl groups, preferably are a methyl group;
Y is an oxygen atom; or it is a —N—R₃ group wherein R₃ is selected from phenyl groups substituted with linear or branched $C_1$-$C_{20}$ alkyl groups, preferably substituted with one or more methyl, ethyl, iso-propyl, tert-butyl groups;
X₁ and X₂, the same as each other, are a halogen atom such as, for example, chlorine, bromine, iodine, preferably chlorine.

Further details relating to said oxo-nitrogenated complexes of cobalt having general formula (Ib), together with their preparation, can be found in Italian patent application MI2012A002203 in the name of the Applicant, whose content is incorporated herein as reference.

According to a further preferred embodiment of the present invention, said complex of cobalt including at least one imine nitrogen can be selected from bis-imine-pyridine complexes of cobalt having general formula (Ic):

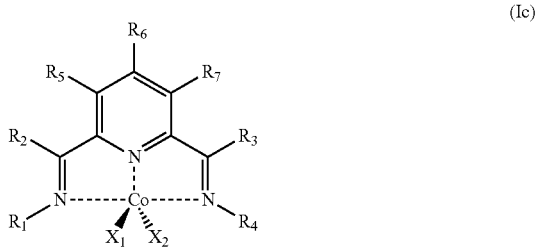

(Ic)

wherein:
- $R_2$ and $R_3$, the same or different, represent a hydrogen atom, or they are selected from linear or branched $C_1$-$C_{20}$, preferably $C_1$-$C_{15}$, alkyl groups, optionally halogenated, cycloalkyl groups optionally substituted, aryl groups optionally substituted;
- $R_1$ and $R_4$, different from each other, represent a hydrogen atom, or they are selected from linear or branched $C_1$-$C_{20}$, preferably $C_1$-$C_{15}$, alkyl groups, optionally halogenated, cycloalkyl groups optionally substituted, aryl groups optionally substituted, arylalkyl groups;
- or $R_1$ and $R_2$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- or $R_3$ and $R_4$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- $R_5$, $R_6$ and $R_7$, the same or different, represent a hydrogen atom, or they are selected from linear or branched $C_1$-$C_{20}$, preferably $C_1$-$C_{15}$, alkyl groups, optionally halogenated, cycloalkyl groups optionally substituted, aryl groups optionally substituted, arylalkyl groups;
- or $R_5$ and $R_6$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- or $R_6$ and $R_7$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$, preferably $C_1$-$C_{15}$, alkyl groups, said cycle optionally containing other heteroatoms such as, for example, oxygen, sulfur, nitrogen, silicon, phosphorous, selenium;
- $X_1$ and $X_2$, the same or different, represent a halogen atom such as chlorine, bromine, iodine; or they are selected from linear or branched $C_1$-$C_{20}$, preferably $C_1$-$C_{15}$, alkyl groups, —OCOR$_8$ groups or —OR$_8$ groups wherein R$_8$ is selected from linear or branched $C_1$-$C_{20}$, preferably $C_1$-$C_{15}$ alkyl groups.

According to a preferred embodiment of the present invention, in said bis-imine-pyridine complexes of cobalt having general formula (Ic):
- $R_2$ and $R_3$, the same or different, are a hydrogen atom; or they are selected from linear or branched $C_1$-$C_{20}$ alkyl groups, preferably are a methyl group;
- $R_1$ and $R_4$, different from each other, are a hydrogen atom; or they are selected from linear or branched $C_1$-$C_{20}$ alkyl groups, preferably methyl, ethyl, n-propyl, iso-propyl, n-butyl, s-butyl, iso-butyl, tert-butyl, cycloalkyl groups optionally substituted, preferably cyclohexyl, phenyl groups optionally substituted with linear or branched $C_1$-$C_{20}$ alkyl groups, preferably substituted with one or more iso-propyl, tert-butyl groups; arylalkyl groups, preferably benzyl;
- $R_5$, $R_6$ and $R_7$, the same or different, represent a hydrogen atom; or they are selected from linear or branched $C_1$-$C_{20}$ alkyl groups, preferably methyl, ethyl, n-propyl, iso-propyl, n-butyl, s-butyl, iso-butyl, tert-butyl;
- $X_1$ and $X_2$, the same as each other, are a halogen atom such as, for example, chlorine, bromine, iodine, preferably chlorine.

Further details relating to said bis-imine-pyridine complexes of cobalt having general formula (Ic), together with their preparation, can be found in Italian patent application MI2012A002206 in the name of the Applicant, whose content is incorporated herein as reference.

The complex of cobalt including at least one imine nitrogen should be considered as being, in accordance with the present invention, in any physical form such as, for example, isolated and purified solid form, solvated form with a suitable solvent, or supported form on suitable organic or inorganic solids, preferably having a granular or powder physical form.

It should also be pointed out that, in accordance with the present invention, said complex of cobalt including at least one imine nitrogen can be prepared in situ, i.e. directly in the polymerization environment. In this respect, said complex of cobalt including at least one imine nitrogen can be prepared by separately introducing the ligand (obtained as described, for example, in the following examples), the compound containing cobalt [for example, cobalt dichloride ($CoCl_2$)] and the preselected 1,3-butadiene to be polymerized, operating under the conditions in which the polymerization is carried out.

According to a preferred embodiment of the present invention, said catalytic system can comprise at least one co-catalyst selected from organic compounds of an element M' different from carbon, said element M' being selected from elements belonging to groups 2, 12, 13 or 14 of the Periodic Table of the Elements, preferably from: boron, aluminium, zinc, magnesium, gallium, tin, even more preferably from aluminium, boron.

The formation of the catalytic system comprising the complex of cobalt including at least one imine nitrogen and the co-catalyst, is generally and preferably carried out in an inert liquid medium, more preferably in a hydrocarbon solvent. The choice of the complex of cobalt including at least one imine nitrogen and of the co-catalyst, as well as the particular method used, can vary in relation to the molecular structures and to the desired result, according to what is analogously described in specific literature available to experts in the field for other complexes of transition metals with imine ligands, as described, for example, by L. K. Johnson et al. in "*Journal of the American Chemical Society*" (1995), Vol. 117, pages 6414-6415, and by G. van Koten et al. in "*Advances in Organometallic Chemistry*" (1982), Vol. 21, pages 151-239.

According to a further preferred embodiment of the present invention, said co-catalyst can be selected from aluminium alkyls having general formula (II):

$$Al(X')_n(R_6)_{3-n} \quad (II)$$

wherein X' represents a halogen atom such as, for example, chlorine, bromine, iodine, fluorine; $R_6$ is selected from linear or branched $C_1$-$C_{20}$ alkyl groups, cycloalkyl groups, aryl groups, said groups being optionally substituted with one or more silicon or germanium atoms; and n is an integer ranging from 0 to 2.

According to a further preferred embodiment of the present invention, said co-catalyst can be selected from organo-oxygenated compounds of an element M' different from carbon belonging to groups 13 or 14 of the Periodic Table of the Elements, preferably organo-oxygenated compounds of aluminium, gallium, tin. Said organo-oxygenated compounds can be defined as organic compounds of M', wherein the latter is bound to at least one oxygen atom and to at least one organic group consisting of an alkyl group having from 1 to 6 carbon atoms, preferably methyl.

According to a further preferred embodiment of the present invention, said co-catalyst can be selected from organometallic compounds or mixtures of organometallic compounds of an element M' different from carbon capable of reacting with the complex of cobalt including at least one imine nitrogen selected from complexes of cobalt having general formula (I), (Ia), (Ib) ○ (Ic), indicated above, extracting therefrom a substituent $X_1$ or $X_2$ σ-bound, to form, on the one hand, at least one neutral compound, and on the other, an ionic compound consisting of a cation containing the metal (Co) coordinated by the ligand, and of a non-coordinating organic anion containing the metal M', wherein the negative charge is delocalized on a multicentric structure.

It should be noted that, for the aim of the present invention and of the following claims, the term "Periodic Table of the Elements" refers to the IUPAC version of the "Periodic Table of the Elements" dated Jun. 22, 2007, provided in the following Internet website www.iupac.org/fileadmin/user upload/news/IUPAC Periodic Table-1Jun12.pdf.

The term "bivalent aromatic group" refers to an aromatic carbocyclic group containing one or more aromatic rings. Said bivalent aromatic group can be optionally substituted with one or more groups, the same or different, selected from: halogen atoms such as, for example, fluorine, chlorine, bromine; hydroxyl groups; $C_1$-$C_{12}$ alkyl groups; $C_1$-$C_{12}$ alkoxyl groups; cyano groups; amino groups; nitro groups. Specific examples of a bivalent aromatic group are: ortho-phenylene, meta-phenylene, methylphenylene, trimethylphenylene, methoxyphenylene, hydroxyphenylene, phenyloxyphenylene, fluorophenylene, chlorophenylene, bromophenylene, nitrophenylene, dimethylamino-phenylene, naphthylene, phenylnaphthylene, phenanthrenylene, anthracenylene.

The term "$C_1$-$C_{20}$ alkyl groups" refers to linear or branched alkyl groups having from 1 to 20 carbon atoms. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "$C_1$-$C_{20}$ alkyl groups optionally halogenated" refers to linear or branched alkyl groups having from 1 to 20 carbon atoms, linear or branched, saturated or unsaturated, wherein at least one of the hydrogen atoms is substituted with a halogen atom such as, for example, fluorine, chlorine, bromine, preferably fluorine, chlorine. Specific examples of $C_1$-$C_{20}$ alkyl groups optionally halogenated are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl.

The term "cycloalkyl groups" refers to cycloalkyl groups having from 3 to 30 carbon atoms. Said cycloalkyl groups can be optionally substituted with one or more groups, the same or different, selected from: halogen atoms; hydroxyl groups; $C_1$-$C_{12}$ alkyl groups; $C_1$-$C_{12}$ alkoxyl groups; cyano groups; amino groups; nitro groups. Specific examples of cycloalkyl groups are: cyclopropyl, 2,2-difluorocyclopropyl, cyclobutyl, cyclopentyl, cyclohexyl, hexamethyl-cyclohexyl, pentamethylcyclopentyl, 2-cyclooctylethyl, methylcyclohexyl, methoxycyclohexyl, fluorocyclohexyl, phenylcyclohexyl.

The term "aryl groups" refers to aromatic carbocyclic groups. Said aromatic carbocyclic groups can be optionally substituted with one or more groups, the same or different, selected from: halogen atoms such as, for example, fluorine, chlorine, bromine; hydroxyl groups; $C_1$-$C_{12}$ alkyl groups; $C_1$-$C_{12}$ alkoxyl groups, cyano groups; amino groups; nitro groups. Specific examples of aryl groups are: phenyl, methylphenyl, trimethylphenyl, methoxyphenyl, hydroxyphenyl, phenyloxyphenyl, fluorophenyl, chlorophenyl, bromophenyl, nitrophenyl, dimethylaminophenyl, naphthyl, phenylnaphthyl, phenanthrene, anthracene.

The term "cyclo" refers to a system containing a ring containing from 3 to 6 carbon atoms or from 4 to 6 carbon atoms, optionally containing, in addition to the nitrogen atom, other heteroatoms selected from nitrogen, oxygen, sulfur, silicon, selenium, phosphorous. Specific examples of cyclo are: pyridine, thiadiazole For the aim of the present description and of the following claims, the phrase "room temperature" refers to a temperature ranging from 20° C. to 25° C.

Specific examples of aluminium alkyls having general formula (II) which are particularly useful for the aim of the present invention are: tri-methyl-aluminium, tri-(2,3,3-tri-methyl-butyl)-aluminium, tri-(2,3-di-methyl-hexyl)-aluminium, tri-(2,3-di-methyl-butyl)-aluminium, tri-(2,3-di-methyl-pentyl)-aluminium, tri-(2,3-di-methyl-heptyl)-aluminium, tri-(2-methyl-3-ethyl-pentyl)-aluminium, tri-(2-methyl-3-ethyl-hexyl)-aluminium, tri-(2-methyl-3-ethyl-heptyl)-aluminium, tri-(2-methyl-3-propyl-hexyl)-aluminium, tri-ethyl-aluminium, tri-(2-ethyl-3-methyl-butyl)-aluminium, tri-(2-ethyl-3-methyl-pentyl)-aluminium, tri-(2,3-di-ethyl-pentyl-aluminium), tri-n-propyl-aluminium, tri-iso-propyl-aluminium, tri-(2-propyl-3-methyl-butyl)-aluminium, tri-(2-iso-propyl-3-methyl-butyl)-aluminium, tri-n-butyl-aluminium, tri-iso-butyl-aluminium (TIBA), tri-tert-butyl-aluminium, tri-(2-iso-butyl-3-methyl-pentyl)-aluminium, tri-(2,3,3-tri-methyl-pentyl)-aluminium, tri-(2,3,3-tri-methyl-hexyl)-aluminium, tri-(2-ethyl-3,3-di-methyl-butyl)-aluminium, tri-(2-ethyl-3,3-di-methyl-pentyl)-aluminium, tri-(2-iso-propyl-3,3-dimethyl-butyl)-aluminium, tri-(2-tri-methylsilyl-propyl)-aluminium, tri-2-methyl-3-phenyl-butyl)-aluminium, tri-(2-ethyl-3-phenyl-butyl)-aluminium, tri-(2,3-di-methyl-3-phenyl-butyl)-aluminium, tri-(2-phenyl-propyl)-aluminium, tri-[2-(4-fluoro-phenyl)-propyl]-aluminium, tri-[2-(4-chloro-phenyl)- propyl]-aluminium, tri-[2-(3-iso-propyl-phenyl-tri-(2-phenyl-butyl)-aluminium, tri-(3-methyl-2-phenyl-butyl)-aluminium, tri-(2-phenyl-pentyl)-aluminium, tri-[2-(pentafluoro-phenyl)-propyl]-aluminium, tri-(2,2-diphenyl-ethyl]-aluminium, tri-(2-phenyl-methyl-propyl)-aluminium, tri-pentyl-aluminium, tri-hexyl-aluminium, tri-cyclohexyl-aluminium, tri-octyl-aluminium, di-ethyl-aluminium hydride, di-n-propyl-aluminium hydride, di-n-butyl-aluminium hydride, di-iso-butyl-aluminium hydride (DIBAH), di-hexyl-aluminium hydride, di-iso-hexyl-aluminium hydride, di-octyl-aluminium hydride, di-iso-octyl-aluminium hydride, ethyl-aluminium di-hydride, n-propyl-aluminium di-hydride, iso-butyl-aluminium di-hydride, di-ethyl-aluminium chloride (DEAC), mono-ethyl-aluminium dichloride (EADC), di-methyl-aluminium chloride, di-iso-butyl-aluminium chloride, iso-butyl-aluminium dichloride, ethylaluminium sesquichloride (EASC), as well as the corresponding compounds in which one of the hydrocarbon substituents is substituted by a hydrogen atom and those in which one or two of the hydrocarbon substituents are substituted with an iso-butyl group. Di-ethyl-aluminium chloride (DEAC), mono-ethyl-aluminium dichloride (EADC), ethylaluminium sesquichloride (EASC), are particularly preferred.

When used for the formation of a catalytic polymerization system according to the present invention, the aluminium alkyls having general formula (II) can be preferably put in contact with a complex of cobalt including at least one imine nitrogen in such proportions that the molar ratio between the cobalt present in the complex of cobalt including at least one imine nitrogen and the aluminium present in the aluminium alkyls having general formula (II) can range from 5 to 5000, preferably ranging from 10 to 1000. The sequence with which the complex of cobalt including at least one imine nitrogen and the aluminium alkyl having general formula (II) are put in contact with each other, is not particularly critical.

Further details relating to the aluminium alkyls having general formula (II) can be found in International patent application WO 2011/061151.

According to a particularly preferred embodiment of the present invention, said organo-oxygenated compounds can be selected from aluminoxanes having general formula (III):

$$(R_7)_2—Al—O—[—Al(R_8)—O—]_p—Al—(R_9)_2 \quad (III)$$

wherein $R_7$, $R_8$ and $R_9$, the same or different, represent a hydrogen atom, a halogen atom such as, for example, chlorine, bromine, iodine, fluorine; or they are selected from linear or branched $C_1$-$C_{20}$ alkyl groups, cycloalkyl groups, aryl groups, said groups being optionally substituted with one or more silicon or germanium atoms; and p is an integer ranging from 0 to 1,000.

As is known, aluminoxanes are compounds containing Al—O—Al bonds, with a variable O/Al ratio, which can be obtained by means of processes known in the art such as, for example, by reaction, under controlled conditions, of an aluminium alkyl, or an aluminium alkyl halide, with water or with other compounds containing predetermined quantities of available water, as, for example, in the case of the reaction of aluminium trimethyl with aluminium sulfate hexahydrate, copper sulfate pentahydrate, or iron sulfate pentahydrate.

Said aluminoxanes, and in particular methyl aluminoxane (MAO), are compounds which can be obtained by means of known organometallic chemical processes such as, for example, by the addition of aluminium trimethyl to a suspension in hexane of aluminium sulfate hydrate.

When used for the formation of a catalytic polymerization system according to the present invention, the aluminoxanes having general formula (III) can be preferably put in contact with a complex of cobalt including at least one imine nitrogen, in such proportions that the molar ratio between the aluminium (Al) present in the aluminoxane having general formula (III) and the cobalt present in the complex of cobalt including at least one imine nitrogen is ranging from 10 to 10,000, preferably ranging from 100 to 5,000. The sequence with which the complex of cobalt including at least one imine nitrogen and the aluminoxane having general formula (III) are put in contact with each other, is not particularly critical.

In addition to the above preferred aluminoxanes having general formula (III), the definition of the compound according to the present invention can also include galloxanes, wherein, in general formula (III), gallium is present in substitution of aluminium, and stannoxanes, wherein, in general formula (III), tin is present in substitution of aluminium, whose use as co-catalysts in the polymerization of olefins in the presence of metallocene complexes, is known. Further details relating to said galloxanes and stannoxanes can be found, for example, in American patents U.S. Pat. No. 5,128,295 and U.S. Pat. No. 5,258,475.

Specific examples of aluminoxanes having general formula (III) which are particularly useful for the aim of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TTMBAO). Methylaluminoxane (MAO) is particularly preferred.

Further details relating to the aluminoxanes having general formula (III) can be found in International patent application WO 2011/061151.

According to a preferred embodiment of the present invention, said compounds or mixtures of compounds can be selected from organic compounds of aluminium and especially boron, such as, for example, those represented by the following general formulae (IV), (V) or (VI):

$$[(R_C)_wH_{4-w}]\cdot[B(R_D)_4]^-; B(R_D)_3; Al(R_D)_3; B(R_D)_3P;$$
$$[Ph_3C]^+\cdot[B(R_D)_4]^- \quad (IV)$$

$$[(R_C)_3PH]^+\cdot[B(R_D)_4]^- \quad (V)$$

$$[Li]^+\cdot[B(R_D)_4]^-; [Li]^+\cdot[Al(R_D)_4]^- \quad (VI)$$

wherein w is an integer ranging from 0 to 3, each group $R_C$ independently represents an alkyl group or an aryl group having from 1 to 10 carbon atoms and each group $R_D$ independently represents an aryl group partially or totally, preferably totally, fluorinated, having from 6 to 20 carbon atoms, P represents a pyrrole radical, optionally substituted.

When used for the formation of a catalytic polymerization system according to the present invention, the compounds or mixtures of compounds having general formulae (IV), (V) or (VI) can be preferably put in contact with a complex of cobalt including at least one imine nitrogen, in such proportions that the molar ratio between the metal (M') present in the compounds or mixtures of compounds having general formulae (IV), (V) or (VI) and the cobalt present in the complex of cobalt including at least one imine nitrogen is ranging from 0.1 to 15, preferably ranging from 0.5 to 10, more preferably ranging from 1 to 6. The sequence with which the complex of cobalt including at least one imine nitrogen and the compound or mixtures of compounds having general formulae (IV), (V) or (VI), are put in contact with each other, is not particularly critical.

Said compounds or mixtures of compounds having general formulae (IV), (V) or (VI), especially when $X_1$ and $X_2$ in general formulae (I), (Ia), (Ib) or (Ic), indicated above, are different from alkyl, must be used in a combination with an aluminoxane having general formula (III) such as, for example, methylaluminoxane (MAO), or, preferably, with an aluminium alkyl having general formula (II), more preferably an aluminium trialkyl having from 1 to 8 carbon atoms in each alkyl residue such as, for example, tri-methyl-aluminium, tri-ethyl-aluminium, tri-iso-butylaluminium (TIBA).

Examples of methods generally used for the formation of a catalytic polymerization system according to the present invention, when compounds or mixtures of compounds having general formulae (IV), (V) or (VI), are used, are qualitatively schematized in the following list, which however in no way limits the overall scope of the present invention:

($m_1$) contact of a complex of cobalt including at least one imine nitrogen selected from the complexes of cobalt having general formula (I), (Ia), (Ib) or (Ic), indicated above, wherein at least one of $X_1$ and $X_2$ is an alkyl group, with at least one compound or mixtures of compounds having general formulae (IV), (V) or (VI), whose cation is capable of reacting with said alkyl group to form a neutral compound, and whose anion is voluminous, non-coordinating and capable of delocalizing the negative charge;

($m_2$) reaction of a complex of cobalt including at least one imine nitrogen selected from the complexes of cobalt having general formula (I), (Ia), (Ib) or (Ic), indicated above, with at least one aluminium alkyl having general formula (II), preferably an aluminium trialkyl, used in a molar excess of 10/1 to 300/1, followed by reaction with a strong Lewis acid selected from compounds or mixtures of compounds having general formulae (IV), (V) or (VI), such as, for example, tris (pentafluorophenyl)boron, in an almost stoichiometric quantity or in slight excess with respect to the cobalt (Co);

($m_3$) contact and reaction of a complex of cobalt including at least one imine nitrogen selected from the complexes of cobalt having general formula (I), (Ia), (Ib) or (Ic), indicated above, with a molar excess of 10/1 to 1,000/1, preferably from 100/1 to 500/1, of at least one aluminium trialkyl or of an alkyl aluminium halide represented by the formula $AlR'''_m Z_{3-m}$ wherein $R'''$ is a linear or branched $C_1$-$C_8$ alkyl group, or a mixture thereof, Z is a halogen, preferably chlorine or bromine, and m is a decimal number ranging from 1 to 3, followed by addition, to the composition thus obtained, of at least one compound or mixture of compounds having general formulae (IV), (V) or (VI), in such quantities that the ratio between said compound or mixture of compounds having general formulae (IV), (V) or (VI), or the aluminium of said compound or mixture of compounds having general formulae (IV), (V) or (VI), and the cobalt of the complex of cobalt including at least one imine nitrogen, is ranging from 0.1 to 15, preferably ranging from 1 to 6.

Examples of compounds or mixtures of compounds having general formulae (IV), (V) or (VI), capable of producing an ionic catalytic system by reaction with a complex of cobalt including at least one imine nitrogen according to the present invention, are described, although with reference to the formation of ionic metallocene complexes, in the following publications, whose contents are incorporated herein as reference:

W. Beck et al., "*Chemical Reviews*" (1988), Vol. 88, pages 1405-1421;

S. H. Stares, "*Chemical Reviews*" (1993), Vol. 93, pages 927-942;

European patent applications EP 277 003, EP 495 375, EP 520 732, EP 427 697, EP 421 659, EP 418044;

published International patent applications WO 92/00333, WO 92/05208.

Specific examples of compounds or mixtures of compounds having general formulae (IV), (V) or (VI), particularly useful for the aim of the present invention are: tributylammonium-tetrakis-pentafluorophenyl-borate tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimethylbenzyl-ammonium-tetrakis-pentafluoro-phenyl-borate, N,N-di-methyl-hexylammonium-tetrakis-pentafluorophenyl-borate, N,N-dimethylanilinium-tetrakis-(pentafluorophenyl)-borate, N,N-dimethylanilinium-tetrakis-(pentafluoro-phenyl)-aluminate, di-(propyl)-ammonium-tetrakis-(pentafluorophenyl)-borate, di-(cyclohexyl)-ammonium-tetrakis-(pentafluorophenyl)-borate, tri-phenyl-carbenium-tetrakis-(pentafluorophenyl)-borate, tri-phenylcarbenium-tetrakis-(penta-fluorophenyl)-aluminate, tris(pentafluorophenyl)boron, tris(penta-fluorophenyl)-aluminium, or mixtures thereof. Tetrakis-pentafluorophenyl-borates are preferred.

For the aim of the present description and of the following claims, the term "mole" and "molar ratio" are used with reference to compounds consisting of molecules and also with reference to atoms and ions, omitting, for the latter, the terms gram atom or atomic ratio, even if scientifically more correct.

Other additives or components can be optionally added to the above catalytic system in order to adapt it so as to satisfy specific practical requirements. The catalytic systems thus obtained should therefore be considered as being included in the scope of the present invention. Additives and/or components which can be added in the preparation and/or formulation of the above catalytic system are, for example: inert solvents, such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

As already specified above, said catalytic system can be prepared according to methods known in the art.

Said catalytic system, for example, can be prepared separately (preformed) and subsequently introduced into the polymerization environment. In this respect, said catalytic system can be prepared by reacting at least one complex of cobalt including at least one imine nitrogen with at least one co-catalyst, optionally in the presence of other additives or components selected from those listed above, in the presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples provided hereunder.

Alternatively, said catalytic system can be prepared in situ, i.e. directly in the polymerization environment. In this respect, said catalytic system can be prepared by introducing the complex of cobalt including at least one imine nitrogen, the co-catalyst and the 1,3-butadiene to be polymerized, separately, operating under the conditions in which the polymerization is carried out.

For the aim of the process object of the present invention, said catalytic systems can also be supported on inert solids, preferably consisting of silicon and/or aluminium oxides, such as, for example, silica, alumina or silico-aluminates. The known supporting techniques can be used for supporting said catalytic systems, generally comprising contact, in a suitable inert liquid medium, between the carrier, optionally activated by heating to temperatures higher than 200° C., and one or both of the components, i.e. the complex of cobalt including at least one imine nitrogen and the co-catalyst, of the catalytic system, object of the present invention. For the aim of the present invention, it is not necessary for both components to be supported, as either the complex of cobalt including at least one imine nitrogen alone, or the co-catalyst, can be present on the surface of the carrier. In the latter case, the missing component on the surface is subsequently put in contact with the supported component, at the moment in which the catalyst active for the polymerization is to be formed.

The complex of cobalt including at least one imine nitrogen, and the catalytic systems based thereon, which have been supported on a solid by the functionalization of the latter and formation of a covalent bond between the solid and the complex of cobalt including at least one imine nitrogen, are also included in the scope of the present invention.

The quantity of complex of cobalt including at least one imine nitrogen and of co-catalyst that can be used in the process object of the present invention, varies according to the polymerization process to be carried out. Said quantity is in any case such as to obtain a molar ratio between the cobalt present in the complex of cobalt including at least one imine nitrogen and the metal present in the co-catalyst, e.g., aluminium when the co-catalyst is selected from aluminium alkyls having general formula (II) or aluminoxanes having general formula (III), boron when the co-catalyst is selected from compounds or mixtures of compounds having general formulae (IV), (V) or (VI), included within the values indicated above.

According to a preferred embodiment of the present invention, said monodentate aromatic phosphine can be selected from aromatic phosphines having general formula (VII):

$$P(R)_m(Ph)_n \qquad (VII)$$

wherein:
R is selected from linear or branched $C_1$-$C_{16}$, preferably $C_1$-$C_8$, alkyl groups, $C_3$-$C_{16}$, preferably $C_3$-$C_8$, cycloalkyl groups, optionally substituted, allyl groups, phenyl optionally substituted;
Ph is phenyl optionally substituted;
m and n, different from each other, are 1 or 2, m+n being=3.

According to a preferred embodiment of the present invention, said monodentate aromatic phosphine can be selected from: cyclohexyl-diphenylphosphine (PCyPh$_2$), iso-propyl-diphenylphosphine (P$^i$PrPh$_2$), methyl-diphenylphosphine (PMePh$_2$), ethyl-diphenylphosphine (PEtPh$_2$) n-propyl-diphenylphosphine (P$''$PrPh$_2$) dimethyl-phenyl-phosphine (PMe$_2$Ph), diethyl-phenylphosphine (PEt$_2$Ph), dicyclohexyl-phenylphosphine (PCy$_2$Ph), tri-phenylphosphine (PPh$_3$). Cyclohexyl-diphenylphosphine (PCyPh$_2$), iso-propyl-diphenylphosphine (P$^i$PrPh$_2$), are preferred.

It should be pointed out that when a monodentate aromatic phosphine with a high steric hindrance is used, such as, for example, cyclohexyl-diphenylphosphine (PCyPh$_2$) having a cone angle (θ) equal to 153°, iso-propyl-diphenylphosphine (P$^i$PrPh$_2$) having a cone angle (θ) equal to 150°, a stereoregular diblock polybutadiene is obtained, in which the polybutadiene block having a 1,2 structure has a higher crystallinity degree, i.e. it has a content of syndiotactic triads [(rr) %] higher than or equal to 50%, preferably ranging from 60% to 80%, and has a melting point (T$_m$) higher than or equal to 70° C., preferably ranging from 95° C. to 140° C., when a monodentate aromatic phosphine with a lower steric hindrance is used, such as, for example, methyl-diphenylphosphine (PMePh$_2$) having a cone angle (θ) equal to 136°, ethyl-diphenylphosphine (PEtPh$_2$) having a cone angle (θ) equal to 141°, n-propyl-diphenylphosphine (P$''$-PrPh$_2$) having a cone angle (θ) equal to 142°, dimethylphenylphosphine (PMe$_2$Ph) having a cone angle (θ) equal to 127°, diethyl-phenylphosphine (PEt$_2$Ph) having a cone angle (θ) equal to 136°, a stereoregular diblock polybutadiene is obtained, in which the polybutadiene block having a 1,2 structure has a lower crystallinity degree, i.e. it has a content of syndiotactic triads [(rr) %] lower than or equal to 50%, preferably ranging from 30% to 40%, and has a melting point (T$_m$) ranging from 50° C. to 70° C. The cone angle (θ) is that indicated by Tolman C. A. in "Chemical Reviews" (1977), Vol. 77, pages 313-348.

According to a preferred embodiment of the present invention, said process can be carried out in the presence of an inert organic solvent selected, for example, from: saturated aliphatic hydrocarbons such as butane, pentane, hexane, heptane, or mixtures thereof; saturated cycloaliphatic hydrocarbons such as cyclopentane, cyclohexane, or mixtures thereof; mono-olefins such as 1-butene, 2-butene, or mixtures thereof; aromatic hydrocarbons such as benzene, toluene, xylene, or mixtures thereof; halogenated hydrocarbons such as methylene chloride, chloroform, carbon tetrachloride, trichloroethylene, perchloroethylene, 1,2-dichloroethane, chlorobenzene, bromobenzene, chlorotoluene, or mixtures thereof. Said solvent is preferably selected from saturated aliphatic hydrocarbons.

Alternatively, said process can be carried out using, as solvent, the same 1,3-butadiene to be polymerized, according to the process known as "bulk process".

According to a preferred embodiment of the present invention, the concentration of 1,3-butadiene to be polymerized in said inert organic solvent can range from 5% by weight to 50% by weight, preferably ranging from 10% by weight to 20% by weight, with respect to the total weight of the mixture of 1,3-butadiene and inert organic solvent.

According to a preferred embodiment of the present invention, said process can be carried out at a temperature ranging from −70° C. to +120° C., preferably from −20° C. to +100° C.

As far as the pressure is concerned, it is preferable to operate at the pressure of the components of the mixture to be polymerized, said pressure differing according to the polymerization temperature used.

Said process can be carried out either in continuous or batchwise.

Figure 2:
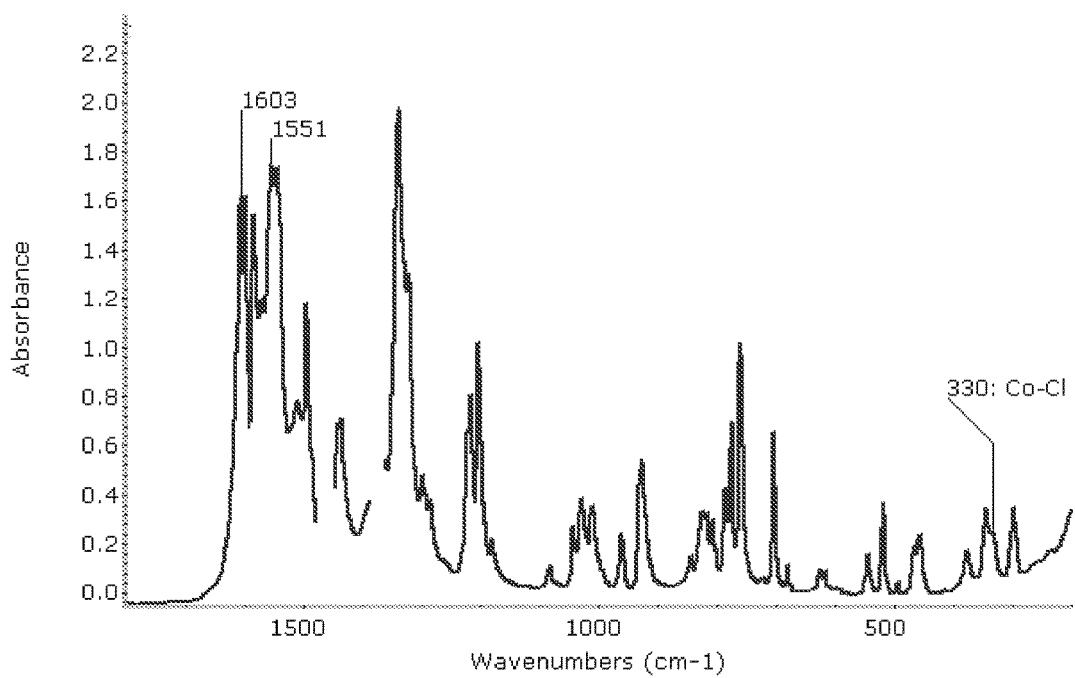
FIG. 2 shows the FT-IR spectrum of the complex $CoCl_2$ (L4) (GL924)(Example 8) (after subtraction of the nujol bands)
Figure 3:
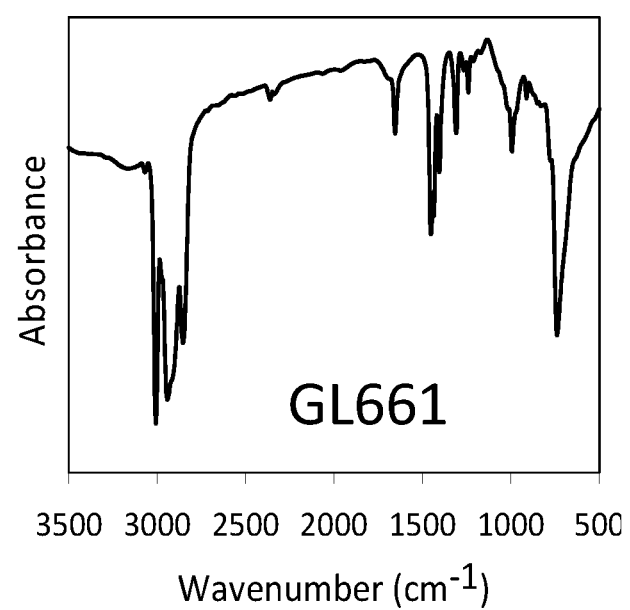
FIG. 3 shows the FT-IR spectrum of the polybutadiene of Example 9 (GL661)
Figure 4:
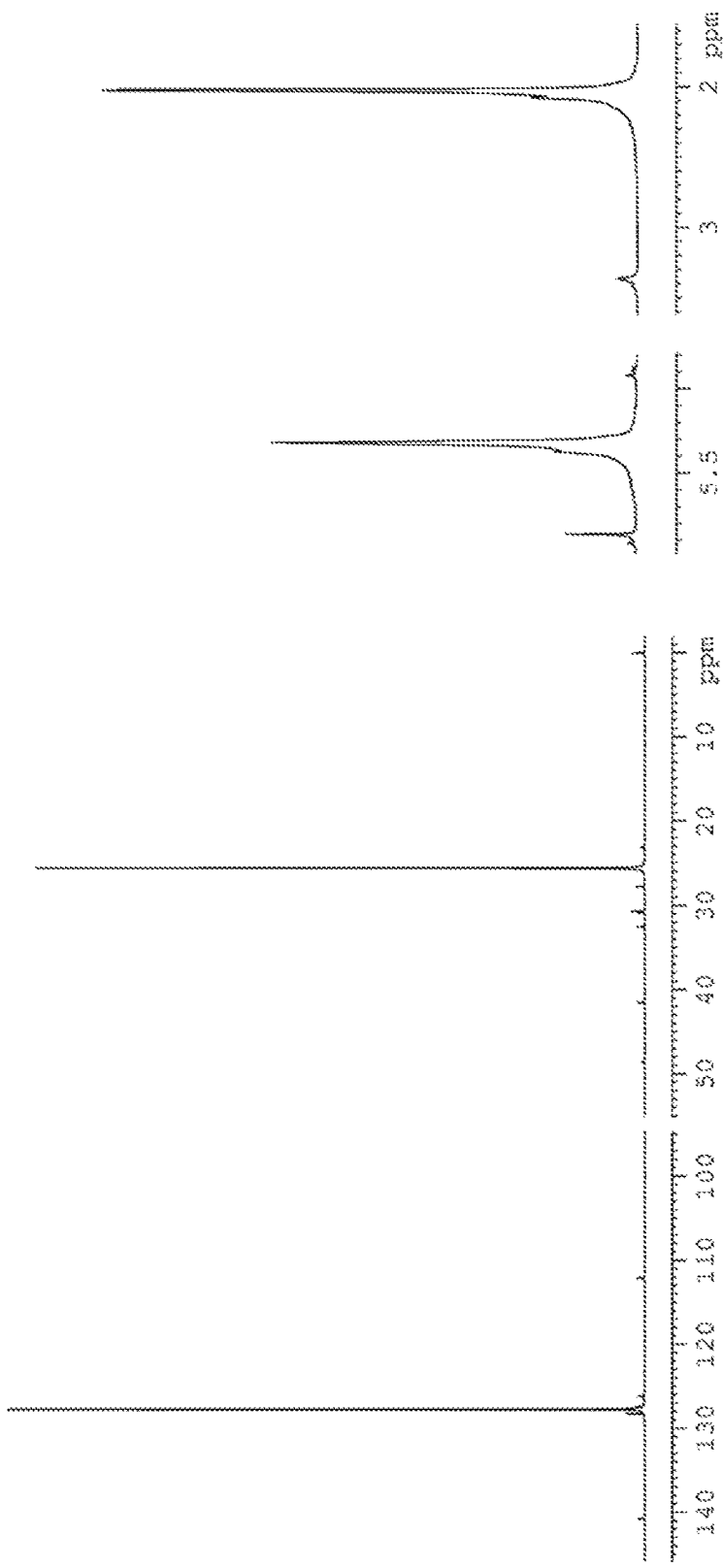
FIG. 4 shows the $^{13}$C-NMR spectrum (on the left) and $^1$H-NMR spectrum (on the right) of the polybutadiene of Example 11 (GL962)
Figure 5A:
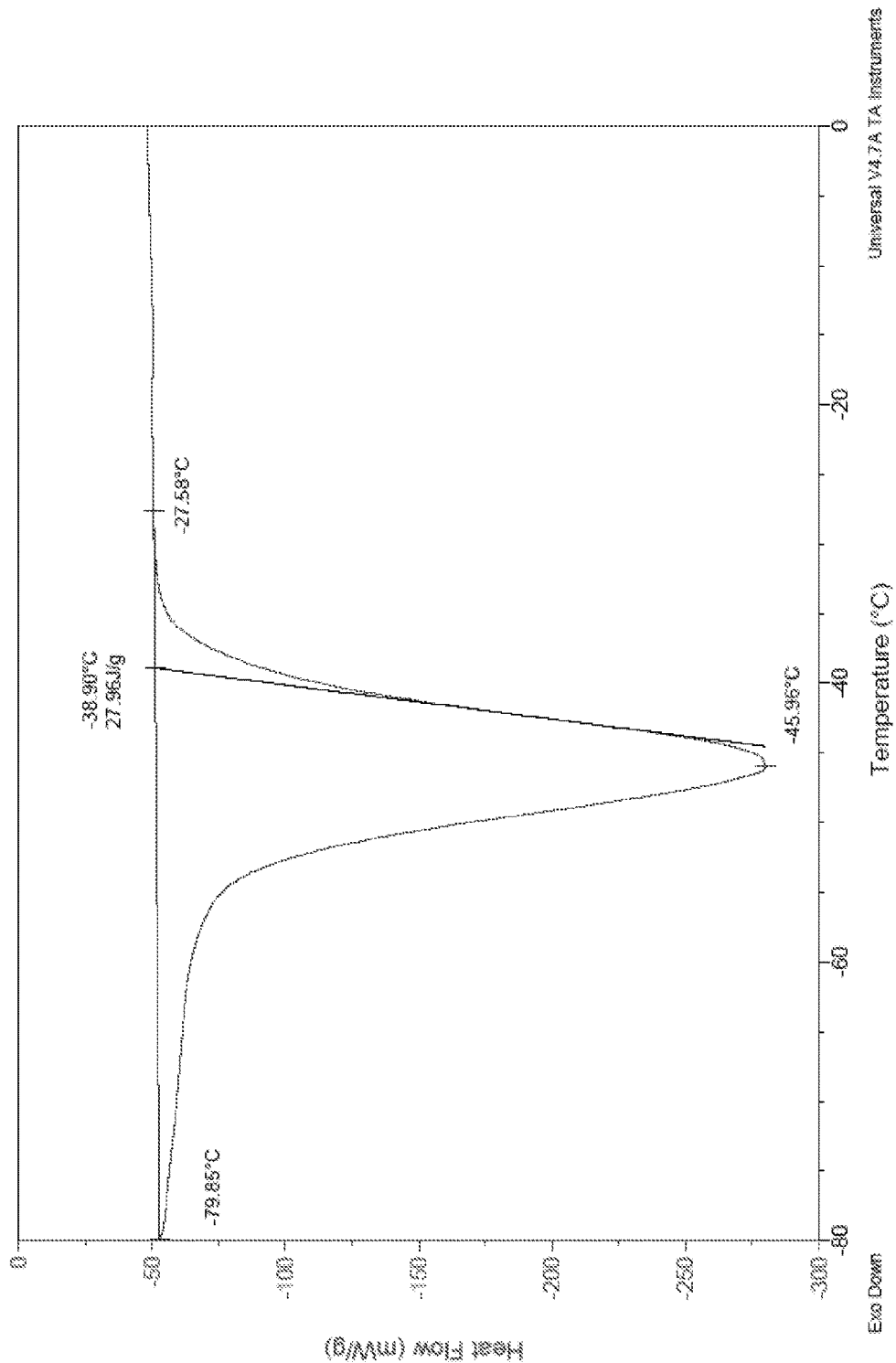
FIG. 5A shows the DSC diagram of the polybutadiene of Example 11 (GL962): crystallization.
Figure 5B:
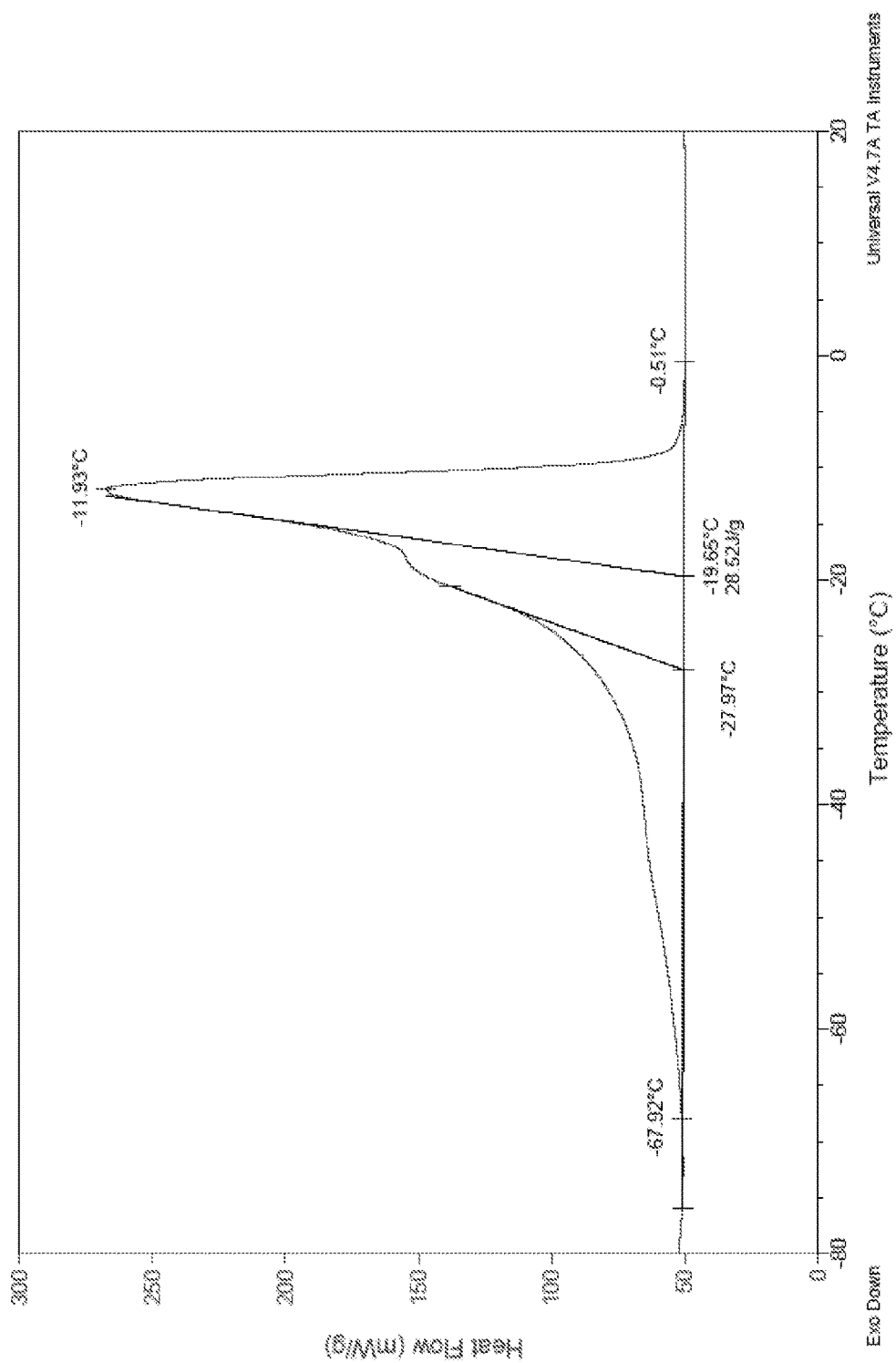
FIG. 5B shows the DSC diagram of the polybutadiene of Example 11 (GL962): melting.
Figure 6:
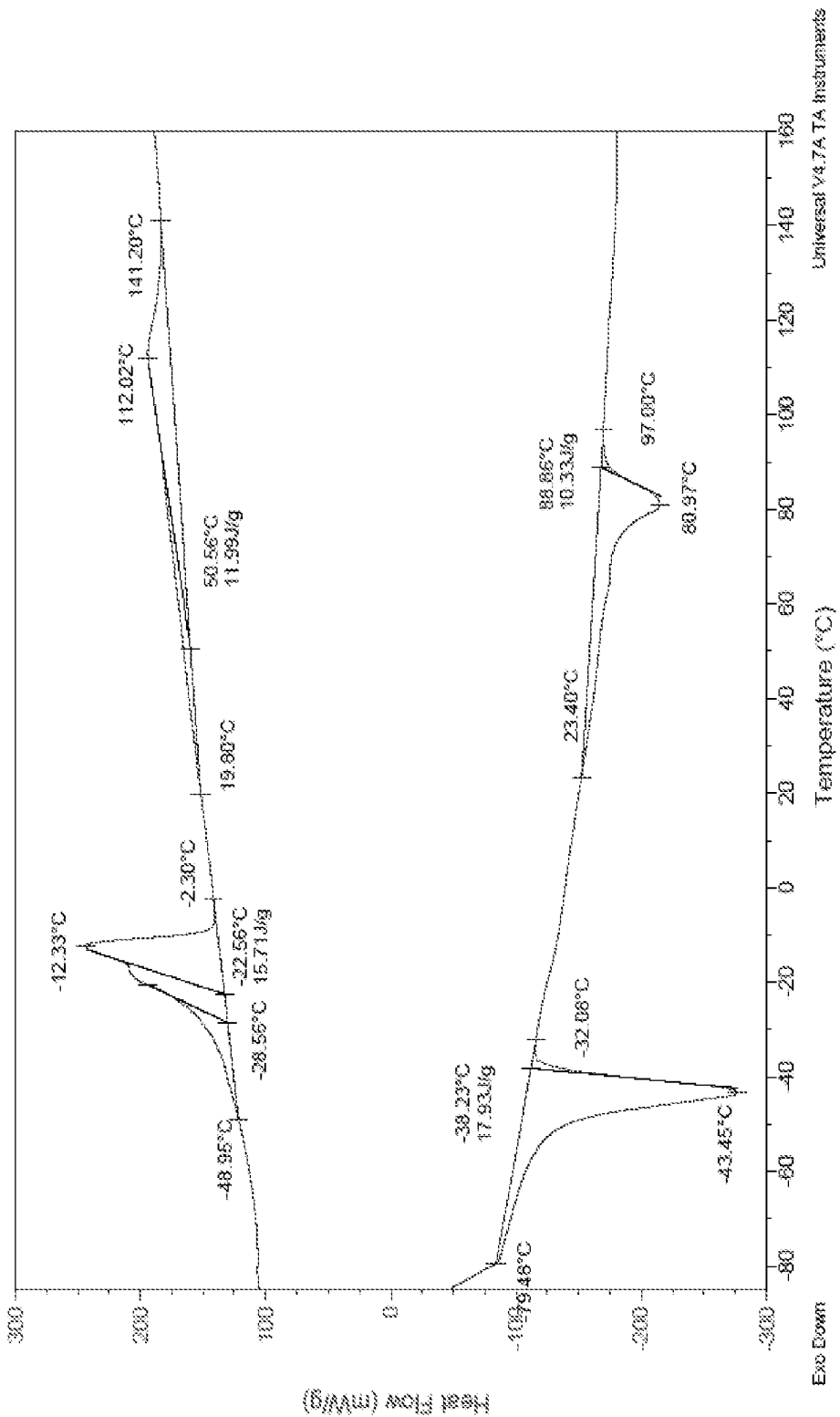
FIG. 6 shows the DSC diagrams of the stereoregular diblock polybutadiene of Example 12 (A2)
Figure 7:
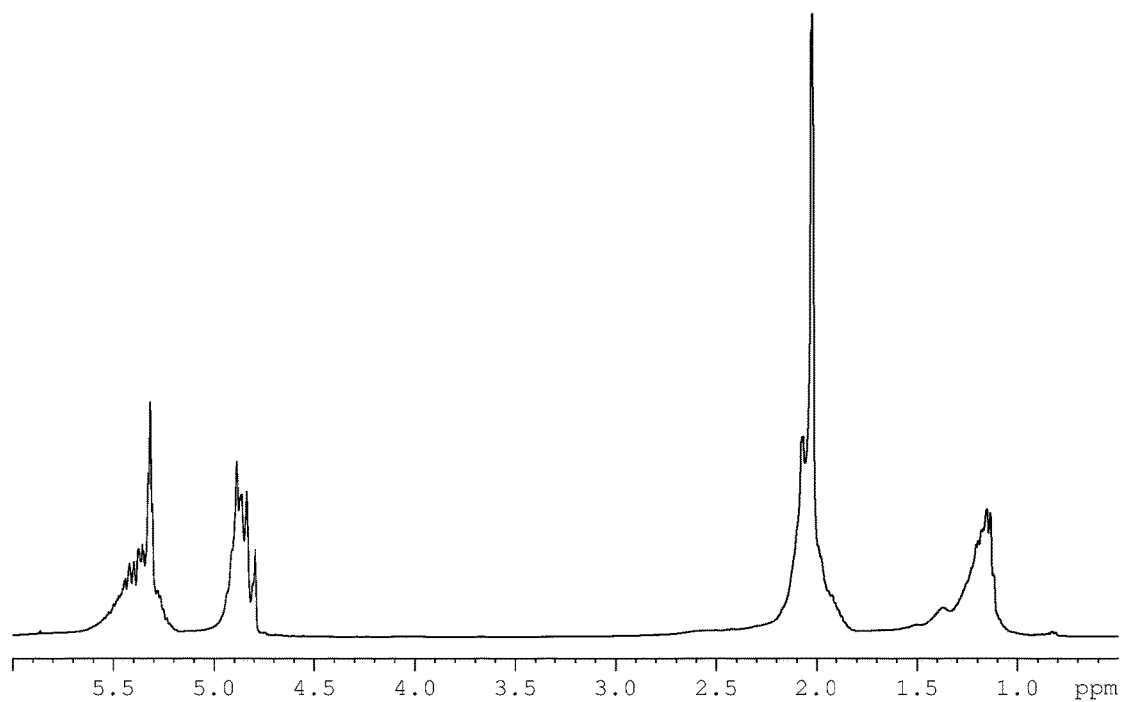
FIG. 7 shows the $^1$H-NMR spectrum of the stereoregular diblock polybutadiene of Example 12 (A2)
Figure 8:
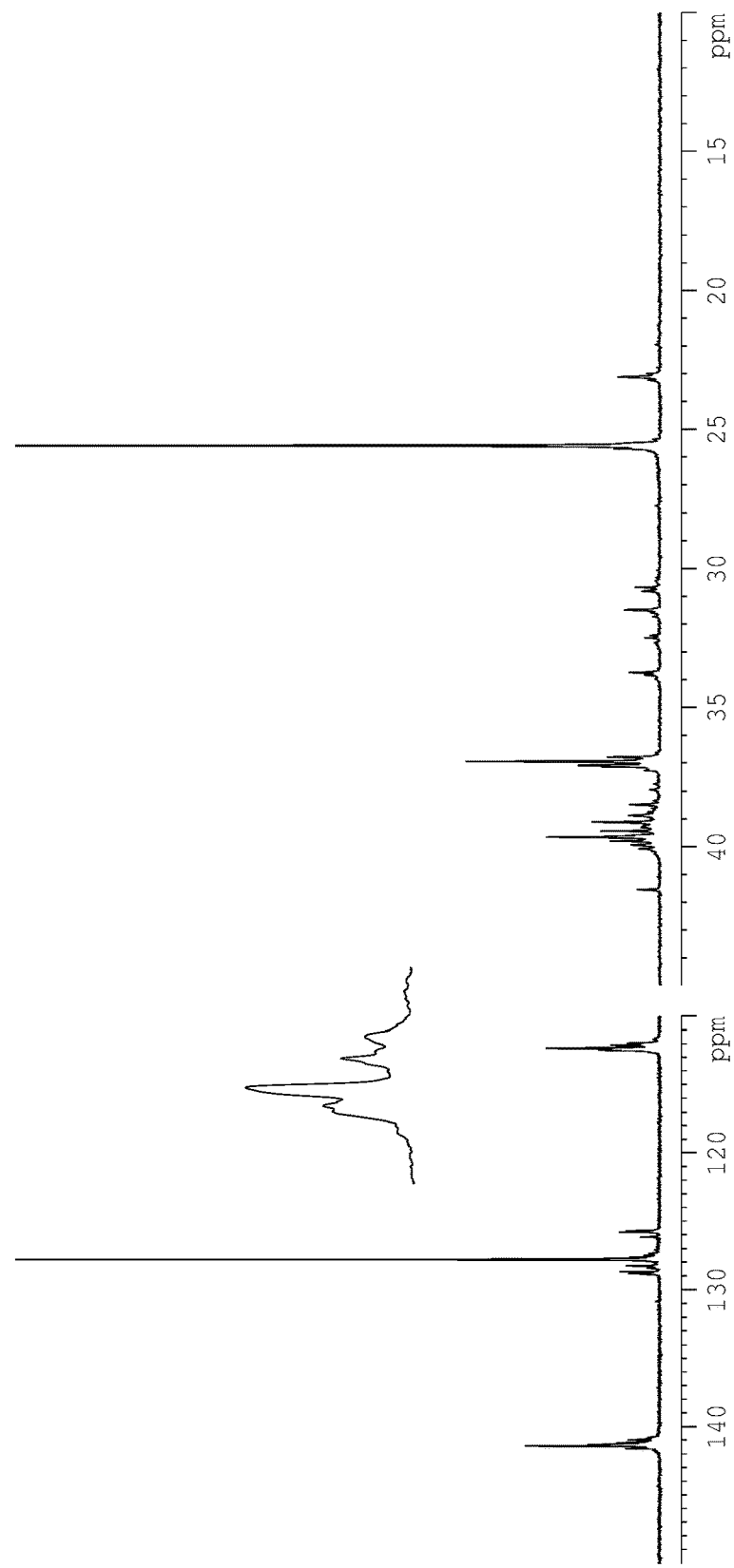
FIG. 8 shows the $^{13}$C-NMR spectrum of the stereoregular diblock polybutadiene of Example 12 (A2)
Figure 9:
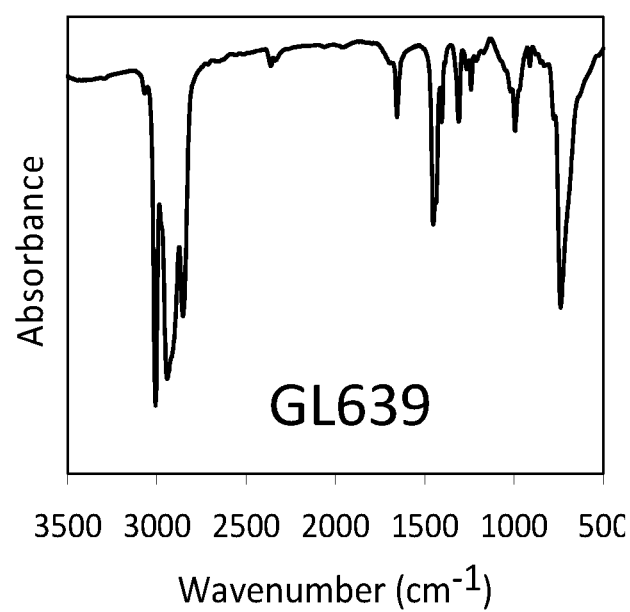
FIG. 9 shows the FT-IR spectrum of the polybutadiene of Example 13 (GL639)
Figure 10A:
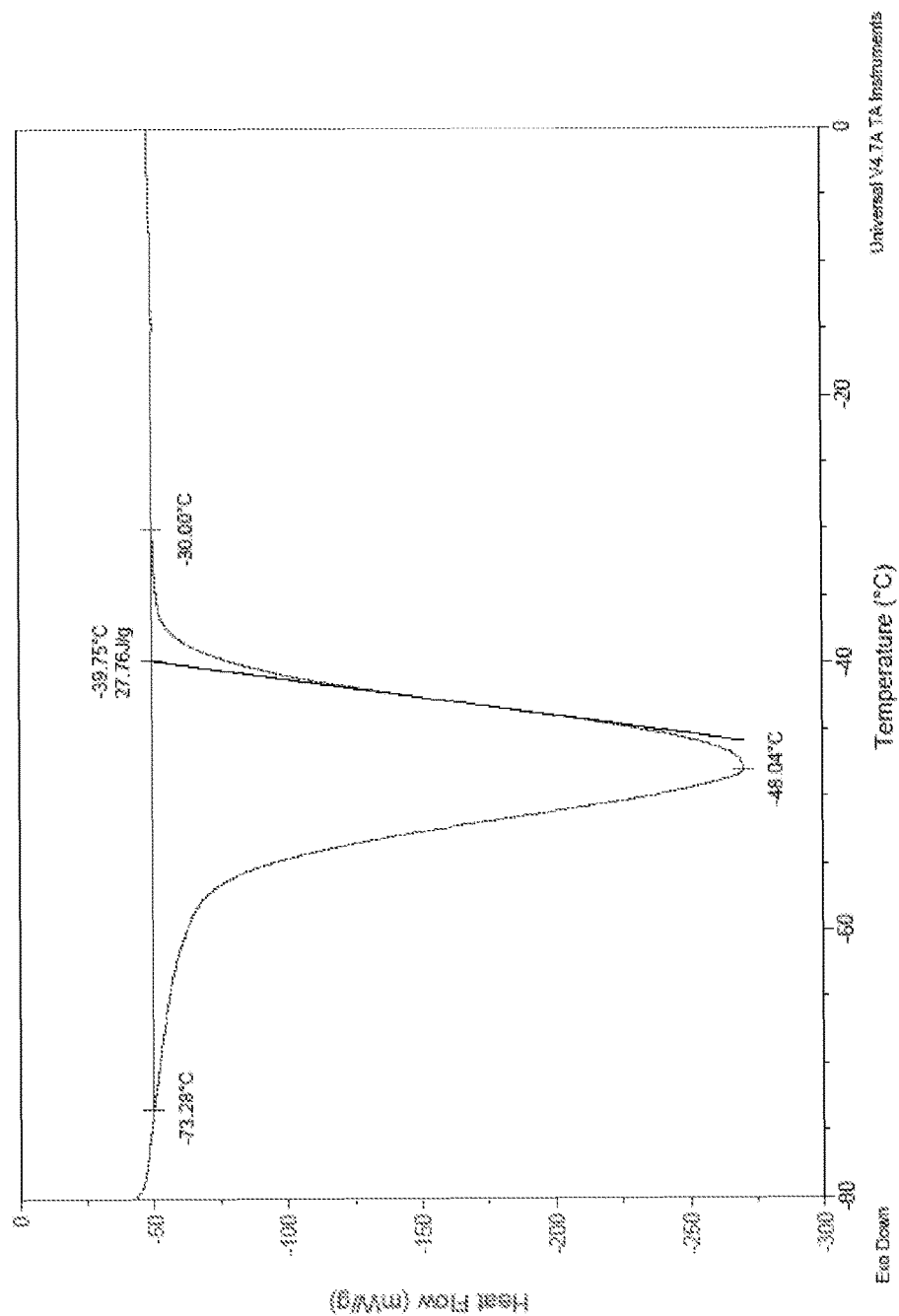
FIG. 10A shows the DSC diagram of the polybutadiene of Example 15 (G1169): crystallization.
Figure 10B:
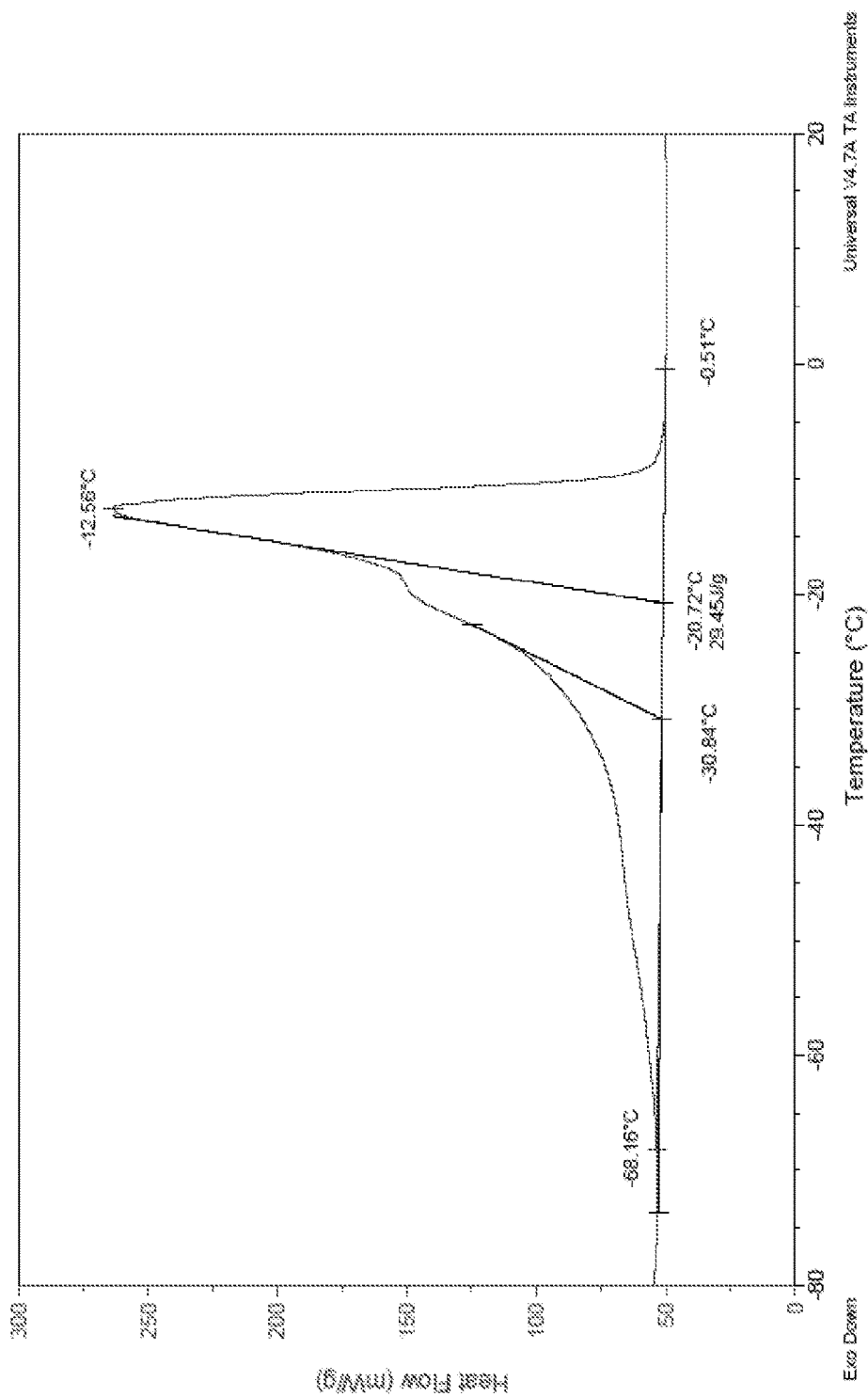
FIG. 10B shows the DSC diagram of the polybutadiene of Example 15 (C1169): melting.
Figure 11:
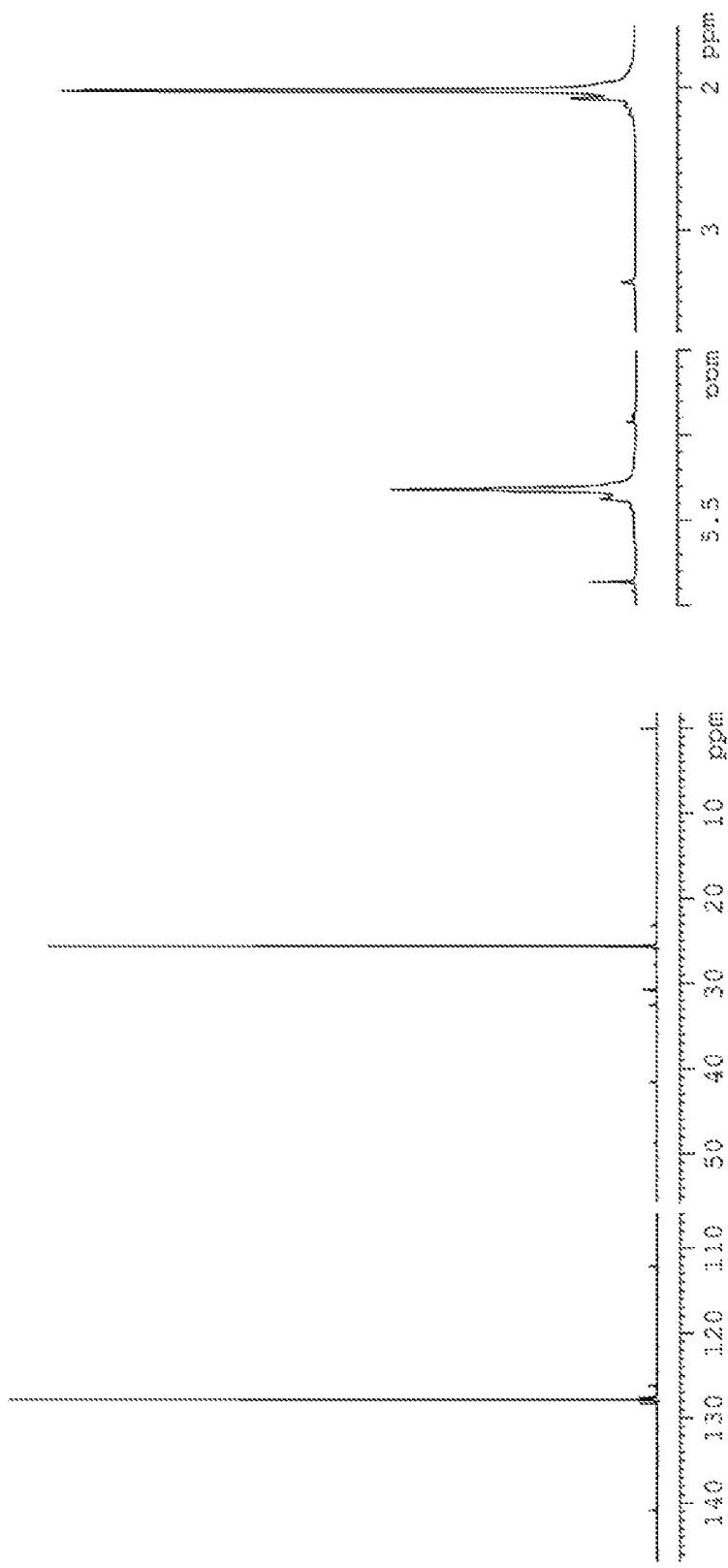
FIG. 11 shows the $^{13}$C-NMR spectrum (on the left) and $^1$H-NMR spectrum (on the right) of the polybutadiene of Example 15 (GL1169)
Figure 14A:
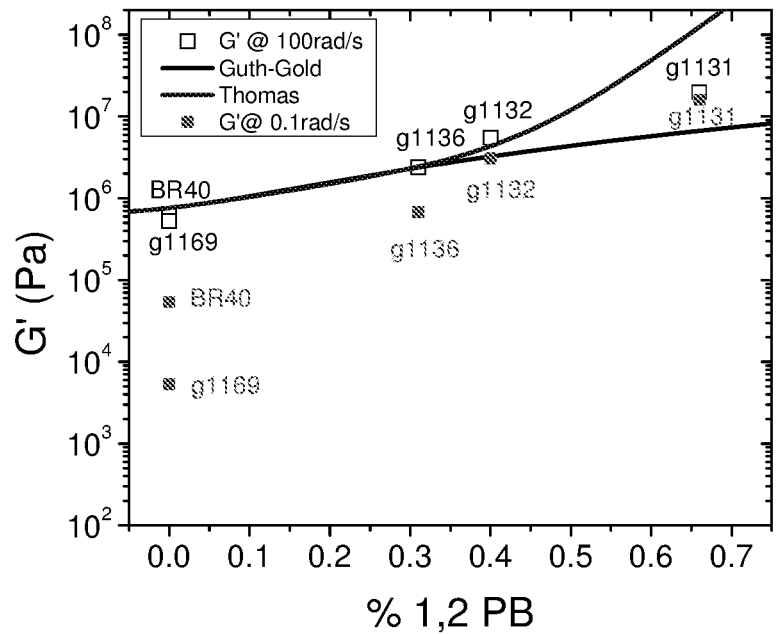
FIG. 14A shows the Elastic moduli (G') at 100 rad/s and at 0.1 rad/s, at 30° C. for the reference polybutadiene of Example 15 (G1169), for the stereoregular diblock polybutadienes of Example 16 (G1131), 17 (G1132) and 18 (G1136) and for the sample of reference polybutadiene Europrene Neocis® BR 40 (BR40)
Figure 14B:
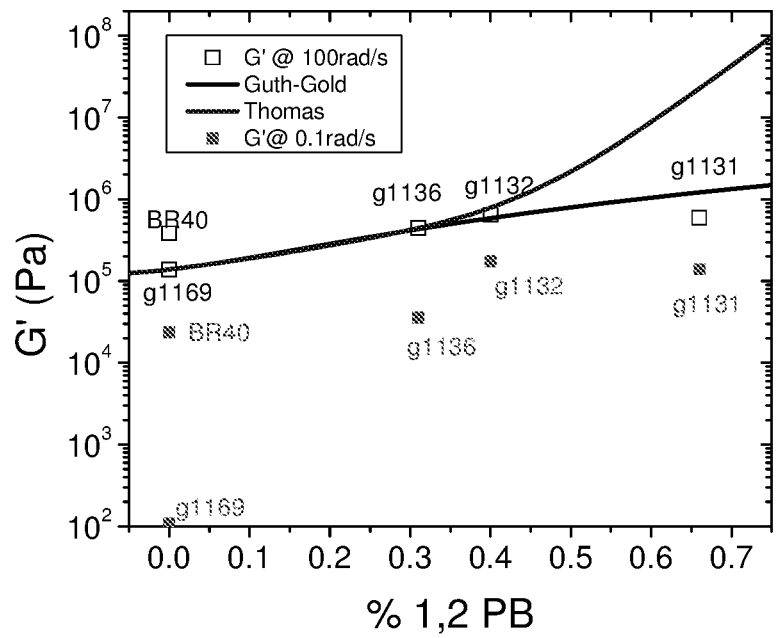
FIG. 14B shows the Elastic moduli (G') at 100 rad/s and at 0.1 rad/s, at 130° C. for the reference polybutadiene of Example 15 (G1169), for the stereoregular diblock polybutadienes of Example 16 (G1131), 17 (G1132) and 18 (G1136) and for the sample of reference polybutadiene Europrene Neocis® BR 40 (BR40)
Figure 15:
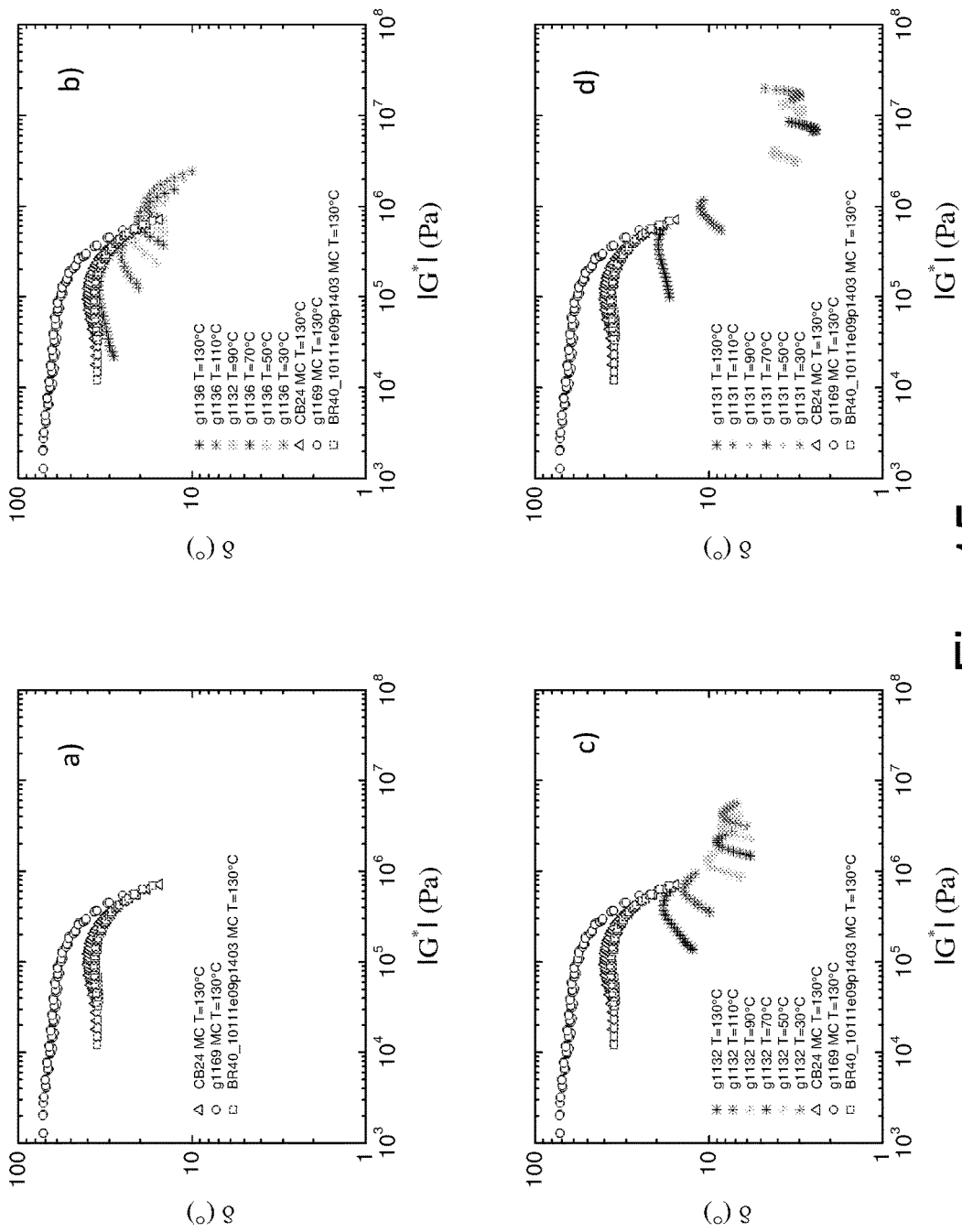
FIG. 15 shows the Van Gurp-Palmen diagrams of: a) reference polybutadiene of Example 15 (G1169) and samples of reference polybutadiene Europrene Neocis® BR 40 (BR40) and Buna CB 24 (CB24); b) stereoregular diblock polybutadiene of Example 18 (G1136), reference polybutadiene of Example 15 (G1169) and samples of reference polybutadiene Europrene Neocis® BR 40 (BR40) and Buna CB 24 (CB24); c) stereoregular diblock polybutadiene of Example 17 (G1132), reference polybutadiene of Example 15 (G1169) and samples of reference polybutadiene Europrene Neocis® BR 40 (BR40) and Buna CB 24 (CB24); d) stereoregular diblock polybutadiene of Example 16 (I131), reference polybutadiene of Example 15 (G1169) and samples of reference polybutadiene Europrene Neocis® BR 40 (BR40) and Buna CB 24 (CB24)
Figure 16:
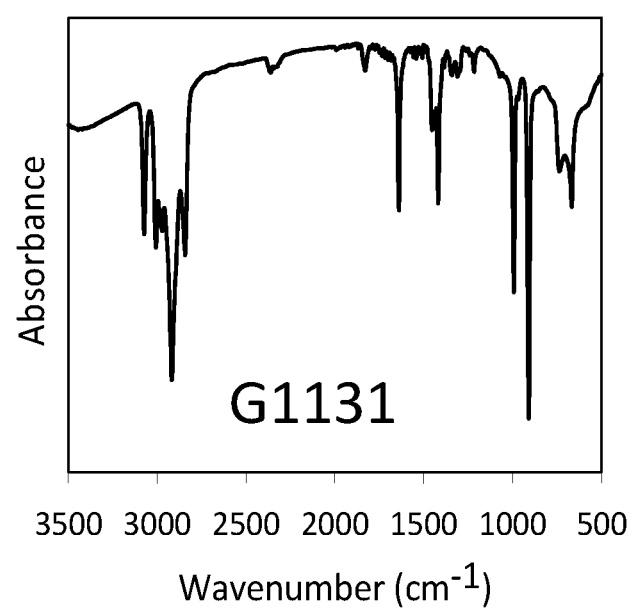
FIG. 16 shows the FT-IR spectrum of the stereoregular diblock polybutadiene of Example 16 (G1131)
Figure 17:
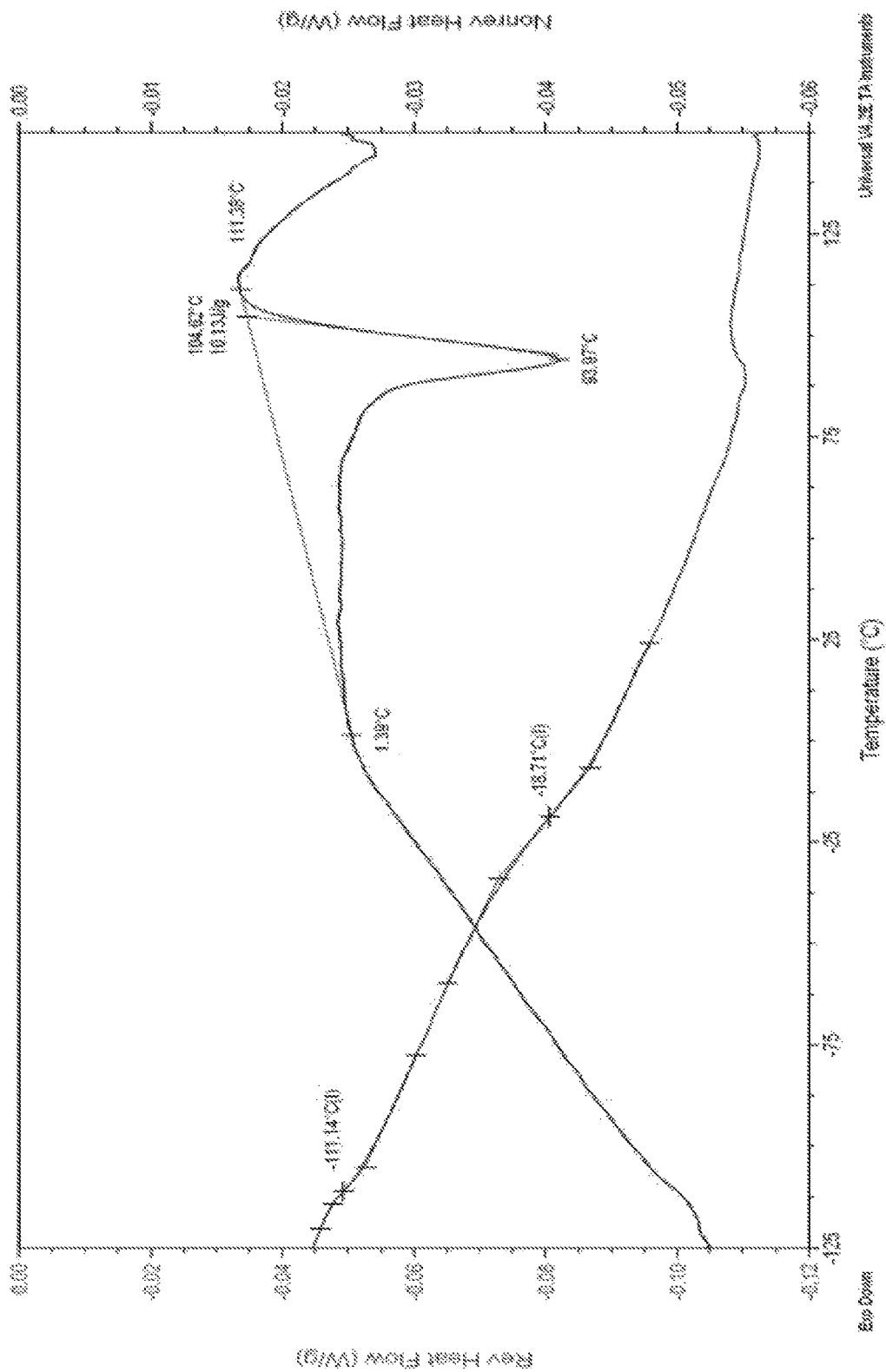
FIG. 17 shows the DSC diagram of the stereoregular diblock polybutadiene of Example 16 (G1131)
Figure 18:
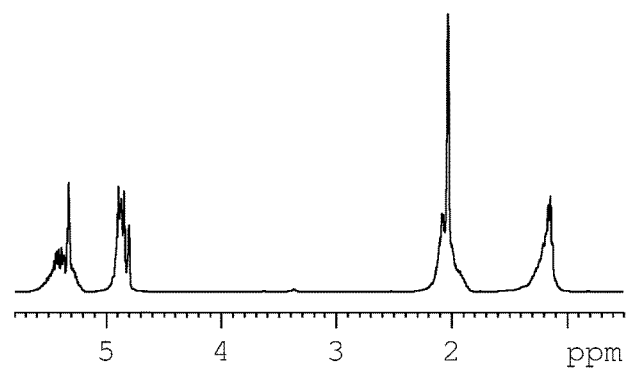
FIG. 18 shows the $^1$H-NMR spectrum of the stereoregular diblock polybutadiene of Example 16 (G1131)
Figure 19:
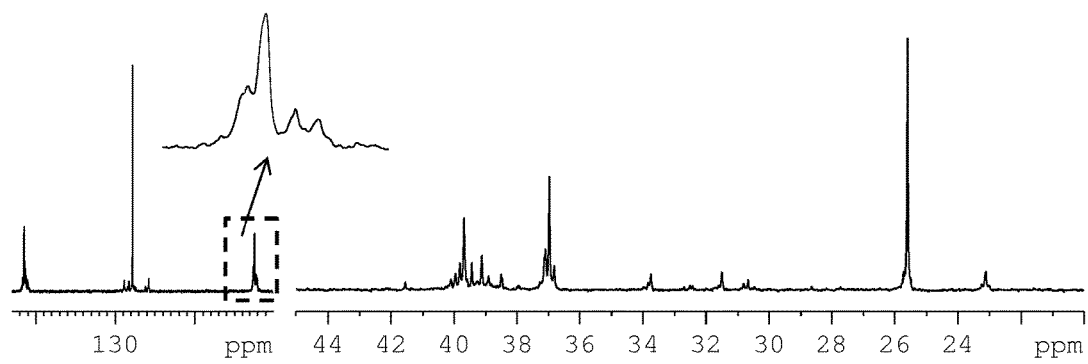
FIG. 19 shows the $^{13}$C-NMR spectrum of the stereoregular diblock polybutadiene of Example 16 (G1131)
Figure 20:
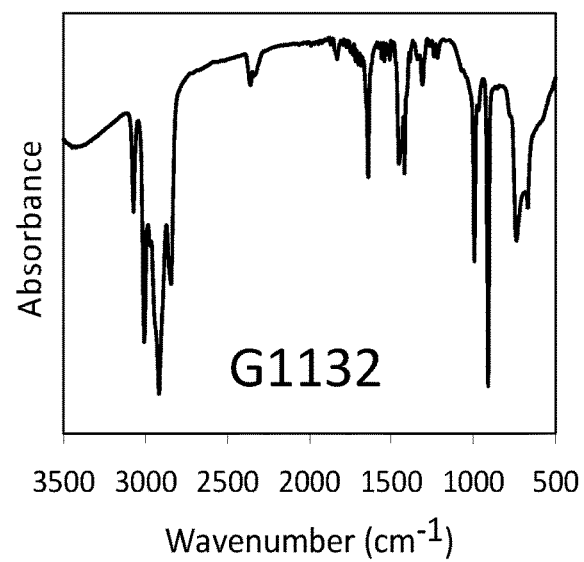
FIG. 20 shows the FT-IR spectrum of the stereoregular diblock polybutadiene of Example 17 (G1132)
Figure 22:
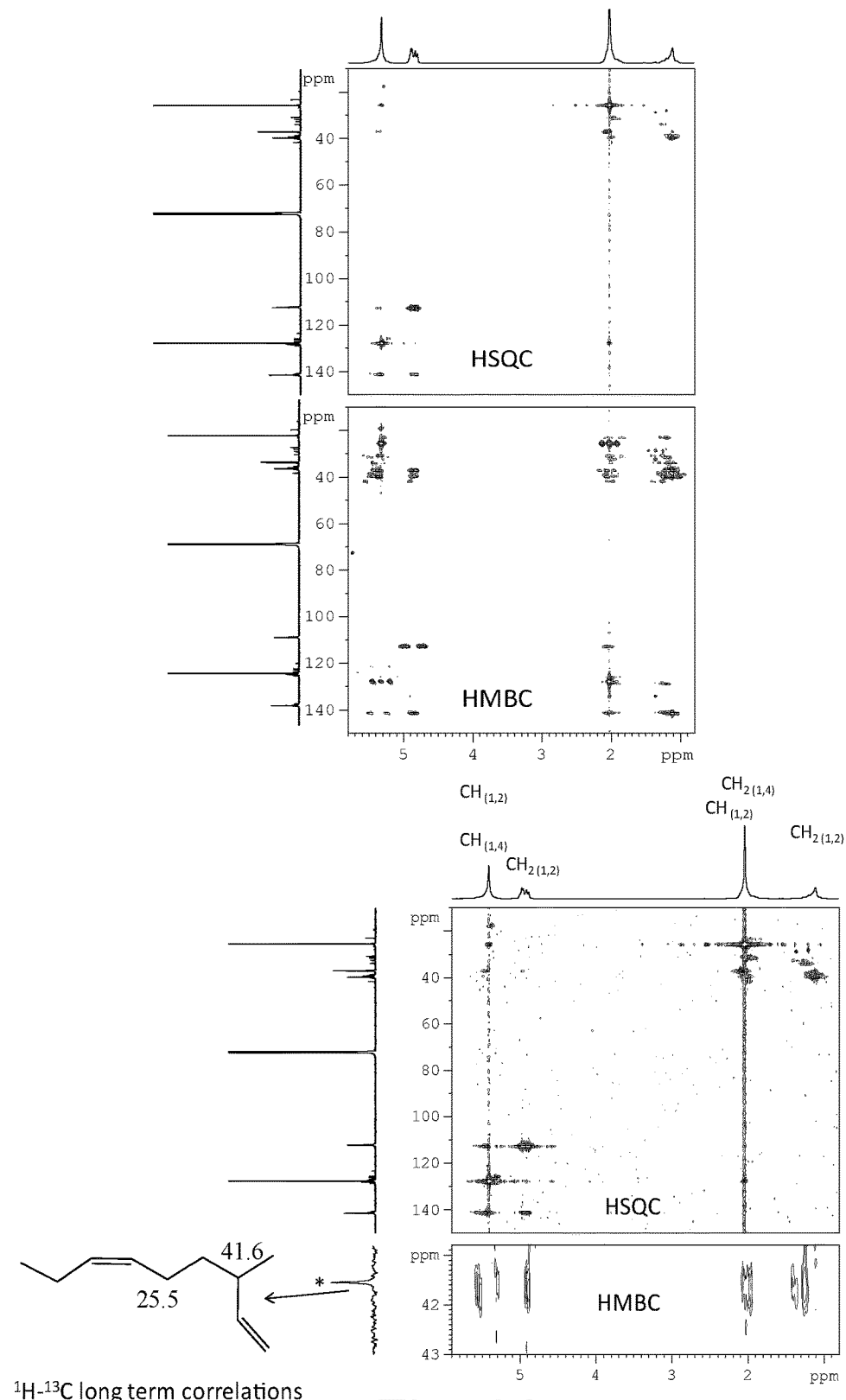
FIG. 22 shows the two-dimensional $^{13}$C-NMR spectrum of the stereoregular diblock polybutadiene of Example 17 (G1132)
Figure 23:
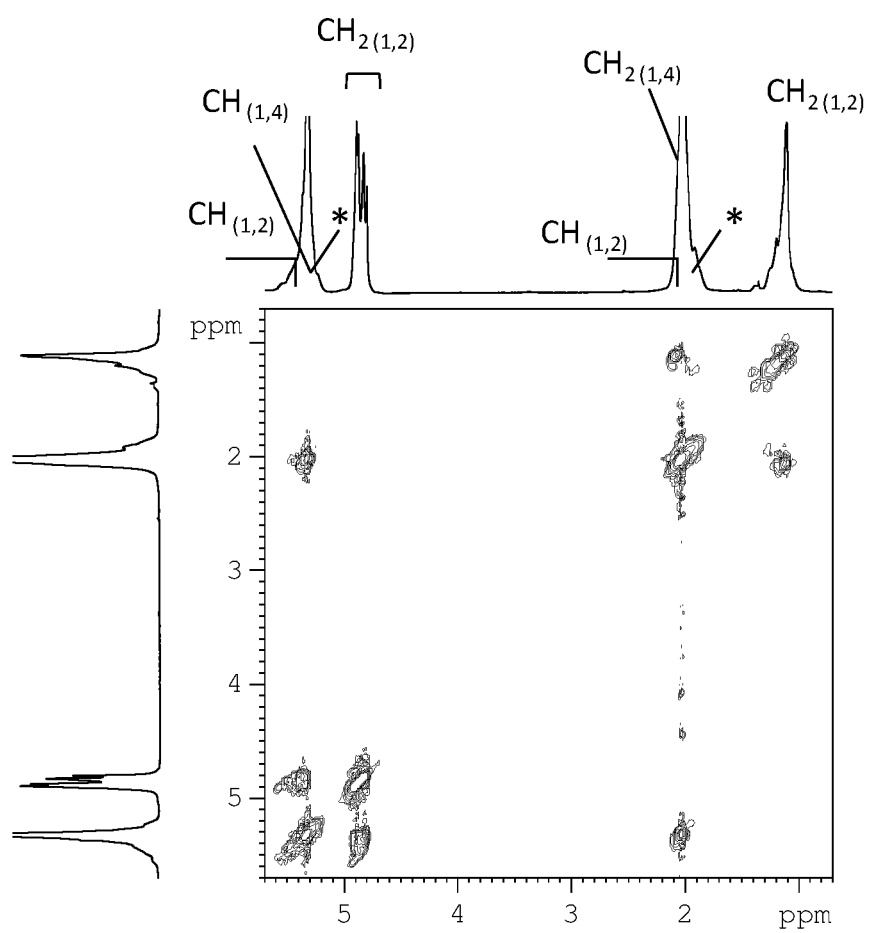
FIG. 23 shows the two-dimensional $^1$H-$^1$H COSY NMR spectrum of the stereoregular diblock polybutadiene of Example 17 (G1132)
Figure 24:
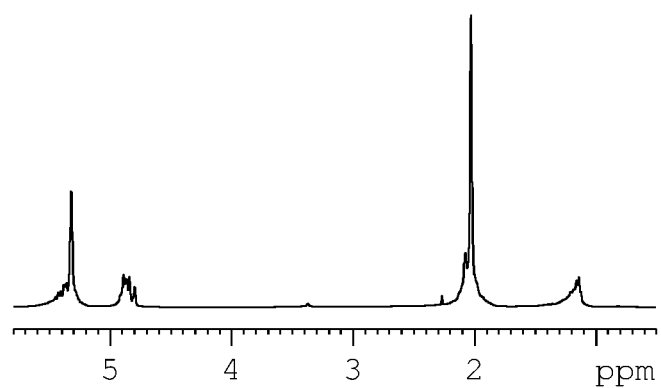
FIG. 24 shows the $^1$H-NMR spectrum of the stereoregular diblock polybutadiene of Example 17 (G1132)
Figure 25:
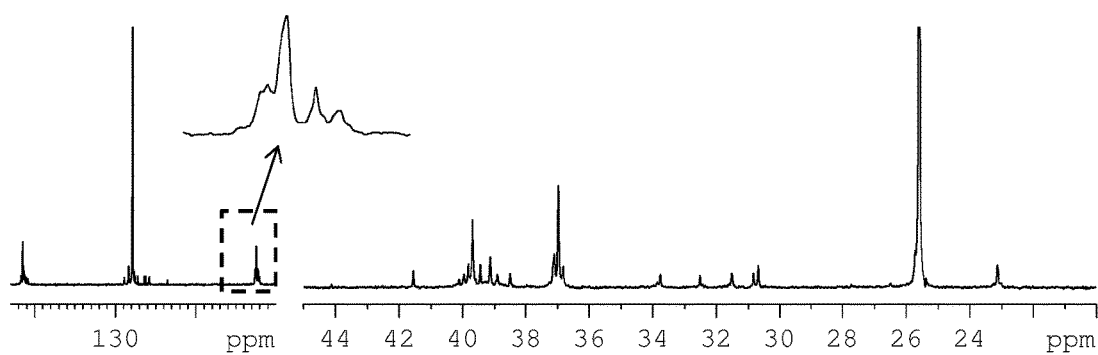
FIG. 25 shows the $^{13}$C-NMR spectrum of the stereoregular diblock polybutadiene of Example 17 (G1132)
Figure 26:
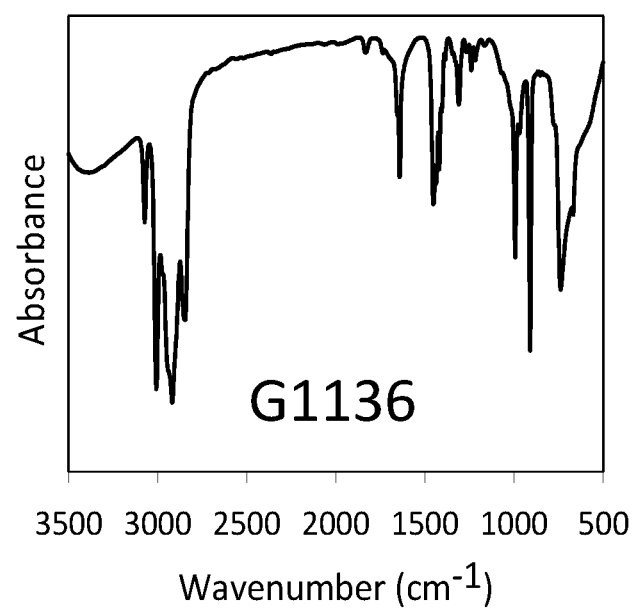
FIG. 26 shows the FT-IR spectrum of the stereoregular diblock polybutadiene of Example 18 (G1136)
Figure 27:
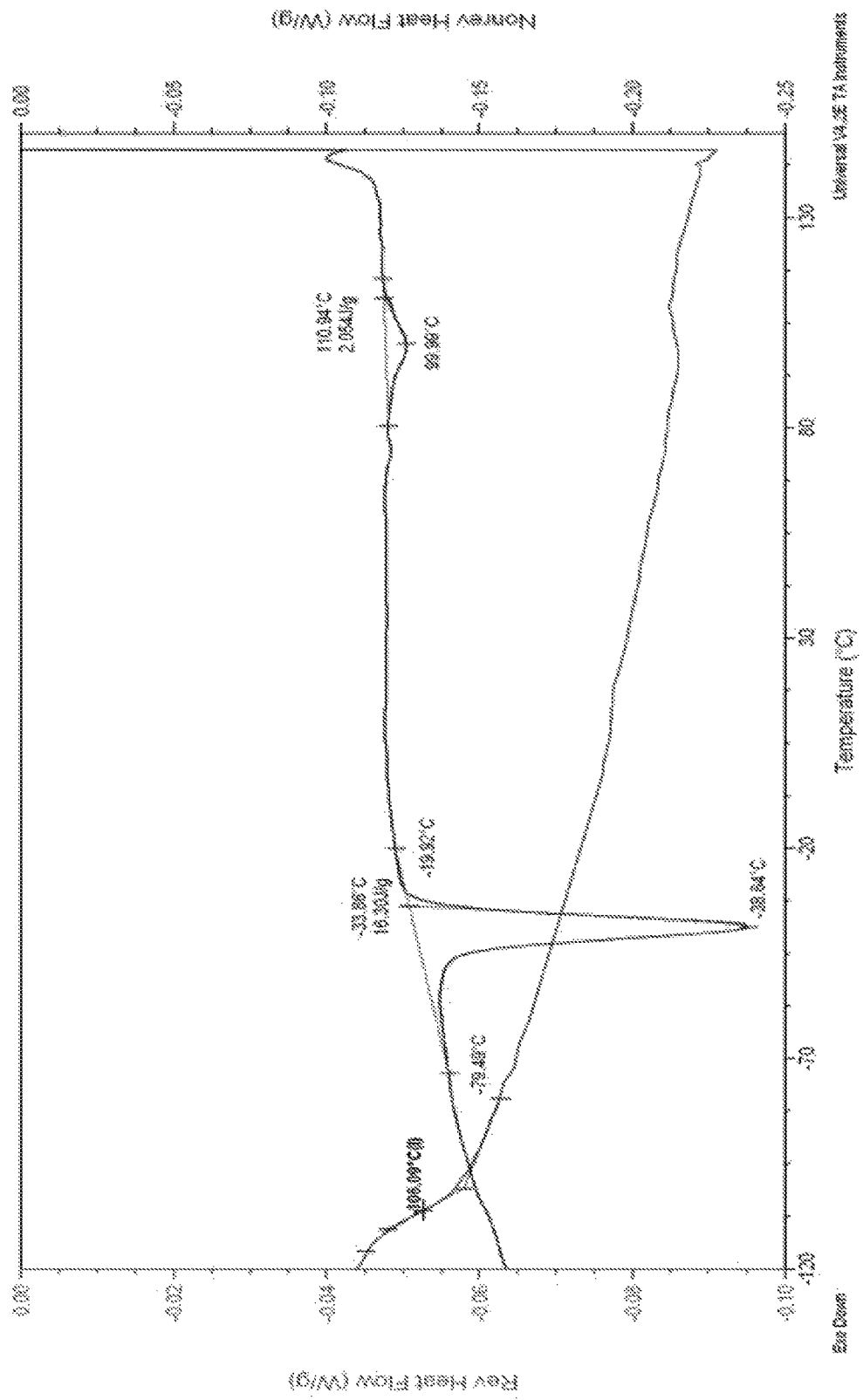
FIG. 27 shows the DSC diagrams of the stereoregular diblock polybutadiene of Example 18 (G1136)
Figure 28:
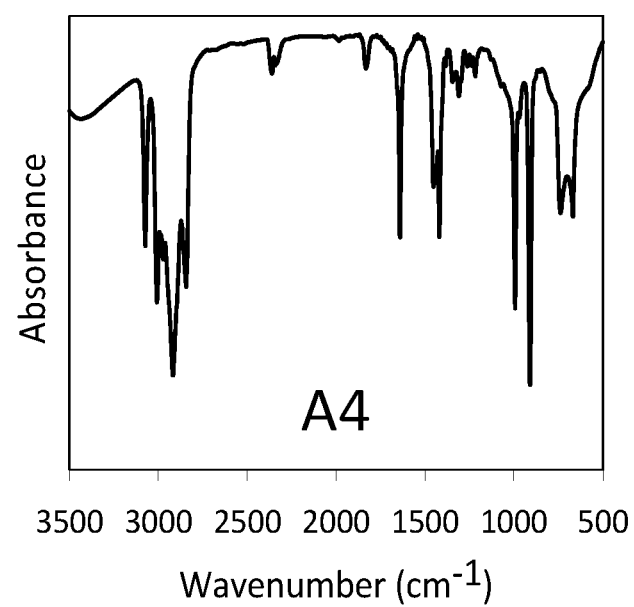
FIG. 28 shows the FT-IR spectrum of the stereoregular diblock polybutadiene of Example 19 (A4)
Figure 29:
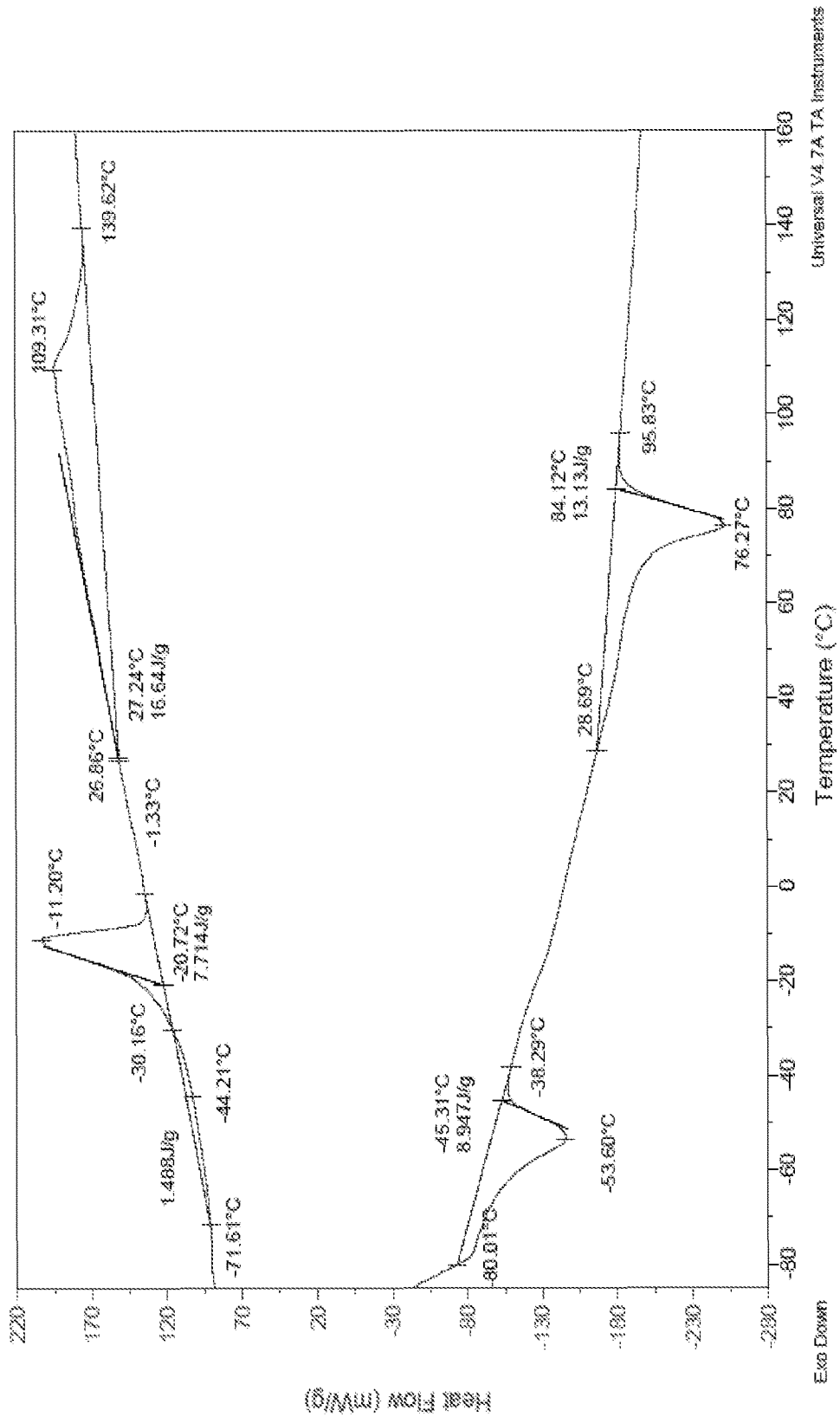
FIG. 29 shows the DSC diagrams of the stereoregular diblock polybutadiene of Example 19 (A4)
Figure 30:
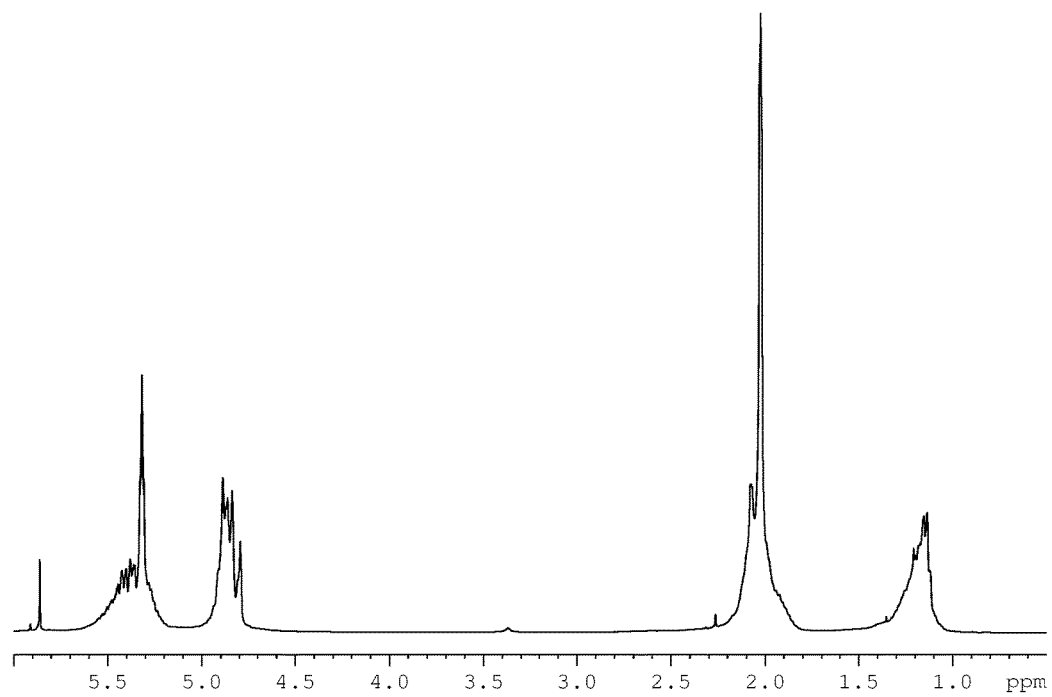
FIG. 30 shows the $^1$H-NMR spectrum of the stereoregular diblock polybutadiene of Example 19 (A4)
Figure 31:
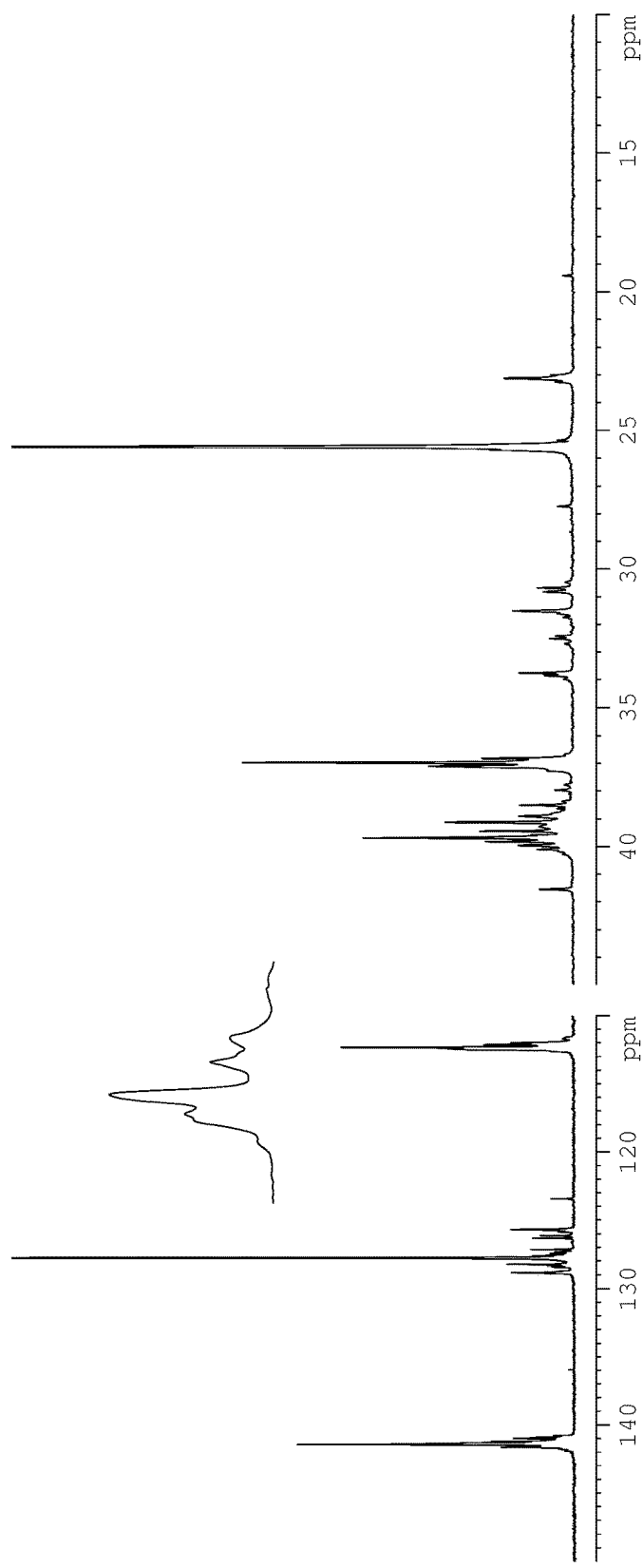
FIG. 31 shows the $^{13}$C-NMR spectrum of the stereoregular diblock polybutadiene of Example 19 (A4)
Figure 32:
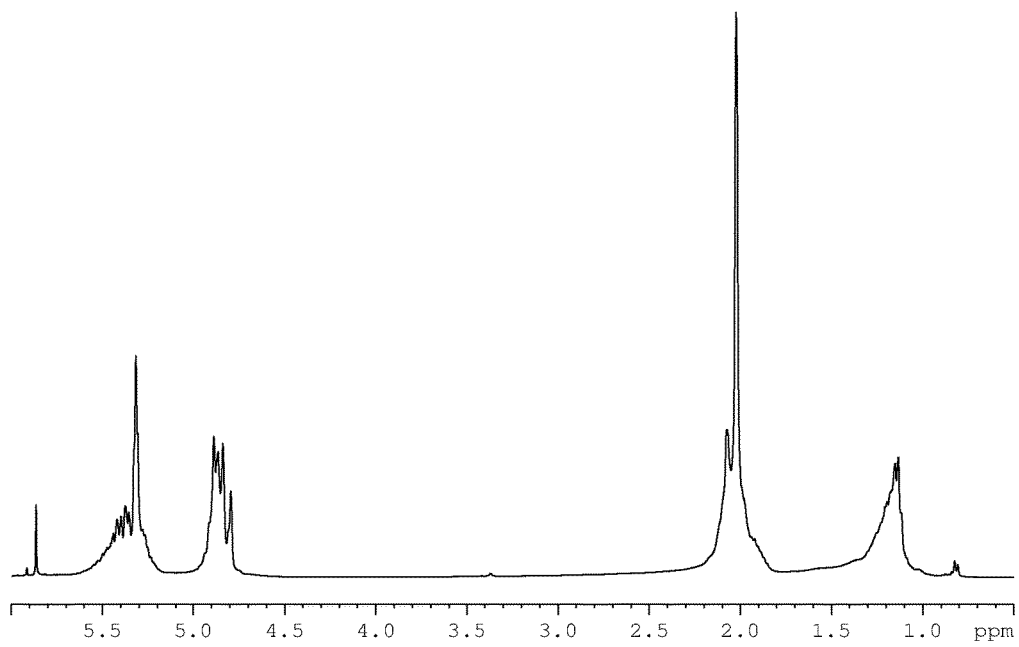
FIG. 32 shows the $^1$H-NMR spectrum of the stereoregular diblock polybutadiene of Example 20 (A5)
Figure 33:
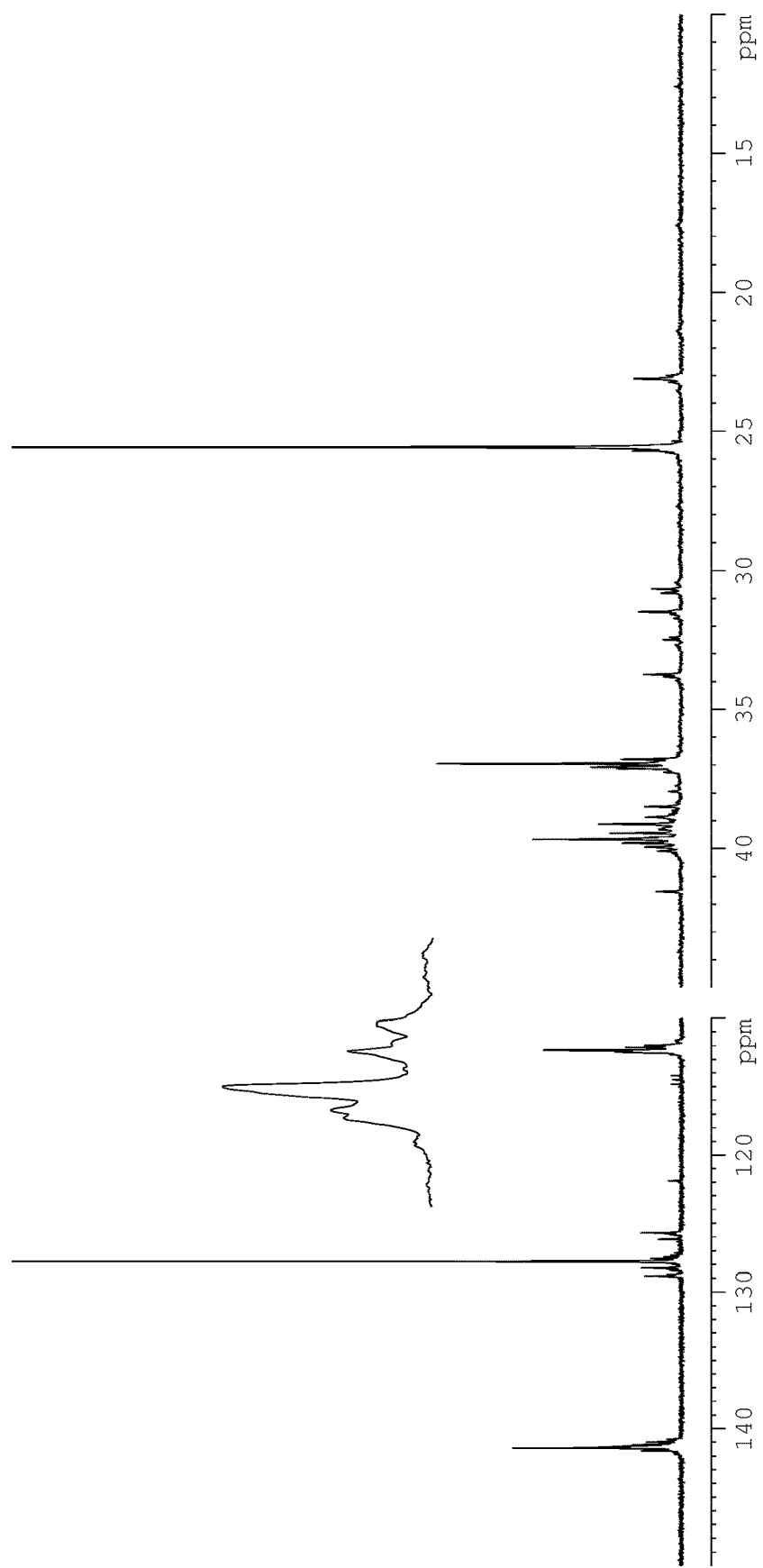
FIG. 33 shows the $^{13}$C-NMR spectrum of the stereoregular diblock polybutadiene of Example 20 (A5)
Figure 34:
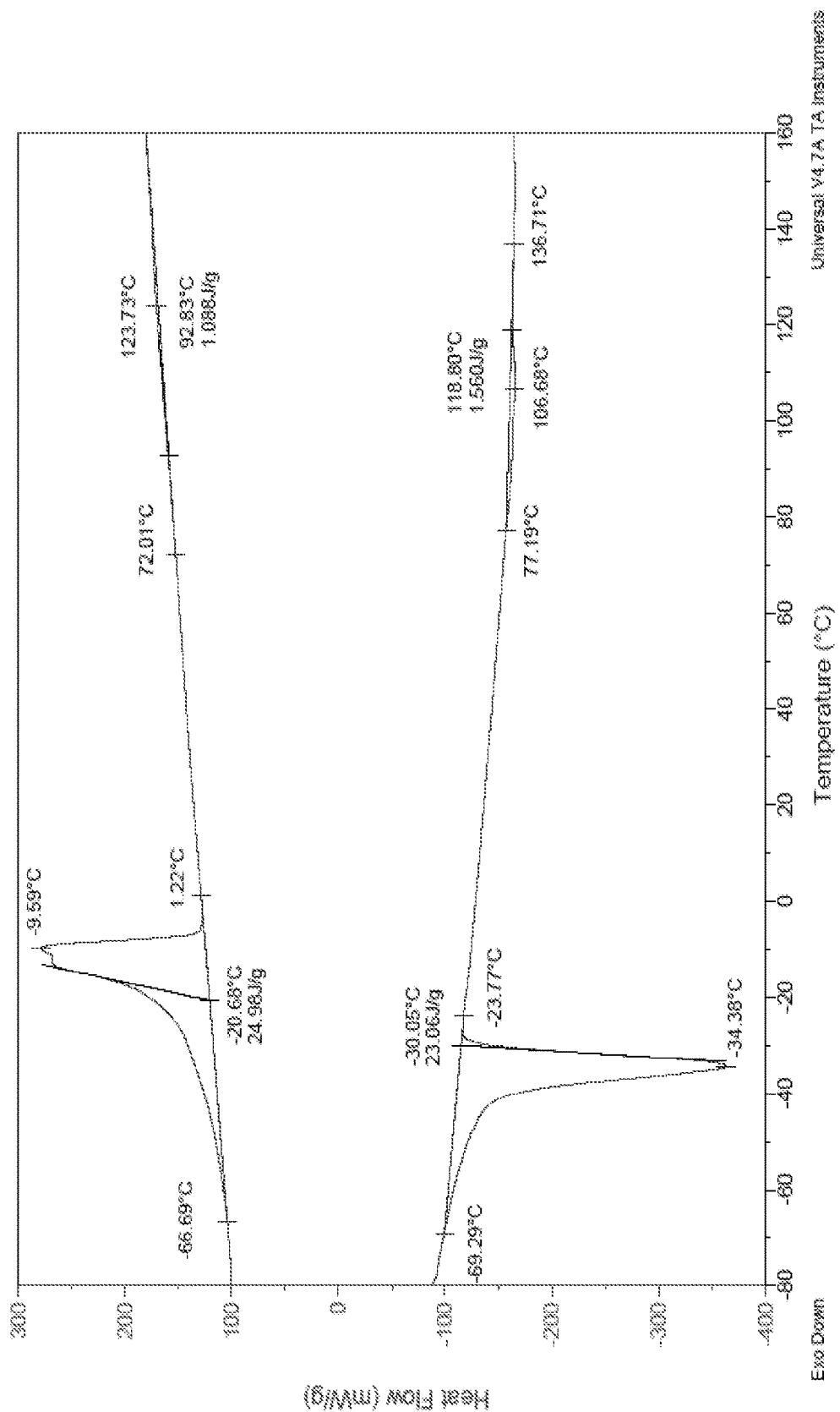
FIG. 34 shows the DSC diagrams of the stereoregular diblock polybutadiene of Example 20 (A5)
Figure 35:
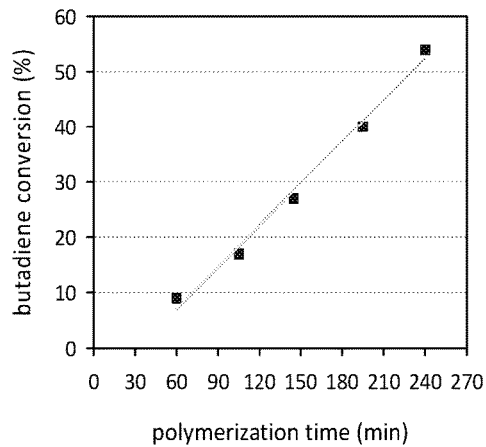
FIG. 35 shows the conversion percentage (above) and yield in grams (below) in relation to the polymerization time (Examples 21-25 of Table 1)
Figure 35:
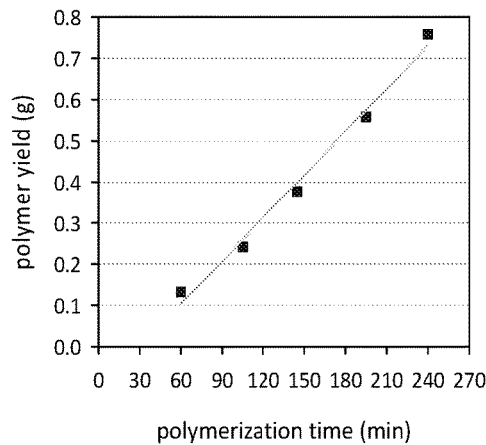
Figure 36:
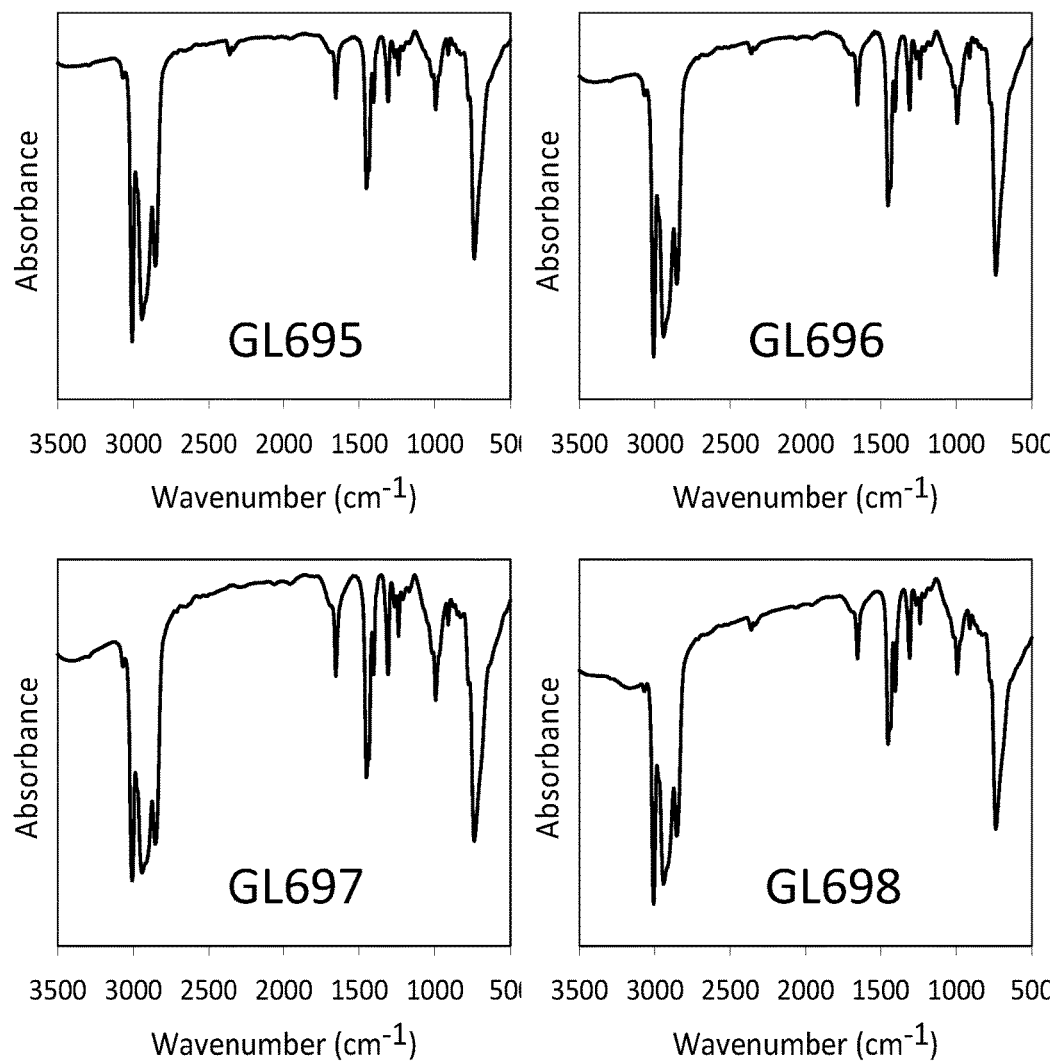
FIG. 36 shows the FT-IR spectra of the polybutadienes obtained: GL694 (Example 21); GL695 (Example 22); GL696 (Example 23); GL697 (Example 24); GL698 (Example 25).

Some illustrative and non-limiting examples are provided hereunder for a better understanding of the present invention and for its practical embodiment, with reference to the attached figures in which:

FIG. 1 shows the FT-IR spectrum of the complex $CoCl_2$ (L2) (GL923) (Example 4) (after subtraction of the nujol bands);

FIG. 2 shows the FT-IR spectrum of the complex $CoCl_2$ (L4) (GL924) (Example 8) (after subtraction of the nujol bands);

FIG. 3 shows the FT-IR spectrum of the polybutadiene of Example 9 (GL661);

FIG. 4 shows the $^{13}$C-NMR spectrum (on the left) and $^1$H-NMR spectrum (on the right) of the polybutadiene of Example 11 (GL962);

FIGS. 5A and 5B show the DSC diagrams of the polybutadiene of Example 11 (GL962): (5A) crystallization; (5B) melting;

FIG. 6 shows the DSC diagrams of the stereoregular diblock polybutadiene of Example 12 (A2);

FIG. 7 shows the $^1$H-NMR spectrum of the stereoregular diblock polybutadiene of Example 12 (A2);

FIG. 8 shows the $^{13}$C-NMR spectrum of the stereoregular diblock polybutadiene of Example 12 (A2);

FIG. 9 shows the FT-IR spectrum of the polybutadiene of Example 13 (GL639);

FIGS. 10A and 10B show the DSC diagrams of the polybutadiene of Example 15 (G1169): (10A) crystallization; (10B) melting;

FIG. 11 shows the $^{13}$C-NMR spectrum (on the left) and $^1$H-NMR spectrum (on the right) of the polybutadiene of Example 15 (GL1169);

FIGS. 12A and 12B show the Elastic moduli (G') at 130° C. (12A) and at 30° C. (12B) for the reference polybutadiene of Example 15 (G1169), for the stereoregular diblock polybutadienes of Examples 16 (G1131), 17 (G1132) and 18 (G1136) and for the samples of reference polybutadiene Europrene NEOCIS® BR 40 (BR40) and Buna CB 24 (CB24);

FIG. 13 shows the Elastic moduli (G') at 100 rad/s in relation to the temperature for the reference polybutadiene of Example 15 (G1169), for the diblock stereoregular polybutadienes of Examples 16 (G1131), 17 (G1132) and 18 (G1136) and for the sample of reference polybutadiene Europrene NEOCIS® BR 40 (BR40);

FIGS. 14A and 14B show the Elastic moduli (G') at 100 rad/s and at 0.1 rad/s, at 30° C. (14A) and at 130° C. (14B) for the reference polybutadiene of Example 15 (G1169), for the stereoregular diblock polybutadienes of Example 16 (G1131), 17 (G1132) and 18 (G1136) and for the sample of reference polybutadiene Europrene NEOCIS® BR 40 (BR40);

FIG. 15 shows the Van Gurp-Palmen diagrams of: a) reference polybutadiene of Example 15 (G1169) and samples of reference polybutadiene Europrene NEOCIS® BR 40 (BR40) and Buna CB 24 (CB24); b) stereoregular diblock polybutadiene of Example 18 (G1136), reference polybutadiene of Example 15 (G1169) and samples of reference polybutadiene Europrene NEOCIS® BR 40 (BR40) and Buna CB 24 (CB24); c) stereoregular diblock polybutadiene of Example 17 (G1132), reference polybutadiene of Example 15 (G1169) and samples of reference polybutadiene Europrene NEOCIS® BR 40 (BR40) and Buna CB 24 (CB24); d) stereoregular diblock polybutadiene of Example 16 (1131), reference polybutadiene of Example 15 (G1169) and samples of reference polybutadiene Europrene NEOCIS® BR 40 (BR40) and Buna CB 24 (CB24);

FIG. 16 shows the FT-IR spectrum of the stereoregular diblock polybutadiene of Example 16 (G1131);

FIG. 17 shows the DSC diagram of the stereoregular diblock polybutadiene of Example 16 (G1131);

FIG. 18 shows the $^1$H-NMR spectrum of the stereoregular diblock polybutadiene of Example 16 (G1131);

FIG. 19 shows the $^{13}$C-NMR spectrum of the stereoregular diblock polybutadiene of Example 16 (G1131);

FIG. 20 shows the FT-IR spectrum of the stereoregular diblock polybutadiene of Example 17 (G1132);

FIG. 21 relates to Atomic Force Microscopy (AFM) of the stereoregular diblock polybutadiene of Example 17 (G1132);

FIG. 22 shows the two-dimensional $^{13}$C-NMR spectrum of the stereoregular diblock polybutadiene of Example 17 (G1132);

FIG. 23 shows the two-dimensional $^1$H-$^1$H COSY NMR spectrum of the stereoregular diblock polybutadiene of Example 17 (G1132);

FIG. 24 shows the $^1$H-NMR spectrum of the stereoregular diblock polybutadiene of Example 17 (G1132);

FIG. 25 shows the $^{13}$C-NMR spectrum of the stereoregular diblock polybutadiene of Example 17 (G1132);

FIG. 26 shows the FT-IR spectrum of the stereoregular diblock polybutadiene of Example 18 (G1136);

FIG. 27 shows the DSC diagrams of the stereoregular diblock polybutadiene of Example 18 (G1136);

FIG. 28 shows the FT-IR spectrum of the stereoregular diblock polybutadiene of Example 19 (A4);

FIG. 29 shows the DSC diagrams of the stereoregular diblock polybutadiene of Example 19 (A4);

FIG. 30 shows the $^1$H-NMR spectrum of the stereoregular diblock polybutadiene of Example 19 (A4);

FIG. 31 shows the $^{13}$C-NMR spectrum of the stereoregular diblock polybutadiene of Example 19 (A4);

FIG. 32 shows the $^1$H-NMR spectrum of the stereoregular diblock polybutadiene of Example 20 (A5);

FIG. 33 shows the $^{13}$C-NMR spectrum of the stereoregular diblock polybutadiene of Example 20 (A5);

FIG. 34 shows the DSC diagrams of the stereoregular diblock polybutadiene of Example 20 (A5);

FIG. 35 shows the conversion percentage (above) and yield in grams (below) in relation to the polymerization time (Examples 21-25 of Table 1);

FIG. 36 shows the FT-IR spectra of the polybutadienes obtained: GL694 (Example 21); GL695 (Example 22); GL696 (Example 23); GL697 (Example 24); GL698 (Example 25).

EXAMPLES

Reagents and Materials

The reagents and materials used in the following examples of the invention are indicated in the following list, together with their optional pretreatments and their supplier:
- aniline (Aldrich): distilled at reduced pressure and preserved in an inert atmosphere;
- cobalt dichloride ($CoCl_2$) (Strem Chemicals): used as such;
- tetrahydrofuran (THF) (Carlo Erba, RPE): kept at reflux temperature on potassium/benzophenone and then distilled under nitrogen;
- formic acid (85%) (Carlo Erba, RPE): used as such;
- 2,4-pentanedione (Aldrich): used as such;
- 2,3-butanedione (Aldrich): used as such;
- 2-tert-butylaniline (Aldrich): distilled at reduced pressure and preserved in an inert atmosphere, or used as such;
- 2,6-di-iso-propylaniline (Aldrich): distilled at reduced pressure and preserved in an inert atmosphere, or used as such;
- benzene (Aldrich): used as such;

cyclohexylamine (Aldrich): used as such;
2,6-diacetylpyridine (Aldrich): used as such;
toluene (Aldrich): pure, ≥99.5%, distilled on sodium (Na) in an inert atmosphere;
pentane (Aldrich): pure, ≥99.5%, distilled on sodium (Na) in an inert atmosphere;
methylaluminoxane (MAO) (toluene solution at 10% by weight) (Aldrich): used as such;
diethylether (Carlo Erba, RPE): used as such;
chloroform (Carlo Erba, RPE): used as such;
1,3-butadiene (Air Liquide): pure, ≥99.5%, evaporated from the container before each production, dried by passing it through a column packed with molecular sieves and condensed inside the reactor which has been pre-cooled to −20° C.;
hydrochloric acid in aqueous solution at 37% (Aldrich): used as such;
sodium carbonate ($Na_2CO_3$) (Aldrich): used as such;
methanol (Carlo Erba, RPE): anhydrified by distillation on magnesium (Mg), or used as such;
dichloromethane (≥99%) (Aldrich): distilled on diphosphorous pentaoxide ($P_2O_5$) in an inert atmosphere, or used as such;
deuterated tetrachloroethane ($C_2D_2Cl_4$) (Acros): used as such;
deuterated chloroform ($CDCl_3$) (Acros): used as such;
iso-propyl-diphenylphosphine ($P^iPrPh_2$) (Strem Chemicals): used as such;
cyclohexyl-diphenylphosphine ($PCyPh_2$) (Strem Chemicals): used as such.

Analysis and Characterization Methods

The following analysis and characterization methods were used.

Elemental Analysis a) Determination of Co

For the determination of the weight quantity of cobalt (Co) in the complexes of cobalt used for the aim of the present invention, an aliquot weighed exactly, operating in a dry-box under a nitrogen flow, of about 30-50 mg of sample, was placed in a platinum crucible of about 30 ml, together with a mixture of 1 ml of hydrofluoric acid (HF) at 40%, 0.25 ml of sulfuric acid ($H_2SO_4$) at 96% and 1 ml of nitric acid ($HNO_3$) at 70%. The crucible was then heated on a plate, increasing the temperature until the appearance of white sulfuric fumes (about 200° C.). The mixture thus obtained was cooled to room temperature (20° C.-25° C.), 1 ml of nitric acid ($HNO_3$) at 70% was added and the mixture was then heated until the re-appearance of fumes. After repeating the sequence a further two times, a limpid, almost colourless solution was obtained. 1 ml of nitric acid ($HNO_3$) and about 15 ml of water were then cold added, and the mixture was then heated to 80° C. for about 30 minutes. The sample thus prepared was diluted with water having a MilliQ purity up to a weight of about 50 g, weighed exactly, to obtain a solution on which analytical instrumental determination was carried out using an ICP-OES (optical detection plasma) Thermo Optek IRIS Advantage Duo spectrometer, by comparison with solutions at a known concentration. For this purpose, a calibration line was prepared for each analyte, within the range of 0 ppm-10 ppm, measuring solutions having a known titre obtained by dilution by weight of certified solutions.

The solution of the sample prepared as described above was diluted again by weighing so as to obtain concentrations close to those used as reference, before carrying out spectrophotometric analysis. All the samples were prepared in duplicate. The results were considered acceptable if the single data of the tests in duplicate did not differ by more than 2% relative with respect to their average value.

b) Chlorine Determination

For this purpose, samples of the complexes of cobalt used for the aim of the present invention, about 30 mg-50 mg, were weighed exactly in 100 ml glasses in a dry-box under a stream of nitrogen. 2 g of sodium carbonate ($Na_2CO_3$) and, outside the dry-box, 50 ml of MilliQ water, were added. The mixture was brought to boiling point on a plate under magnetic stirring for about 30 minutes. It was left to cool, diluted sulfuric acid ($H_2SO_4$) ⅕, was added until the reaction became acid and the mixture was titrated with silver nitrate ($AgNO_3$) 0.1 N with a potentiometer titrator.

c) Determination of Carbon, Hydrogen and Nitrogen

The determination of the carbon, hydrogen, and nitrogen, in the complexes of cobalt, used for the aim of the present invention, as well as in the ligands used for the aim of the present invention, was carried out using a Carlo Erba automatic analyzer Mod. 1106.

$^{13}$C-HMR and $^1$H-HMR Spectra

The $^{13}$C-HMR and $^1$H-HMR spectra were registered by means of a nuclear magnetic resonance spectrometer mod. Bruker Avance 400, using deuterated tetrachloroethane ($C_2D_2Cl_4$) at 103° C., and hexamethyldisiloxane (HDMS) as internal standard, or using deuterated chloroform ($CDCl_3$), at 25° C., and tetramethylsilane (TMS) as internal standard. Polymeric solutions having concentrations equal to 10% by weight with respect to the total weight of the polymeric solution, were used for the purpose.

The microstructure of the polymers, i.e. content of 1,4-cis units (%), content of 1,2 units (%) and content of syndiotactic triads [(rr) (%)], was determined by analysis of the above spectra on the basis of what is indicated in literature by Mochel, V. D., in "Journal of Polymer Science Part A-1: Polymer Chemistry" (1972), Vol. 10, Issue 4, pages 1009-1018.

Two-Dimensional $^{13}$C-NMR Spectra

The two-dimensional $^{13}$C-NMR spectra were registered by means of a nuclear magnetic resonance spectrometer mod. Bruker Avance 400, using deuterated tetrachloroethane ($C_2D_2Cl_4$) at 103° C., and hexamethyldisiloxane (HDMS) as internal standard. Polymeric solutions having concentrations equal to 10% by weight with respect to the total weight of the polymeric solution, were used for the purpose.

The attribution of the signals was carried out by means of two-dimensional HSQC ("Heteronuclear Single Quantum Correlation") and HMBC ("Heteronuclear Multiple Bond Correlation") NMR techniques which allow long-term proton-carbon correlations to be established ("$^1$H-$^{13}$C long term correlations").

FIG. 22, provided hereunder, for example, shows the spectra obtained for the stereoregular diblock polybutadiene obtained in Example 17 (G1132) which had the following signals: 30.7 ppm, 25.5 ppm, and 41.6 ppm:

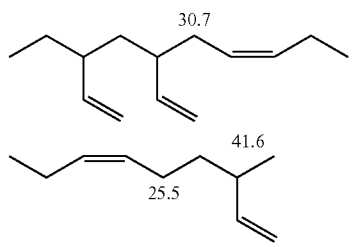

Furthermore, the two-dimensional $^1$H-$^1$H COSY ("Correlation Spectroscopy") NMR technique allowed the chemical shifts of the protons of the adjacent 1,4-cis and 1,2 units (i.e. the junction units indicated with *) "different" from those attributable to the 1,4-cis and 1,2 units inside the respective blocks, to be identified. By crossing the data obtained with said $^1$H-$^1$H COSY technique, with the data obtained with the above-mentioned HSQC and HMBC techniques, it was possible to identify the signals relating to the junctions between different units. FIG. 23 provided hereunder, for example, shows the spectrum obtained for the stereoregular diblock polybutadiene obtained in Example 17 (G1132).

I.R. Spectra

The I.R. spectra (FT-IR) were registered by means of Thermo Nicolet Nexus 670 and Bruker IFS 48 spectrophotometers.

The I.R. spectra (FT-IR) of the ligands used in the present invention, were obtained by dispersing the ligands to be analyzed in anhydrous potassium bromide (KBr) (disks of KBr), or in a suspension of nujol.

The I.R. spectra (FT-IR) of the complexes of cobalt used in the present invention, were obtained by dispersing the complex of cobalt to be analyzed in anhydrous potassium bromide (KBr) (disks of KBr), or in a suspension of nujol.

The I.R. spectra (FT-IR) of the polymers were obtained from polymeric films on tablets of potassium bromide (KBr), said films being obtained by deposition of a solution of the polymer to be analyzed in hot o-dichlorobenzene. The concentration of the polymeric solutions analyzed was equal to 10% by weight with respect to the total weight of the polymeric solution.

Thermal Analysis (DSC)

The DSC ("Differential Scanning calorimetry") thermal analysis, for determining the melting point ($T_m$), the glass transition temperature ($T_g$) and the crystallization temperature ($T_c$) of the polymers obtained, was carried out using a differential scanning calorimeter DSC Q1000 of TA Instruments.

Standard DSC ("Differential Scanning calorimetry"—DSC STD) thermal analysis envisages the use of isothermal conditions or a constant variation in the temperature over the whole measurement range. Under these conditions, the interpretation of various transformations, or the quantification of some processes and the energy involved therein, is often complex and at times impossible. In order to solve these difficulties, the Temperature Modulated Differential Scanning calorimetry" technique (TMDSC) was introduced, in which a variation in relation to the time, called modulation, is applied to the classical temperature profile. The basic difference between DSC STD and TMDSC therefore lies in the application of a modulated temperature profile superimposed with respect to the simple linear variation of the temperature, with a consequent continuous variation of the instantaneous heating rate. This allows the contribution to the heat flow given by phenomena which relate to the variation in the heating rate (i.e. the reversing heat flow) such as the heat capacity (Cp), to be identified and deconvolved. By the difference between the total heat flow (measured at a constant rate) and the reversing heat flow, the contribution given by phenomena which do not relate to the heat capacity (i.e. the non-reversing heat flow), can be separated.

In practice, this separation consists of being able to distinguish processes of the glass transition/melting/crystallization type which take place within the same temperature range according to the following equation:

$$dH/dt = Cp(dT/dt) + f(T,t)$$

wherein:
dH/dt is the total heat flow;
Cp is the heat capacity;
(dT/dt) is the heating rate;
Cp(dT/dt) is the reversing heat flow;
f(T,t) is the non-reversing heat flow.

For these reasons, the following thermal cycles were applied, in which the Temperature Modulated Differential Scanning calorimetry (TMDSC) was applied during cooling cycles so as to be able to distinguish the crystallization phenomenon from the glass transition temperature(s) ($T_g$).

The cycles were repeated in order to ensure that the product does not degrade due to the temperature ($T_{max}=155°$ C.)

For this purpose, the thermal cycle applied to the samples was the following (T=temperature; v=scanning rate):
conditioning of the sample: heating from T=25° C. to T=155° C. at v=10° C./min in standard scanning followed by a cooling profile from T=155° C. to T=−130° C. at v=3° C./min in a modulation of +/−0.47° C. every 60 seconds with TMDSC (i.e. Modulated DSC) (1$^{St}$ cycle);
subsequent heating from T=−130° C. to T=155° C. at v=10° C./min (standard scanning) (2$^{nd}$ cycle);
maintaining the sample at T=155° C. for 2 minutes and subsequent cooling with the same procedure as the 1$^{st}$ cycle (TMDSC) (3$^{rd}$ cycle);
tail heating T=−130° C. to T=155° C. with the same procedure as the 2$^{nd}$ cycle (standard scanning) (4$^{th}$ cycle).

Molecular Weight Determination

The determination of the molecular weight (MW) of the polymers obtained was carried out by means of GPC ("Gel Permeation Chromatography") operating under the following conditions:
Agilent 1100 pump;
I.R. Agilent 1100 detector;
PL Mixed-A columns;
solvent/eluent: tetrahydrofuran (THF);
flow-rate: 1 ml/min;
temperature: 25° C.;
molecular mass calculation: Universal Calibration method.

The weight average molecular weight ($M_w$) and the polydispersion Index" (PDI) corresponding to the $M_w/M_n$ ratio ($M_n$ number average molecular weight), are reported.

Atomic Force Microscopy (AFM)

For this purpose, a thin film of the stereoregular diblock polybutadiene to be analyzed was prepared, by depositing a solution in chloroform or in toluene, of said stereoregular diblock polybutadiene, by means of spin-coating on a silicon substrate.

The analysis was carried out without dynamic contact (non-contact mode or tapping mode), using a NTEGRA Spectra atomic force microscope (AFM) of N-MDT. During the scanning of the surface of said thin film, the variations in the amplitude of the oscillations of the tip provide topographical information relating to the surface of the same (HEIGHT image). Furthermore, the phase variations of the oscillations of the tip can be used for distinguishing between different types of materials present on the surface of said film (different phases of the material). FIG. 21 provided hereunder, for example, shows the data obtained for the stereoregular diblock polybutadiene obtained in Example 17 (G1132).

Dynamic Mechanical Analysis (DMA)

The Dynamic Mechanical Analysis (DMA) was carried out using a RMS 800 rheometer of Rheometrics Scientific, equipped with 8 mm parallel plates geometry.

The samples to be analyzed were charged into the rheometer and thermostat-regulated at 130° C. before being analyzed. Four consecutive frequency sweeps were carried out for each sample, at 130° C., at 100 rad/s and at 0.01 rad/s, in order to reach the complete relaxation of the stress connected with the charging and the squeezing of the sample between the plates. A further series of frequency sweeps was carried out, on the same sample, downstream of this series of frequency sweeps, from 100 rad/s to 0.1 rad/s, at 110° C., 90° C., 70° C., 50° C. and 30° C., in order to study the response of the sample in relation to both the frequency and the temperature.

As a comparison, in addition to the polybutadiene sample obtained in Example 15 (G1169) [1,4-cis polybutadiene (reference homopolymer)], samples obtained from commercial polybutadienes with a high 1,4-cis content, i.e. Europrene NEOCIS® BR 40 (BR40) and Buna CB 24 (CB24), were subjected to the same analysis.

FIGS. 12-14 provided hereunder, for example, show the elastic modulus values (G') for the stereoregular diblock polybutadienes of Examples 16 (G1131), 17 (G1132) and 18 (G1136) and for the reference samples of polybutadiene of Example 15 (G1169), Europrene NEOCIS® BR 40 (BR40) and Buna CB 24 (CB24).

Example 1

Synthesis of the Ligand Having Formula (L1)

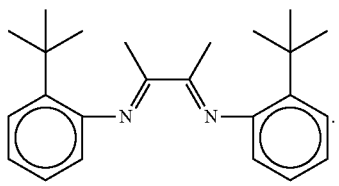

(L1)

A few drops of formic acid were added to a solution of 13.49 g (90 mmoles) of 2-tert-butylaniline in 50 ml of methanol, obtaining a yellow solution. A solution of 2,3-butandione (3.875 g-45 mmoles) in 30 ml of methanol was added dropwise to said solution, under stirring.

The whole mixture was left under stirring, at room temperature, for about 2 hours, until a yellow precipitate was observed. The mixture was left to rest for 14 hours and was subsequently filtered and dried under vacuum, at room temperature, obtaining 14.1 g of a yellow solid product (yield=90%) having formula (L1).

FT-IR (nujol): 1636 cm$^{-1}$ $v_{(C=N)}$.

Molecular weight (MW): 348.53.

Elemental analysis [found (calculated)]: C: 81.95% (82.71%); H: 9.26% (9.25%); N: 8.02% (8.01%).

Example 2

Synthesis of CoCl$_2$(L1) (GL649)

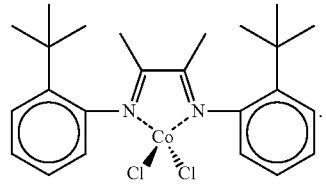

(GL649)

Cobalt dichloride (CoCl$_2$) (0.369 g; 2.84 mmoles) was introduced into a 100 ml reaction flask together with 70 ml of tetrahydrofuran (THF). The whole mixture was kept under stirring for a few minutes, at room temperature, and the ligand having formula (Li) (1.14 g; 3.27 mmoles; molar ratio L1/Co=1.15), obtained as described in Example 1, was then added. The green/light-blue suspension obtained was kept under stirring, at room temperature, for 48 hours. The solvent was then removed under vacuum, and the solid residue obtained was dried under vacuum at room temperature, and subsequently charged onto the porous septum of a heated extractor for solids and extracted, in continuous, with pentane at boiling point, for 24 hours, in order to remove the unreacted ligand. The residue remaining on the porous septum was subsequently extracted again, in continuous, with dichloromethane at boiling point, for 24 hours, obtaining a green solution. The dichloromethane was removed under vacuum and the solid residue remaining on the porous septum was recovered and dried under vacuum, at room temperature, obtaining 1.107 g of a green solid product corresponding to the complex CoCl$_2$(L1), equal to a conversion of 81.5% with respect to the cobalt dichloride charged.

Elemental analysis [found (calculated)]: C: 59.80% (60.26%); H: 6.60% (6.74%); N: 5.70% (5.86%); Cl: 14.20% (14.82%); Co: 11.90% (12.32%).

Molecular weight (MW): 478.36

FT-IR (nujol): 1633 cm$^{-1}$ $v_{(C=N)}$.

Example 3

Synthesis of the Ligand Having Formula (L2)

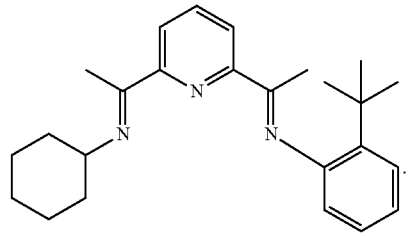

(L2)

5 drops of formic acid were added, under stirring, to a solution of 5.87 g (36 mmoles) of 2,6-diacetylpyridine and 4.84 g (32.4 mmoles) of 2-tert-butylaniline in anhydrous methanol (85 ml). The solution thus obtained was left in a refrigerator at 0° C., for 24 hours. After this period, the precipitation of a yellow microcrystalline solid product was obtained, which was recovered by filtration, washed with cold methanol, dried under vacuum at room temperature, obtaining 7 g of a light yellow solid product (yield=66%) having formula (L2a):

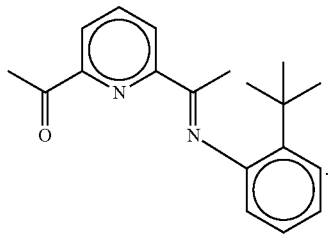

(L2a)

Elemental analysis [found (calculated)]: C: 78.0% (77.5%); H: 7.60% (7.53%); N: 9.65% (9.52%); O: 5.10% (5.45%).

Molecular weight (MW): 294.4

FT-IR (nujol): 1694 cm$^{-1}$ $\nu_{(C=O)}$, 1644 cm$^{-1}$ $\nu_{(C=N)}$.

$^1$HNMR (CDCl$_3$): 1.39 (s, 9H), 2.41 (s, 3H), 2.80 (s, 3H), 2.54 (dd, 1H), 7.24 (m, 2H), 7.43 (dd, 1H), 7.95 (t, 1H), 8.13 (dd, 1H), 8.50 (dd, 1H).

6.90 g (23.44 mmoles) of the product having formula (L2a) obtained as described above, 3.50 g (35.29 mmoles) of cyclohexylamine and a small amount of chloroform were heated to 100° C., without stirring, until the complete dissolution of the solid. After 20 hours, the excess of cyclohexylamine was removed and the residue obtained was dissolved in 100 ml of anhydrous methanol and cooled to 0° C. After 6 hours, yellow crystals were isolated by filtration and subsequently washed with cold methanol and dried under vacuum, obtaining 5.72 g of a yellow solid product (yield=65%) having formula (L2).

Elemental analysis [found (calculated)]: C: 80.05% (79.95%); H: 8.90% (8.86%); N: 11.20% (11.19%).

Molecular weight (MW): 375.55.

FT-IR (nujol): 1637 cm$^{-1}$ $\nu_{(C=N)}$.

Example 4

Synthesis of CoCl$_2$(L2) (GL923)

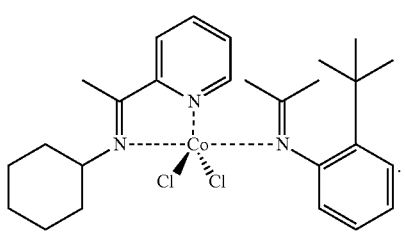

(GL923)

Anhydrous cobalt dichloride (CoCl$_2$) (0.335 g; 2.58 mmoles) was introduced into a 100 ml reaction flask together with 70 ml of tetrahydrofuran (THF). The whole mixture was kept under stirring, at room temperature, for a few minutes and the ligand having formula (L2) (1.067 g; 2.84 mmoles; molar ratio L2/Co=1.1), obtained as described in Example 3, was then added. Upon the addition of the ligand, a green suspension was immediately formed, which was kept under stirring, at room temperature, for 1 day. The solvent was then removed under vacuum and the residue obtained was dried under vacuum at room temperature, obtaining a green solid product which was charged onto the porous septum of a heated extractor for solids and extracted, in continuous, with pentane at boiling point, for 24 hours, in order to remove the un-reacted ligand. The green residue remaining on the porous septum was recovered and dried under vacuum at room temperature, obtaining 1.21 g of a dark-green solid product corresponding to the complex CoCl$_2$(L2) equal to a conversion of 93% with respect to the cobalt dichloride charged.

Elemental analysis [found (calculated)]: C: 59.0% (59.41%); H: 6.30% (6.58%); Cl: 13.70% (14.03%); Co: 11.30% (11.66%); N: 8.10% (8.31%).

Molecular weight (MW): 505.39.

FT-IR (nujol): 1590 cm$^{-1}$ $\nu_{(C=N)}$.

FIG. 1 shows the FT-IR spectrum of the complex CoCl$_2$(L2) obtained (after subtraction of the nujol bands).

Example 5

Synthesis of the Ligand Having Formula (L3)

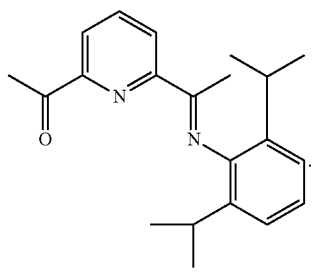

(L3)

2.48 mg (14 mmoles) of 2,6-di-iso-propylaniline were introduced into a reaction flask together with 5 ml of methanol, obtaining a clear solution. 0.25 ml of formic acid and 20 ml of methanol containing 1.96 g (12 mmoles) of 2,6-diacetylpyridine, were subsequently added, dropwise, to said solution, at room temperature. After about 1 hour, the precipitation of a yellow microcrystalline solid product was obtained: said yellow solid was recovered by filtration, washed with cold methanol and dried, under vacuum, at room temperature, obtaining 2.4 g of a light-yellow solid product (yield=62%) having formula (L3).

Elemental analysis [found (calculated)]: C: 77.80% (78.22%); H: 8.24% (8.13%); N: 8.51% (8.69%); O: 4.91% (4.96%).

Molecular weight (MW): 322.45.

FT-IR (nujol): 1700 cm$^{-1}$ $\nu_{(C=O)}$; 1648 cm$^{-1}$ $\nu_{(C=N)}$.

$^1$H-NMR (δ shift da TMS): 1.16 (d, 12H), 2.27 (s, 3H), 2.73 (m, 2H), 2.80 (s, 3H), 7.17 (m, 3H), 7.95 (t, 1H), 8.15 (d, 1H), 8.57 (d, 1H).

Example 6

Synthesis of CoCl$_2$(L3) (GL545)

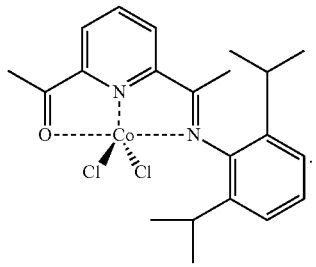

(GL545)

Anhydrous cobalt dichloride (CoCl$_2$) (0.401 g; 3.09 mmoles) was introduced into a 100 ml reaction flask together with tetrahydrofuran (THF) (40 ml). The whole mixture was kept under stirring, at room temperature, for a few minutes and the ligand having formula (L3) (1.20 g; 3.7 mmoles; molar ratio L3/Co=1.2), obtained as described in Example 5, was then added. Upon the addition of the ligand, a deep blue-coloured suspension was formed, which was kept, under stirring, at room temperature, for 1 day. The solvent was removed under vacuum and the residue obtained was dried under vacuum, at room temperature, and subsequently charged onto the porous septum of a heated extractor for solids and extracted, in continuous, with pentane at boiling point, for 24 hours, in order to remove the unreacted ligand. The residue remaining on the porous septum was then extracted again, in continuous, with dichloromethane at boiling point, for 24 hours, obtaining a green solution. The dichloromethane was removed under vacuum and the solid residue remaining on the porous septum was recovered and dried under vacuum at room temperature, obtaining 1.25 g of a dark-green solid product corresponding to the complex CoCl$_2$(L3), with a conversion of 89.4% with respect to the cobalt dichloride charged.

Elemental analysis [found (calculated)]: C: 55.20% (55.77%); H: 5.50% (5.79%); Cl: 15.30% (15.68%); Co: 12.80% (13.03%); N: 5.90% (6.19%); O: 3.20% (3.54%).

Molecular weight (MW): 452.28.

FT-IR (nujol): 1648 cm$^{-1}$ $\nu_{(C=O)}$; 1590 cm$^{-1}$ $\nu_{(C=N)}$; 334 cm$^{-1}$ $\nu_{(C=Cl)}$.

Example 7

Synthesis of the Ligand Having Formula (L4)

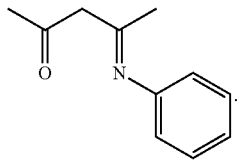

(L4)

5 g (50 mmoles) of 2,4-pentandione were poured into a reaction flask equipped with a Dean-Stark trap for the azeotropic removal of water, together with 75 ml of benzene, a few drops of hydrochloric acid and 4.66 g (50 mmoles) of aniline: the mixture obtained was heated to reflux temperature, under nitrogen, for 24 hours. The mixture was subsequently cooled to room temperature, filtered on a porous septum, obtaining a filtered product which was evaporated under vacuum obtaining an orange oil. The oil thus obtained was dissolved in ether (10 ml) and placed in a freezer for 24 hours, obtaining a solid product which was filtered and dried under vacuum, at room temperature, obtaining 4.3 g of a pale-yellow solid product (yield=62%) having formula (L4).

Elemental analysis [found (calculated)]: C: 75.20% (75.40%); H: 7.50% (7.48%); N: 8.0% (7.99%); O: 9.12% (9.13%).

Molecular weight (MW): 175.23.

FT-IR (nujol): 1620 cm$^{-1}$ $\nu_{(C=O)}$; 1577 cm$^{-1}$ $\nu_{(C=N)}$.

Example 8

Synthesis of CoCl$_2$(L4) (GL924)

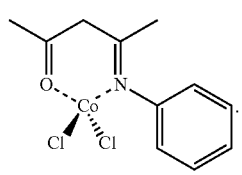

(GL924)

Anhydrous cobalt dichloride (CoCl$_2$) (0.415 g; 3.2 mmoles) was introduced into a 100 ml reaction flask together with tetrahydrofuran (THF) (70 ml). The whole mixture was kept under stirring, at room temperature, for a few minutes, and the ligand having formula (L4) (0.615 g; 3.51 mmoles; a molar ratio L4/Co=1.1), obtained as described in Example 7, was then added. An indigo-coloured suspension was immediately formed after the addition of the ligand, which was kept under stirring, at room temperature, for 1 day. The solvent was then removed under vacuum and the residue obtained was dried under vacuum, at room temperature and subsequently charged onto the porous septum of a heated extractor for solids and was extracted in continuous with pentane at boiling point, for 24 hours, in order to remove the unreacted ligand. The residue remaining on the porous septum was subsequently recovered and dried under vacuum, at room temperature, obtaining 0.87 g of an indigo-coloured solid product corresponding to the complex CoCl$_2$(L4), with a conversion of 89.1% with respect to the cobalt dichloride charged.

Elemental analysis [found (calculated)]: C: 42.90% (43.31%); H: 4.20% (4.30%); Cl: 22.90% (23.24%); Co: 18.90% (19.32%); N: 4.20% (4.59%); O: 5.0% (5.24%).

Molecular weight (MW): 305.07.

FT-IR (nujol): 1603 cm$^{-1}$ $\nu_{(C=O)}$; 1551 cm$^{-1}$ $\nu_{(C=N)}$.

FIG. 2 shows the FT-IR spectrum of the complex CoCl$_2$(L4) obtained (after subtraction of the nujol bands).

Example 9 (GL661)

Synthesis of 1,4-Cis Polybutadiene (Reference Homopolymer)

2 ml of 1,3-butadiene, equal to about 1.4 g, were condensed at a low temperature (−20°) in a 25 ml test-tube. 7.3 ml of toluene were subsequently added and the temperature of the solution obtained was brought to 20° C. Methylaluminoxane (MAO) in a toluene solution (6.3 ml; 1×10$^{-2}$ moles, equal to about 0.58 g) was then added, and subsequently the complex CoCl$_2$(L1) (GL649) (2.4 ml of toluene solution at a concentration of 2 mg/ml; 1×10$^{-5}$ moles, equal to about 4.8 mg), obtained as described in Example 2. The whole mixture was kept under magnetic stirring, at 20° C., for 30 minutes. The polymerization was then quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1.4 g of polybutadiene having a content of 1,4-cis units of 98.1%: further characteristics of the process and of the polybutadiene obtained are indicated in Table 1.

FIG. 3 shows the FT-IR spectrum of the polybutadiene obtained.

Example 10 (A1)

Synthesis of Stereoregular Diblock Polybutadiene with a 1,4-Cis/Syndiotactic 1,2 Structure (Invention)

2 ml of 1,3-butadiene, equal to about 1.4 g, were condensed at a low temperature (−20°) in a 25 ml test-tube. 7.3 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g), was then added and subsequently the complex CoCl$_2$(L1) (GL649) (2.4 ml of toluene solution at a concentration of 2 mg/ml; $1 \times 10^{-5}$ moles, equal to about 4.8 mg), obtained as described in Example 2. The whole mixture was kept under magnetic stirring, at 20° C., for 15 minutes, and cyclohexyl-diphenylphosphine (PCyPh$_2$) in a toluene solution (1.35 ml; $1 \times 10^{-5}$ moles, equal to about 2.7 mg; molar ratio P/Co=1.0), was finally added. The polymerization was left to proceed for a further 15 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1.4 g of stereoregular diblock polybutadiene having a block of polybutadiene with a 1,4-cis structure and a block of polybutadiene with a syndiotactic 1,2 structure (molar ratio 59/41): further characteristics of the process and of the stereoregular diblock polybutadiene obtained, are indicated in Table 1.

Example 11 (GL962)

Synthesis of 1,4-Cis Polybutadiene (Reference Homopolymer)

2 ml of 1,3-butadiene, equal to about 1.4 g, were condensed at a low temperature (−20°) in a 25 ml test-tube. 7.2 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex CoCl$_2$(L2) (GL923) (2.5 ml of toluene solution at a concentration of 2 mg/ml; $1 \times 10^{-5}$ moles, equal to about 5 mg), obtained as described in Example 4. The whole mixture was kept under magnetic stirring, at 20° C., for 140 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1,4 g of polybutadiene having a content of 1,4-cis units of 98.6%: further characteristics of the process and of the polybutadiene obtained are indicated in Table 1.

FIG. 4 shows the $^1$H-NMR and $^{13}$C-NMR spectra of the polybutadiene obtained.

FIG. 5 shows the DSC diagrams of the polybutadiene obtained.

Example 12 (A2)

Synthesis of Stereoregular Diblock Polybutadiene with a 1,4-Cis/Syndiotactic 1,2 Structure (Invention)

2 ml of 1,3-butadiene, equal to about 1.4 g, were condensed at a low temperature (−20°) in a 25 ml test-tube. 7.2 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex CoCl$_2$(L2) (GL923) (2.5 ml of toluene solution at a concentration of 2 mg/ml; $1 \times 10^{-5}$ moles, equal to about 5 mg), obtained as described in Example 4. The whole mixture was kept under magnetic stirring, at 20° C., for 60 minutes, and iso-propyl-diphenylphosphine (P$^i$PrPh$_2$) in a toluene solution (1.15 ml; $1 \times 10^{-5}$ moles equal to about 2.3 mg; molar ratio P/Co=1.0), was finally added. The polymerization was left to proceed for a further 80 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1.4 g of stereoregular diblock polybutadiene having a block of polybutadiene with a 1,4-cis structure and a block of polybutadiene with a syndiotactic 1,2 structure (molar ratio 41/59).

FIG. 6 shows the DSC diagrams of the stereoregular diblock polybutadiene obtained.

FIG. 7 and FIG. 8 show the $^1$H-NMR and $^{13}$C-NMR spectra of the stereoregular diblock polybutadiene obtained.

Example 13 (GL639)

Synthesis of 1,4-Cis Polybutadiene (Reference Homopolymer)

2 ml of 1,3-butadiene, equal to about 1.4 g, were condensed at a low temperature (−20°) in a 25 ml test-tube. 7.45 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex CoCl$_2$(L3) (GL545) (2.25 ml of toluene solution at a concentration of 2 mg/ml; $1 \times 10^{-5}$ moles, equal to about 4.5 mg), obtained as described in Example 6. The whole mixture was kept under magnetic stirring, at 20° C., for 30 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1.19 g of polybutadiene having a content of 1,4-cis units of 97.6%: further characteristics of the process and of the polybutadiene obtained are indicated in Table 1.

FIG. 9 shows the FT-IR spectrum of the polybutadiene obtained.

Example 14 (A3)

Synthesis of Stereoregular Diblock Polybutadiene with a 1,4-Cis/Syndiotactic 1,2 Structure (Invention)

2 ml of 1,3-butadiene, equal to about 1.4 g, were condensed at a low temperature (−20°) in a 25 ml test-tube. 7.45 ml of toluene were subsequently added and the temperature of the solution obtained was brought to 20° C. Methylaluminoxane (MAO) in a toluene solution (6.3 ml; $1×10^{-2}$ moles, equal to about 0.58 g) was then added, and subsequently the complex $CoCl_2(L3)$ (GL545) (2.25 ml of toluene solution at a concentration of 2 mg/ml; $1×10^{-5}$ moles, equal to about 4.5 mg), obtained as described in Example 6. The whole mixture was kept under magnetic stirring, at 20° C., for 5 minutes and cyclohexyl-diphenylphosphine ($PCyPh_2$) in a toluene solution (1.35 ml; $1×10^{-5}$ moles, equal to about 2.7 mg; molar ratio P/Co=1.0), was finally added. The polymerization was left to proceed for a further 25 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 1.4 g of stereoregular diblock polybutadiene having a block of polybutadiene with a 1,4-cis structure and a block of polybutadiene with a syndiotactic 1,2 structure (molar ratio 49/51).

Example 15 (G1169)

Synthesis of 1,4-Cis Polybutadiene (Reference Homopolymer)

5 ml of 1,3-butadiene, equal to about 3.5 g, were condensed at a low temperature (−20°) in a 100 ml test-tube. 42.1 ml of toluene were subsequently added and the temperature of the solution obtained was brought to 20° C. Methylaluminoxane (MAO) in a toluene solution (6.3 ml; $1×10^{-2}$ moles, equal to about 0.58 g) was then added, and subsequently the complex $CoCl_2(L4)$ (GL924) (1.56 ml of toluene solution at a concentration of 2 mg/ml; $1×10^{-5}$ moles, equal to about 3.12 mg), obtained as described in Example 8. The whole mixture was kept under magnetic stirring, at 20° C., for 95 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 3.4 g of polybutadiene having a content of 1,4-cis units of 97.2%: further characteristics of the process and polybutadiene obtained are indicated in Table 1.

FIG. 10 shows the DSC diagrams of the polybutadiene obtained.

FIG. 11 shows the $^1$H-NMR and $^{13}$C-NMR spectra of the polybutadiene obtained.

FIG. 12, FIG. 13 and FIG. 14, show the elastic moduli (G') of the polybutadiene obtained.

FIG. 15 shows the Van Gurp-Palmen diagram of the polybutadiene obtained.

Example 16 (G1131)

Synthesis of Stereoregular Diblock Polybutadiene with a 1,4-Cis/Syndiotactic 1,2 Structure (Invention)

5 ml of 1,3-butadiene, equal to about 3.5 g, were condensed at a low temperature (−20°) in a 100 ml test-tube. 42.1 ml of toluene were subsequently added and the temperature of the solution obtained was brought to 20° C. Methylaluminoxane (MAO) in a toluene solution (6.3 ml; $1×10^{-2}$ moles, equal to about 0.58 g) was then added, and subsequently the complex $CoCl_2(L4)$ (GL924) (1.56 ml of toluene solution at a concentration of 2 mg/ml; $1×10^{-5}$ moles, equal to about 3.12 mg), obtained as described in Example 8. The whole mixture was kept under magnetic stirring, at 20° C., for 10 minutes, and iso-propyl-diphenylphosphine ($P^iPrPh_2$) in a toluene solution (1.15 ml; $1×10^{-5}$ moles, equal to about 2.3 mg; molar ratio P/Co=1.0), was finally added. The polymerization was left to proceed for a further 300 minutes, and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 3.5 g of stereoregular diblock polybutadiene having a block of polybutadiene with a 1,4-cis structure and a block of polybutadiene with a syndiotactic 1,2 structure (molar ratio 34/66).

FIG. 16 shows the FT-IR spectrum of the polybutadiene obtained.

FIG. 17 shows the DSC diagrams of the stereoregular diblock polybutadiene obtained.

FIG. 18 and FIG. 19 show the $^1$H-NMR and $^{13}$C-NMR spectra of the stereoregular diblock polybutadiene obtained.

FIG. 12, FIG. 13 and FIG. 14, show the elastic moduli (G') of the stereoregular diblock polybutadiene obtained.

FIG. 15 shows the Van Gurp-Palmen diagram of the stereoregular diblock polybutadiene obtained.

Example 17 (G1132)

Synthesis of Stereoregular Diblock Polybutadiene with a 1,4-Cis/Syndiotactic 1,2 Structure (Invention)

5 ml of 1,3-butadiene, equal to about 3.5 g, were condensed at a low temperature (−20°) in a 100 ml test-tube. 42.1 ml of toluene were subsequently added and the temperature of the solution obtained was brought to 20° C. Methylaluminoxane (MAO) in a toluene solution (6.3 ml; $1×10^{-2}$ moles, equal to about 0.58 g) was then added, and subsequently the complex $CoCl_2(L4)$ (GL924) (1.56 ml of toluene solution at a concentration of 2 mg/ml; $1×10^{-5}$ moles, equal to about 3.12 mg), obtained as described in Example 8. The whole mixture was kept under magnetic stirring, at 20° C., for 30 minutes, and iso-propyl-diphenylphosphine ($P^iPrPh_2$) in a toluene solution (1.15 ml; $1×10^{-5}$ moles, equal to about 2.3 mg; molar ratio P/Co=1.0) was finally added, together with a further quantity of 1,3-butadiene (1 ml; about 0.7 g). The polymerization was left to proceed for a further 130 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 3.5 g of stereoregular diblock polybutadiene having a block of polybutadiene with a 1,4-cis structure and a block of polybutadiene with a syndiotactic 1,2 structure (molar ratio 60/40).

FIG. 20 shows the FT-IR spectrum of the stereoregular diblock polybutadiene obtained.

FIG. 21 shows the phase image and the profile obtained by means of Atomic Force Microscopy (AFM) of the stereoregular diblock polybutadiene obtained.

FIG. 22 shows the two-dimensional $^{13}$C-NMR spectra of the stereoregular diblock polybutadiene obtained.

FIG. 23 shows the two-dimensional $^1$H-$^1$H COSY NMR spectrum of the stereoregular diblock polybutadiene obtained.

FIG. 24 shows the $^1$H-NMR of the stereoregular diblock polybutadiene obtained.

FIG. 25 shows the $^{13}$C-NMR of the stereoregular diblock polybutadiene obtained.

FIG. 12, FIG. 13 and FIG. 14, show the elastic moduli (G') of the stereoregular diblock polybutadiene obtained.

FIG. 15 shows the Van Gurp-Palmen diagram of the stereoregular diblock polybutadiene obtained.

Example 18 (G1136)

Synthesis of Stereoregular Diblock Polybutadiene with a 1,4-Cis/Syndiotactic 1,2 Structure (Invention)

5 ml of 1,3-butadiene, equal to about 3.5 g, were condensed at a low temperature (−20°) in a 100 ml test-tube. 42.1 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex $CoCl_2(L4)$ (GL924) (1.56 ml of toluene solution at a concentration of 2 mg/ml; $1 \times 10^{-5}$ moles, equal to about 3.12 mg), obtained as described in Example 8. The whole mixture was kept under magnetic stirring at 20° C., for 60 minutes, and iso-propyl-diphenylphosphine ($P^iPrPh_2$) in a toluene solution (1.15 ml; $1 \times 10^{-5}$ moles, equal to about 2.3 mg; molar ratio P/Co=1.0) was finally added, together with additional 1,3-butadiene (2 ml; 1.4 g). The polymerization was left to proceed for a further 100 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba) obtaining 3.5 g of stereoregular diblock polybutadiene having a block of polybutadiene with a 1,4-cis structure and a block of polybutadiene with a syndiotactic 1,2 structure (molar ratio 69/31).

FIG. 26 shows the FT-IR spectrum of the stereoregular diblock polybutadiene obtained.

FIG. 27 shows the DSC diagrams of the stereoregular diblock polybutadiene obtained.

FIG. 12, FIG. 13 and FIG. 14, show the elastic moduli (G') of the stereoregular diblock polybutadiene obtained.

FIG. 15 shows the Van Gurp-Palmen diagram of the stereoregular diblock polybutadiene obtained.

Example 19 (A4)

Synthesis of Stereoregular Diblock Polybutadiene with a 1,4-Cis/Syndiotactic 1,2 Structure (Invention)

2 ml of 1,3-butadiene, equal to about 1.4 g, were condensed at a low temperature (−20°) in a 25 ml test-tube. 7.3 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex $CoCl_2(L1)$ (GL649) (2.4 ml of toluene solution at a concentration of 2 mg/ml; $1 \times 10^{-5}$ moles, equal to about 4.8 mg), obtained as described in Example 2. The whole mixture was kept under magnetic stirring, at 20° C., for 15 minutes, and cyclohexyl-diphenylphosphine ($PCyPh_2$) in a toluene solution (1.35 ml; $1 \times 10^{-5}$ moles equal to about 2.7 mg; molar ratio P/Co=1.0) was finally added, together with additional 1,3-butadiene (1 ml; 0.7 g). The polymerization was left to proceed for a further 30 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba) obtaining 2.1 g of stereoregular diblock polybutadiene having a block of polybutadiene with a 1,4-cis structure and a block of polybutadiene with a syndiotactic 1,2 structure (molar ratio 45/55).

FIG. 28 shows the FT-IR spectrum of the stereoregular diblock polybutadiene obtained.

FIG. 29 shows the DSC diagrams of the stereoregular diblock polybutadiene obtained.

FIG. 30 shows the $^1$H-NMR spectrum of the stereoregular diblock polybutadiene obtained.

FIG. 31 shows the $^{13}$C-NMR spectrum of the stereoregular diblock polybutadiene obtained.

Example 20 (A5)

Synthesis of Stereoregular Diblock Polybutadiene with a 1,4-Cis/Syndiotactic 1,2 Structure (Invention)

2 ml of 1,3-butadiene, equal to about 1.4 g, were condensed at a low temperature (−20°) in a 25 ml test-tube. 8.1 ml of toluene were subsequently added and the temperature of the solution obtained was brought to 20° C. Methylaluminoxane (MAO) in a toluene solution (6.3 ml; $1 \times 10^{-2}$ moles, equal to about 0.58 g) was then added, and subsequently the complex $CoCl_2(L4)$ (GL924) (1.56 ml of toluene solution at a concentration of 2 mg/ml; $1 \times 10^{-5}$ moles, equal to about 3.12 mg), obtained as described in Example 8. The whole mixture was kept under magnetic stirring at 20° C. for 15 minutes and iso-propyl-diphenylphosphine ($P^iPrPh_2$) in a toluene solution (1.15 ml; $1 \times 10^{-5}$ moles equal to about 2.3 mg; molar ratio P/Co=1.0) was finally added, together with additional 1,3-butadiene (2 ml; 1.4 g). The polymerization was left to proceed for a further 45 minutes and was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 2.8 g of stereoregular diblock polybutadiene having a block of polybutadiene with a 1,4-cis structure and a block of polybutadiene with a syndiotactic 1,2 structure (molar ratio 26/74).

FIG. 32 shows the $^1$H-NMR spectrum of the stereoregular diblock polybutadiene obtained.

FIG. 33 shows the $^{13}$C-NMR spectrum of the stereoregular diblock polybutadiene obtained.

FIG. 34 shows DSC diagrams of the stereoregular diblock polybutadiene obtained.

Example 21 (GL694)

Synthesis of Living 1,4-Cis Polybutadiene 2 ml of 1,3-butadiene, equal to about 1.4 g, were condensed at a low temperature (−20°) in a 25 ml test-tube. 10.44 ml of toluene were subsequently added and the temperature of the solution obtained was brought to 0° C. Methylaluminoxane (MAO) in a toluene solution (4.1 ml; $6.5 \times 10^{-3}$ moles, equal to about 0.58 g) was then added, and subsequently the complex $CoCl_2(L3)$ (GL545) (1.46 ml of toluene solution at a concentration of 2 mg/ml; $6.5 \times 10^{-6}$ moles, equal to about 2.93 mg), obtained as described in Example 6. The whole mixture was kept under magnetic stirring, at 0° C., for 60 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 0.133 g of polybutadiene having a content of 1,4-cis units equal to 98%: further characteristics of the process and of the polybutadiene obtained are indicated in Table 1.

Example 22 (GL695)

Synthesis of Living 1,4-Cis Polybutadiene 2 ml of 1,3-butadiene, equal to about 1.4 g, were condensed at a low temperature (−20°) in a 25 ml test-tube. 10.44 ml of toluene were subsequently added and the temperature of the solution obtained was brought to 0° C. Methylaluminoxane (MAO) in a toluene solution (4.1 ml; $6.5 \times 10^{-3}$ moles, equal to about 0.58 g) was then added, and subsequently the complex $CoCl_2(L3)$ (GL545) (1.46 ml of toluene solution at a concentration of 2 mg/ml; $6.5 \times 10^{-6}$ moles, equal to about 2.93 mg), obtained as described in Example 6. The whole mixture was kept under magnetic stirring, at 0° C., for 105 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 0.242 g of polybutadiene having a content of 1,4-cis units equal to 98%: further characteristics of the process and of the polybutadiene obtained are indicated in Table 1.

Example 23 (GL696)

Synthesis of Living 1,4-Cis Polybutadiene 2 ml of 1,3-butadiene, equal to about 1.4 g, were condensed at a low temperature (−20°) in a 25 ml test-tube. 10.44 ml of toluene were subsequently added and the temperature of the solution obtained was brought to 0° C., Methylaluminoxane (MAO) in a toluene solution (4.1 ml; $6.5 \times 10^{-3}$ moles, equal to about 0.58 g) was then added, and subsequently the complex $CoCl_2(L3)$ (GL545) (1.46 ml of toluene solution at a concentration of 2 mg/ml; $6.5 \times 10^{-6}$ moles, equal to about 2.93 mg), obtained as described in Example 6. The whole mixture was kept under magnetic stirring, at 0° C., for 145 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 0.377 g of polybutadiene having a content of 1,4-cis units equal to 98%: further characteristics of the process and of the polybutadiene obtained are indicated in Table 1.

Example 24 (GL697)

Synthesis of Living 1,4-Cis Polybutadiene 2 ml of 1,3-butadiene, equal to about 1.4 g, were condensed at a low temperature (−20°) in a 25 ml test-tube. 10.44 ml of toluene were subsequently added and the temperature of the solution obtained was brought to 0° C. Methylaluminoxane (MAO) in a toluene solution (4.1 ml; $6.5 \times 10^{-3}$ moles, equal to about 0.58 g) was then added, and subsequently the complex $CoCl_2(L3)$ (GL545) (1.46 ml of toluene solution at a concentration of 2 mg/ml; $6.5 \times 10^{-6}$ moles, equal to about 2.93 mg), obtained as described in Example 6. The whole mixture was kept under magnetic stirring, at 0° C., for 195 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 0.558 g of polybutadiene having a content of 1,4-cis units equal to 98%: further characteristics of the process and of the polybutadiene obtained are indicated in Table 1.

Example 25 (GL698)

Synthesis of Living 1,4-Cis Polybutadiene 2 ml of 1,3-butadiene, equal to about 1.4 g, were condensed at a low temperature (−20°) in a 25 ml test-tube. 10.44 ml of toluene were subsequently added and the temperature of the solution obtained was brought to 0° C. Methylaluminoxane (MAO) in a toluene solution (4.1 ml; $6.5 \times 10^{-3}$ moles, equal to about 0.58 g) was then added, and subsequently the complex $CoCl_2(L3)$ (GL545) (1.46 ml of toluene solution at a concentration of 2 mg/ml; $6.5 \times 10^{-6}$ moles, equal to about 2.93 mg), obtained as described in Example 6. The whole mixture was kept under magnetic stirring, at 0° C., for 240 minutes. The polymerization was subsequently quenched by the addition of 2 ml of methanol containing a few drops of hydrochloric acid. The polymer obtained was then coagulated by the addition of 40 ml of a methanol solution containing 4% of antioxidant Irganox® 1076 (Ciba), obtaining 0.759 g of polybutadiene having a content of 1,4-cis units equal to 98%: further characteristics of the process and polybutadiene obtained are indicated in Table 1.

FIG. 35 shows:

- (above) the percentage conversion of the monomer (i.e. 1,3-butadiene) (in the ordinate "butadiene conversion"), in relation to the polymerization time (minutes) (in the abscissa "polymerization time") of Examples 21-25 (in the abscissa) provided above;
- (below) the polymer yield (i.e. 1,4-cis polybutadiene) (in the ordinate "polymer yield"), in relation to the polymerization time (minutes) (in the abscissa "polymerization time") of Examples 21-25 (in the abscissa) indicated above;

FIG. 36 shows the FT-IR spectra of the 1,4-cis polybutadiene obtained in Examples 21-25 indicated above.

TABLE 1

Polymerization of 1,3-butadienebutadiene with catalytic systems comprising cobalt complexes including at least one imine nitrogen with aromatic phosphines

| Example | T (° C.) | Time (min) | Yield (g) | Conv. (%) | 1,4cis/1,2 Mol. ratio | (rr)[b] (%) | $T_m^{(c)}$ (° C.) | $T_c^{(d)}$ (° C.) | $T_g^{(e)}$ (° C.) | $M_W$ g/mol | $M_W/M_n$ |
|---|---|---|---|---|---|---|---|---|---|---|---|
| 9 (GL661) | 20 | 30 | 1.4 | 100 | 98.1[a] | — | −7.9 | −26.3 | −112 | 287000 | 2.1 |
| 10 (A1) | 20 | 30 | 1.4 | 100 | 59/41 | 68.2 | −9.1[cs] 100.7[ch] | −30.1[ds] 65.0[dh] | −110[es] −21.3[eh] | 283000 | 1.9 |
| 11 (GL962) | 20 | 140 | 1.4 | 100 | 98.6[a] | — | −11.9 | −46.0 | −109 | 193000 | 2.0 |

TABLE 1-continued

Polymerization of 1,3-butadienebutadiene with catalytic systems comprising cobalt complexes including at least one imine nitrogen with aromatic phosphines

| Example | T (° C.) | Time (min) | Yield (g) | Conv. (%) | 1,4cis/1,2 Mol. ratio | (rr)[b] (%) | $T_m^{(c)}$ (° C.) | $T_c^{(d)}$ (° C.) | $T_g^{(e)}$ (° C.) | $M_W$ g/mol | $M_W/M_n$ |
|---|---|---|---|---|---|---|---|---|---|---|---|
| 12 (A2) | 20 | 140 | 1.4 | 100 | 41/59 | 73.1 | −12.3[cs] 112.2[ch] | −43.5[ds] 81.0[dh] | −107[es] −19.8[eh] | 192500 | 2.1 |
| 13 (GL639) | 20 | 30 | 1.19 | 85 | 97.6[a] | — | −11.9 | −43.2 | −111 | 333300 | 2.2 |
| 14 (A3) | 20 | 30 | 1.4 | 100 | 49/51 | 71.9 | −13.5[cs] 107.9[ch] | −48.9[ds] 76.5[dh] | −108[es] −18.6[eh] | 335000 | 2.1 |
| 15 (G1169) | 20 | 95 | 3.4 | 97.2 | 97.2[a] | — | −13 | −48.0 | −108 | 185000 | 2.1 |
| 16 (G1131) | 20 | 310 | 3.5 | 100 | 34/66 | 70.5 | −16.5[cs] 104[ch] | −31.4[ds] 93.0[dh] | −112[es] −21.6[eh] | 176000 | 2.0 |
| 17 (G1132) | 20 | 160 | 4.2 | 100 | 60/40 | 70.8 | −19[cs] 106[ch] | −33.0[ds] 95.2[dh] | −107[es] −23.0[eh] | 220000 | 2.0 |
| 18 (G1136) | 20 | 160 | 4.9 | 100 | 69/31 | 66.8 | −19[cs] 106.6[ch] | −38[ds] 98[dh] | −108[es] −24.2[eh] | 193000 | 2.1 |
| 19 (A4) | 20 | 45 | 2.1 | 100 | 45/55 | 71.8 | −11.2[cs] 109.3[ch] | −53.6[ds] 76.3[dh] | −106[es]- 23.4[eh] | 220000 | 2.2 |
| 20 (A5) | 20 | 60 | 2.8 | 100 | 26/74 | 74 | −9.6[cs] 123.7[ch] | −34.4[ds] 106.8[dh] | −111[es] −15.6[eh] | 165000 | 2.0 |
| 21 (GL694) | 0 | 60 | 0.133 | 9 | 98[a] | — | −11.7 | −46.2 | n.d. | 490000 | 1.9 |
| 22 (GL695) | 0 | 105 | 0.242 | 17 | 98[a] | — | −11.6 | −46.1 | n.d. | n.d. | n.d. |
| 23 (GL696) | 0 | 145 | 0.377 | 27 | 98[a] | — | −11.7 | −46.3 | n.d. | n.d. | n.d. |
| 24 (GL697) | 0 | 195 | 0.558 | 40 | 98[a] | — | −11.4 | −46.5 | n.d. | n.d. | n.d. |
| 25 (GL698) | 0 | 240 | 0.759 | 54 | 98[a] | — | −10.9 | −45.8 | n.d. | n.d. | n.d. |

[a]% 1,4-cis;
[b]content of di syndiotactic triads [(rr) %] in the block of polybutadiene with a 1,2 syndiotactic structure determined by $^{13}$C-NMR analysis;
[c]melting point;
[d]crystallization temperature;
[e]glass transition temperature;
[cs]melting point of the polybutadiene block having a 1,4-cis structure;
[ch]melting point of the polybutadiene block having a 1,2 syndiotactic structure;
[ds]crystallization temperature of the polybutadiene block having a 1,4-cis structure;
[dh]crystallization temperature of the polybutadiene block having a 1,2 syndiotactic structure;
[es]glass transition temperature of the polybutadiene block having a 1,4-cis structure;
[eh]glass transition temperature of the polybutadiene block having a 1,2 syndiotactic structure;
n.d: not determined

The invention claimed is:

1. A process for the preparation of a stereoregular diblock polybutadiene composed of a polybutadiene block having a 1,4-cis structure and a polybutadiene block having a 1,2 syndiotactic structure, and having the following formula (I):

$$PB_1-PB_2 \quad (I)$$

wherein:
PB$_1$ corresponds to the polybutadiene block having a 1,4-cis structure; and
PB$_2$ corresponds to the polybutadiene block having a 1,2 syndiotactic structure;
wherein said stereoregular diblock polybutadiene has a content of 1,4-trans units of less than 3 mol %, with respect to a total molar quantity of butadiene units present in said stereoregular diblock polybutadiene, the process comprising:
subjecting 1,3-butadiene to total or partial stereospecific polymerization in the presence of a catalytic system comprising at least one complex of cobalt including at least one imine nitrogen, in order to obtain polybutadiene with a 1,4-cis living structure;
adding at least one monodentate aromatic phosphine and optionally 1,3-butadiene, and continuing said stereospecific polymerization, in order to obtain said stereoregular diblock polybutadiene composed of a polybutadiene block having a 1,4-cis structure and a polybutadiene block having a 1,2 syndiotactic structure.

2. The process according to claim 1, wherein said cobalt complex including at least one imine nitrogen is selected from bis-imine complexes of cobalt having general formula (I):

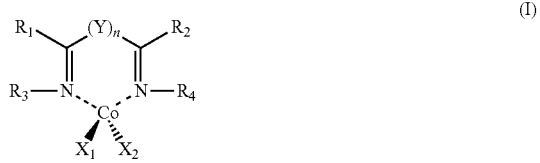

wherein:
n is 0 or 1;
Y represents a group —CR'R" wherein R' and R", the same or different, represent a hydrogen atom; or a linear or branched C$_1$-C$_{20}$ alkyl group; or a divalent aromatic group optionally substituted;
R$_1$ and R$_2$, the same or different, represent a hydrogen atom; or they are selected from a linear or branched C$_1$-C$_{20}$ alkyl group, optionally halogenated, cycloalkyl groups optionally substituted; or R₁ and R₂ can be optionally bound to each other to form, together with the other atoms to which they are bound, a cycle containing from 4 to 6 carbon atoms, saturated, unsaturated, or aromatic, optionally substituted with linear or branched $C_1$-$C_{20}$, said cycle optionally containing a heteroatom selected from the group consisting of oxygen, sulfur, nitrogen, silicon, phosphorous, and selenium;

$R_3$ and $R_4$, the same or different, represent a hydrogen atom; or they are selected from a linear or branched $C_1$-$C_{20}$ alkyl group optionally halogenated, cycloalkyl groups optionally substituted; aryl groups optionally substituted;

or $R_2$ and $R_4$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

or $R_1$ and $R_3$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_5$ groups or —$OR_5$ groups wherein $R_5$ is selected from linear or branched $C_1$-$C_{20}$ alkyl groups.

3. The process according to claim 1, wherein said cobalt complex including at least one imine nitrogen is selected from oxo-nitrogenated complexes of cobalt having general formula (Ia):

wherein:
$R_1$ and $R_2$, the same or different, represent a hydrogen atom; or they are selected from linear or branched $C_1$-$C_{10}$ alkyl groups, optionally halogenated, cycloalkyl groups optionally substituted, aryl groups optionally substituted;

$R_3$ represents a hydrogen atom, or it is selected from linear or branched $C_1$-$C_{20}$, alkyl groups optionally halogenated, cycloalkyl groups optionally substituted; aryl groups optionally substituted; or $R_3$ represents a ketoimine group having formula:

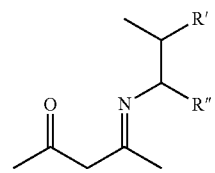

wherein R' and R", the same or different, represent a hydrogen atom, or they are selected from linear or branched $C_1$-$C_{20}$ alkyl groups, cycloalkyl groups optionally substituted, aryl groups optionally substituted;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_4$ groups or —$OR_4$ groups wherein $R_4$ is selected from linear or branched $C_1$-$C_{20}$ alkyl groups.

4. The process according to claim 1, wherein said cobalt complex including at least one imine nitrogen is selected from oxo-nitrogenated complexes of cobalt having general formula (Ib):

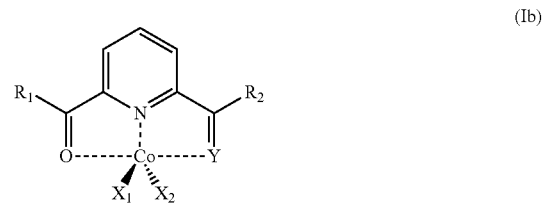

wherein
$R_1$ and $R_2$, the same or different, represent a hydrogen atom; or they are selected from linear or branched $C_1$-$C_{20}$ alkyl groups, optionally halogenated, cycloalkyl groups optionally substituted, aryl groups optionally substituted;

Y represents an oxygen atom; or a —N—$R_3$ group wherein $R_3$ represents a hydrogen atom, or it is selected from linear or branched $C_1$-$C_{20}$ alkyl groups, optionally halogenated, cycloalkyl groups optionally substituted, aryl groups optionally substituted;

or, when Y represents a group —N—$R_3$, $R_2$ and $R_3$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_4$ groups or —$OR_4$ groups wherein $R_4$ is selected from linear or branched $C_1$-$C_{20}$ alkyl groups.

5. The process according to claim 1, wherein said cobalt complex including at least one imine nitrogen is selected from bis-imine-pyridine complexes of cobalt having general formula (Ic):

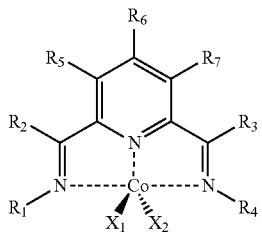 (Ic)

wherein:
- R₂ and R₃, the same or different, represent a hydrogen atom; or they are selected from linear or branched $C_1$-$C_{20}$ alkyl groups, optionally halogenated, cycloalkyl groups optionally substituted, aryl groups optionally substituted;
- R₁ and R₄, different from each other, represent a hydrogen atom, or they are selected from linear or branched $C_1$-$C_{20}$ alkyl groups, optionally halogenated, cycloalkyl groups optionally substituted, aryl groups optionally substituted, arylalkyl groups;
- or R₁ and R₂ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;
- or R₃ and R₄, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;
- R₅, R₆ and R₇, the same or different, represent a hydrogen atom, or they are selected from linear or branched $C_1$-$C_{20}$ alkyl groups, optionally halogenated, cycloalkyl groups optionally substituted, aryl groups optionally substituted, arylalkyl groups;
- or R₅ and R₆, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;
- or R₆ and R₇, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;
- X₁ and X₂, the same or different, represent a halogen atom selected from the group consisting of chlorine, bromine, and iodine, or they are selected from linear or branched $C_1$-$C_{20}$ alkyl groups, —OCOR₈ groups or —OR₈ groups wherein R₈ is selected from linear or branched $C_1$-$C_{20}$ alkyl groups.

6. The process according to claim 1, wherein said catalytic system comprises at least one co-catalyst selected from organic compounds of an element M' different from carbon, said element M' being selected from elements belonging to groups 2, 12, 13 or 14 of the Periodic Table of the Elements.

7. The process according to claim 6, wherein said co-catalyst is selected from aluminium alkyls having general formula (II):

$$Al(X')_n(R_6)_{3-n} \quad (II)$$

wherein X' represents a halogen atom selected from the group consisting of chlorine, bromine, and iodine, fluorine; R₆ is selected from linear or branched $C_1$-$C_{20}$ alkyl groups, cycloalkyl groups, aryl groups, said groups being optionally substituted with one or more silicon or germanium atoms; and n is an integer ranging from 0 to 2.

8. The process according to claim 6, wherein said co-catalyst is selected from organo-oxygenated compounds of an element M' different from carbon belonging to groups 13 or 14 of the Periodic Table of the Elements having general formula (III):

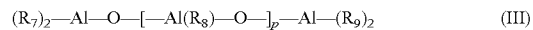

$$(R_7)_2-Al-O-[-Al(R_8)-O-]_p-Al-(R_9)_2 \quad (III)$$

wherein R₇, R₈ and R₉, the same or different, represent a hydrogen atom, a halogen atom selected from the group consisting of chlorine, bromine, iodine, and fluorine; or they are selected from linear or branched $C_1$-$C_{20}$ alkyl groups, cycloalkyl groups, aryl groups, said groups being optionally substituted with one or more silicon or germanium atoms; and p is an integer ranging from 0 to 1,000.

9. The process according to claim 6, wherein said co-catalyst is selected from organometallic compounds or mixtures of organometallic compounds of an element M' different from carbon, capable of reacting with the cobalt complex comprising at least one imine nitrogen selected from complexes of cobalt having formula (I), (Ia), (Ib) or (Ic) below, extracting therefrom a substituent X₁ or X₂ σ-bound, to form on the one hand at least one neutral compound, and on the other, an ionic compound consisting of a cation containing the metal (Co) coordinated by the ligand, and a non-coordinating organic anion containing the metal M', wherein the negative charge is delocalized on a multicentric structure represented by the following general formulae (IV), (V) or (VI):

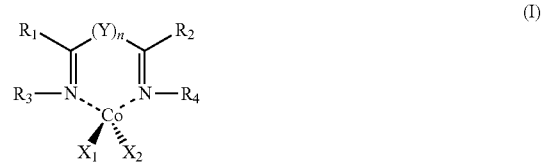 (I)

wherein:
- n is 0 or 1;
- Y represents a group —CR'R" wherein R' and R", the same or different, represent a hydrogen atom; or a linear or branched $C_1$-$C_{20}$ alkyl group; or a divalent aromatic group optionally substituted;
- R₁ and R₂, the same or different, represent a hydrogen atom; or they are selected from a linear or branched $C_1$-$C_{20}$ alkyl group, optionally halogenated, cycloalkyl groups optionally substituted; or R₁ and R₂ can be optionally bound to each other to form, together with the other atoms to which they are bound, a cycle containing from 4 to 6 carbon atoms, saturated, unsaturated, or aromatic, optionally substituted with linear or branched $C_1$-$C_{20}$, said cycle optionally containing a heteroatom selected from the group consisting of oxygen, sulfur, nitrogen, silicon, phosphorous, and selenium;

$R_3$ and $R_4$, the same or different, represent a hydrogen atom; or they are selected from a linear or branched $C_1$-$C_{20}$ alkyl group optionally halogenated, cycloalkyl groups optionally substituted; aryl groups optionally substituted;

or $R_2$ and $R_4$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

or $R_1$ and $R_3$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_5$ groups or —$OR$; groups wherein $R_5$ is selected from linear or branched $C_1$-$C_{20}$ alkyl groups;

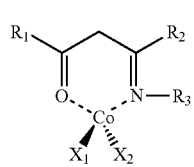

(Ia)

wherein:

$R_1$ and $R_2$, the same or different, represent a hydrogen atom; or they are selected from linear or branched $C_1$-$C_{20}$ alkyl groups, optionally halogenated, cycloalkyl groups optionally substituted, aryl groups optionally substituted;

$R_3$ represents a hydrogen atom, or it is selected from linear or branched $C_1$-$C_{20}$, alkyl groups optionally halogenated, cycloalkyl groups optionally substituted; aryl groups optionally substituted; or $R_3$ represents a ketoimine group having formula:

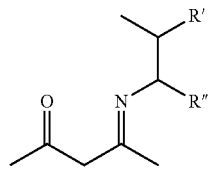

wherein R' and R", the same or different, represent a hydrogen atom, or they are selected from linear or branched $C_1$-$C_{20}$ alkyl groups, cycloalkyl groups optionally substituted, aryl groups optionally substituted;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_4$ groups or —$OR_4$ groups wherein is selected from linear or branched $C_1$-$C_{20}$ alkyl groups;

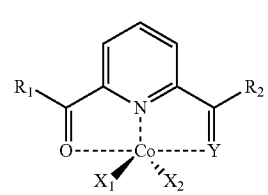

(Ib)

wherein $R_1$ and $R_2$, the same or different, represent a hydrogen atom; or they are selected from linear or branched $C_1$-$C_{20}$ alkyl groups, optionally halogenated, cycloalkyl groups optionally substituted, aryl groups optionally substituted;

Y represents an oxygen atom; or a —N—$R_3$ group wherein $R_3$ represents a hydrogen atom, or it is selected from linear or branched $C_1$-$C_{20}$ alkyl groups, optionally halogenated, cycloalkyl groups optionally substituted, aryl groups optionally substituted;

or, when Y represents a group —N—$R_3$, $R_2$ and $R_3$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_4$ groups or ~$OR_4$ groups wherein $R_4$ is selected from linear or branched $C_1$-$C_{20}$ alkyl groups:

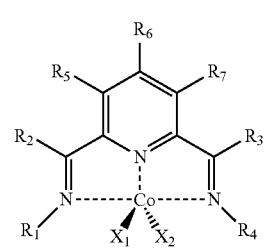

(Ic)

wherein:

$R_2$ and $R_3$, the same or different, represent a hydrogen atom; or they are selected from linear or branched $C_1$-$C_{20}$ alkyl groups, optionally halogenated, cycloalkyl groups optionally substituted, aryl groups optionally substituted;

$R_1$ and $R_4$, different from each other, represent a hydrogen atom, or they are selected from linear or branched $C_1$-$C_{20}$ alkyl groups, optionally halogenated, cycloalkyl groups optionally substituted, aryl groups optionally substituted, arylalkyl groups;

or $R_1$ and $R_2$ can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

or $R_3$ and $R_4$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$R_5$, $R_6$ and $R_7$, the same or different, represent a hydrogen atom, or they are selected from linear or branched $C_1$-$C_{20}$ alkyl groups, optionally halogenated, cycloalkyl groups optionally substituted, aryl groups optionally substituted, arylalkyl groups;

or $R_5$ and $R_6$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

or $R_6$ and $R_7$, can be optionally bound to each other to form, together with the other atoms to which they are bound, a cycle containing from 3 to 6 carbon atoms, saturated, unsaturated, or aromatic, optionally substituted with linear or branched $C_1$-$C_{20}$ alkyl groups, said cycle optionally containing a heteroatom selected from the group consisting of oxygen, sulfur, nitrogen, silicon, phosphorous, and selenium;

$X_1$ and $X_2$, the same or different, represent a halogen atom selected from the group consisting of chlorine, bromine, and iodine; or they are selected from linear or branched $C_1$-$C_{20}$ alkyl groups, —$OCOR_8$ groups or —$OR_8$ groups wherein $R_8$ is selected from linear or branched $C_1$-$C_{20}$ alkyl groups; and $$[(R_C)_w H_{4-w}].[B(R_D)_4]^-; B(R_D)_3; Al(R_D)_3; B(R_D)_3 P; [Ph_3C]^+.[B(R_D)_4]^- \qquad (IV)$$

$$[(R_C)_3 PH]^+.[B(R_D)_4]^- \qquad (V)$$

$$[Li]^+.[B(R_D)_4]^-; [Li]^+.[Al(R_D)_4]^- \qquad (VI)$$

wherein w is an integer ranging from 0 to 3, each group $R_C$ independently represents an alkyl group or an aryl group having from 1 to 10 carbon atoms and each group $R_D$ independently represents an aryl group partially or totally, fluorinated, having from 6 to 20 carbon atoms, P represents a pyrrole radical which may be optionally substituted.

10. The process according to claim 1, wherein said monodentate aromatic phosphine is selected from aromatic phosphines having general formula (VII):

$$P(R)_m(Ph)_n \qquad (VII)$$

wherein:
R is selected from linear or branched $C_1$-$C_{16}$, $C_3$-$C_{16}$, optionally substituted, allyl groups, or phenyl which may be optionally substituted;
Ph is phenyl which may be optionally substituted; and
m and n, different from each other, are 1 or 2, m+n being=3.

11. The process according to claim 1, wherein said process is carried out in the presence of at least one inert organic solvent selected from the group consisting of saturated aliphatic hydrocarbons selected from the group consisting of butane, pentane, hexane, heptane, and mixtures thereof; saturated cycloaliphatic hydrocarbons selected from the group consisting of cyclopentane, cyclohexane, and mixtures thereof; mono-olefins selected from the group consisting of 1-butene, 2-butene, and mixtures thereof; aromatic hydrocarbons selected from the group consisting of benzene, toluene, xylene, and mixtures thereof; halogenated hydrocarbons selected from the group consisting of methylene chloride, chloroform, carbon tetrachloride, trichloroethylene, perchloroethylene, 1,2-dichloroethane, chlorobenzene, bromobenzene, chlorotoluene, and mixtures thereof.

12. The process according to claim 11, wherein the concentration of 1,3-butadiene to be polymerized in said inert organic solvent ranges from 5% by weight to 50% with respect to the total weight of the mixture of 1,3-butadiene and inert organic solvent.

13. The process according to claim 1, wherein said process is carried out at a temperature ranging from −70° C. to +120° C.

* * * * *